(12) United States Patent
Bur et al.

(10) Patent No.: US 11,657,432 B2
(45) Date of Patent: May 23, 2023

(54) CAMPAIGN MANAGEMENT SYSTEM—SUSPENSION

(71) Applicant: BSI Business Systems Integration AG, Baden (CH)

(72) Inventors: Andreas Bur, Baden (CH); Paolo Emilio Andrea Bazzi, Baden (CH); Beat Schwarzentrub, Baden (CH)

(73) Assignee: BSI Business Systems Integration AG, Baden (CH)

( * ) Notice: Subject to any disclaimer, the term of this patent is extended or adjusted under 35 U.S.C. 154(b) by 0 days.

(21) Appl. No.: 16/919,798

(22) Filed: Jul. 2, 2020

(65) Prior Publication Data
US 2021/0004874 A1 Jan. 7, 2021

(30) Foreign Application Priority Data
Jul. 2, 2019 (DK) .......................... PA 2019 70432

(51) Int. Cl.
*G06Q 30/02* (2012.01)
*G06Q 30/0241* (2023.01)
(Continued)

(52) U.S. Cl.
CPC ....... *G06Q 30/0276* (2013.01); *G06F 3/0484* (2013.01); *G06F 9/485* (2013.01);
(Continued)

(58) Field of Classification Search
CPC ............ G06Q 30/0275; G06Q 30/0269; G06F 16/2379
See application file for complete search history.

(56) References Cited

U.S. PATENT DOCUMENTS 7,039,594 B1 * 5/2006 Gersting ................ G06Q 10/06
7,672,924 B1 * 3/2010 Scheurich ........... G06F 16/2423
707/999.002

(Continued)

FOREIGN PATENT DOCUMENTS

CA 2867843 A1 * 10/2013 ........... H04L 67/104
EP 1890260 A1 2/2008
(Continued)

OTHER PUBLICATIONS

Danish Search Report for Danish Application No. PA 2019 70432 dated Dec. 17, 2019, 4 pages.

*Primary Examiner* — Scott C Anderson
(74) *Attorney, Agent, or Firm* — Lee & Hayes, P.C.

(57) ABSTRACT

The invention relates to a computer implemented campaign management system (CAMS), the system including a graphical user interface (GUI), the management system (CAMS) processing a plurality of participant records (PREC) according to a user-configured process structure (PS) of a plurality of configured logic templates (CLT); wherein the participant records (PREC) comprise participant attributes (PA), and wherein the processing of participant records involves processing or modification of one or more of the participant attributes (PA) of the participant record (PREC), wherein the management system reads, processes and/or modifies participant attributes (PA) of participant records (PREC) by a sequence of one of more executable program fragments (EPF) according to the process structure (PS) and wherein the execution of one of more executable program fragments (EPF) can be suspended in response to user action (UACT) and/or participant action (PACT) and wherein the execution of the process structure can be resumed in response to user action (UACT) and/or participant action (PACT).

19 Claims, 24 Drawing Sheets

Figure 1:
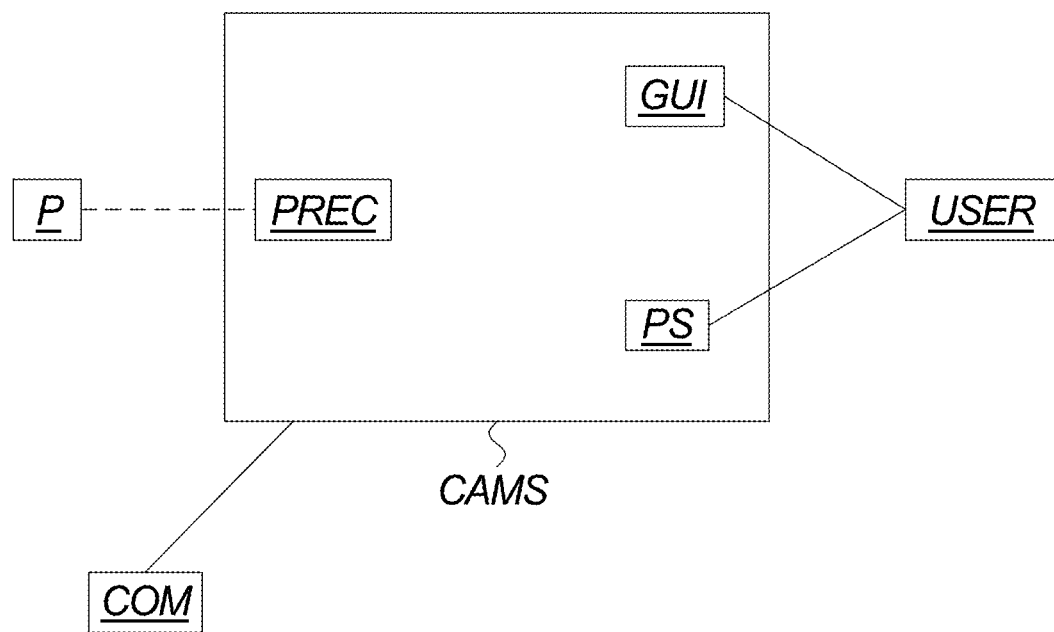

(51) Int. Cl.
*G06Q 10/10* (2023.01)
*G06Q 30/0251* (2023.01)
*G06F 16/23* (2019.01)
*G06F 9/48* (2006.01)
*G06F 30/20* (2020.01)
*G06F 3/0484* (2022.01)
*G06F 111/02* (2020.01)

(52) U.S. Cl.
CPC .......... *G06F 16/2379* (2019.01); *G06F 30/20* (2020.01); *G06Q 10/103* (2013.01); *G06Q 30/0269* (2013.01); *G06F 2111/02* (2020.01)

(56) References Cited

U.S. PATENT DOCUMENTS

| | | | |
|---|---|---|---|
| 8,156,007 B1 * | 4/2012 | Anthony | G06Q 30/0601 705/26.1 |
| 2006/0288100 A1 | 12/2006 | Carson et al. | |
| 2010/0262484 A1 | 10/2010 | Bardin et al. | |
| 2012/0288082 A1 | 11/2012 | Segall | |
| 2013/0066714 A1 * | 3/2013 | Umeda | G06Q 30/02 705/14.46 |
| 2015/0095219 A1 * | 4/2015 | Hurley | G06Q 20/325 705/39 |
| 2016/0088455 A1 * | 3/2016 | Bozik et al. | H04L 51/04 370/225 |
| 2016/0328488 A1 * | 11/2016 | Lytle | G06F 16/252 |
| 2016/0349960 A1 | 12/2016 | Kumar et al. | |
| 2017/0286153 A1 * | 10/2017 | Bak | G06F 9/542 |
| 2019/0102993 A1 * | 4/2019 | Washington | G07F 17/3211 |

FOREIGN PATENT DOCUMENTS

| | | |
|---|---|---|
| WO | WO2009007410 A2 | 1/2009 |
| WO | WO2017127605 A1 | 7/2017 |

* cited by examiner

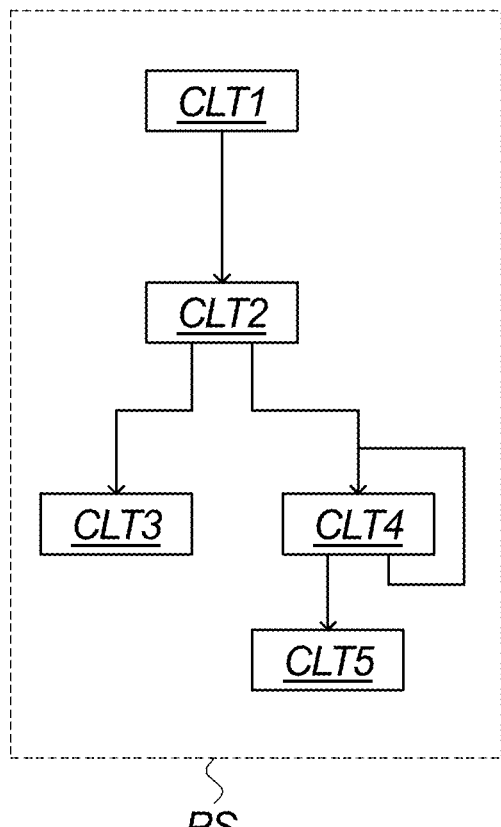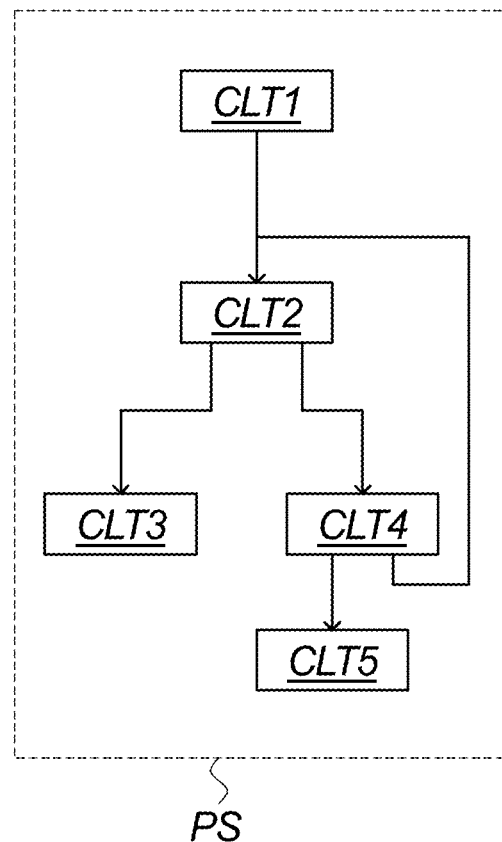
Fig. 18                    Fig. 19

CAMPAIGN MANAGEMENT SYSTEM—SUSPENSION

CROSS REFERENCE TO RELATED APPLICATIONS

The present application claims the benefit under 35 U.S.C. 119 to Danish Patent Application No. PA 2019 70432 filed Jul. 2, 2019, which is incorporated herein by reference in its entirety.

FIELD OF THE INVENTION

The present invention relates to implementations of campaign management systems.

BACKGROUND OF THE INVENTION

A large part of communication with consumers or parties of interest is automated in today's CRM systems. Such systems may e.g. be referred to as campaign management systems. Different variations of such types of systems are well-known both from patent literature and also from commercialized products from e.g. Marketo, Salesforce, Journey Planner, etc. A common approach to most such state-of-the-art systems is that the campaign is established by a programmer by means of a graphical user interface. The campaign is designed on the basis of a number of standard steps which may be intuitively combined to form a process structure running the campaign on the basis of data from an ERP or CRM backend system. These steps may also be understood as logic template that the designer will have to both combine in order to obtain a desired process structure of the campaign, but the logic template also forms a basis by means of which a user med configure parameters associated with the template.

A challenge related to such well known and wide-spread systems is that such systems are relatively complex to design/program and a typical campaign designer, e.g. a marketing person, will need to rely heavily on assistance from the IT department when designing and setting up the system.

A further challenge is that a system designer, where setting up a system may risk spamming large numbers of clients or contacts unintentionally, if the campaign is set up incorrectly or because some user behaviour couldn't be foreseen.

Such limitation severely restricts the dynamics of campaign management systems and it restricts the designer in really getting in touch with the participants to be reached by the campaign, as the above spamming simply cannot be risked as such spamming would backfire heavily to the enterprise subjecting clients or potential clients with irrelevant or annoying communication.

SUMMARY OF THE INVENTION

The inventors have identified the above-mentioned problems and challenges related to prior art campaign management systems, and subsequently made the below-described invention which may mitigate some of the above-described challenges and/or provide advantages described below.

The invention relates to a computer implemented campaign management system, the system including a graphical user interface, the management system processing a plurality of participant records according to a user-configured process structure of a plurality of configured logic templates; wherein the participant records comprise participant attributes, and wherein the processing of participant records involves processing or modification of one or more of the participant attributes of the participant record, wherein the management system reads, processes and/or modifies participant attributes of participant records by a sequence of one of more executable program fragments according to the process structure and wherein the execution of one of more executable program fragments can be suspended in response to user action and/or participant action and wherein the execution of the process structure can be resumed in response to user action and/or participant action.

The user interface applied for configuration of the campaign management system is typically a graphical user interface as understood by the skilled person in the art. Evidently, the graphical implementation may advantageously be supplemented by audio or other type of suitable communication carrier, as long as the user of the system is able to establish a firm control of the system in terms of configuration and execution.

A participant action in the present context may simply be non-responsiveness or a specific action involving that the execution of the process structure is temporarily suspended. A participant action may also involve an action during the execution of the process structure, resulting in that further processing is made impossible as the processing as defined by the user according to the process structure and the actions of the participant has effectively directed the execution into a dead-end or e.g. an unforeseen dead-lock. In a typical system of the present kind, such a state would result in a forced exit to ensure that participants are not stuck in a certain executed campaign. In the present embodiment of the invention, such a state is acceptable and actually advantageous in particular if run-time modifications of the process structure is allowed.

A dead end or a dead-lock in the present context may from a process perspective be acceptable as the campaign management system offers the user the ability of adding, modifying or "repairing" the process structure without ejecting participants or terminating the execution of the process structure with respect to participant records already partly processed by the process structure.

A further benefit of the embodiment of the invention is that a user, i.e. the designer of the process, may actively decide to pause the execution of the some or all of the process structure in order to correct or re-design the process without ejecting the participants. In practice this means that a participant may both be "actively" brought out of a dead-end or alternatively simply avoid reentry just because some of the process structure has modified, adapted or optimized.

In an embodiment of the invention, the process structure is graphically illustrated by means of the graphical user interface.

In an embodiment of the invention, the graphical user interface is arranged to display graphical elements, each graphical element being associated with a logic template.

In an embodiment of the invention, said logic templates comprise user editable parameters being editable by using the graphical user interface, the logic templates further comprising an executable program fragment being executable on the basis of said user editable parameters and one or more of said participant records.

In an embodiment of the invention, the graphical elements are couplable using said graphical user interface by a user, the coupling defining the process structure of said executable program fragments of said logic templates in relation to said participant records.

In an embodiment of the invention, said process structure and said participant records for processing according to said process structure represent a campaign.

In an embodiment of the invention, a user configured logic template forms a configured logic template.

In an embodiment of the invention, wherein the participant records comprise participant attributes being processable by said executable program fragments of said configured logic templates according to said process structure.

In an embodiment of the invention, the participant attributes comprise global participant attributes and local participant attributes.

In an embodiment of the invention, said global participant attributes are defined across a plurality of campaigns defined by different respective process structures, and wherein said local participant attributes are defined for a subset of said plurality of campaigns CAM).

In an embodiment of the invention, said campaign management system comprises a processing engine configured to perform said processing of said participant records according to said process structure.

In an embodiment of the invention, the process structure is referred to with reference to version of process structure. The process structure basically defining some basic workflows of the campaign management system may thus be present and stored in one or more process structure versions, e.g. two or more process structure versions PSV1, PSV2.

In an embodiment of the invention, one or more of said local participant attributes is a user-defined or user-named variable.

The user may configure local participant attributes of different data types and provide user-defined variable names, or user-defined attribute names, for reference in the process structure, e.g. in different logic templates. According to the present invention, local participant attributes may be variables which can be named/defined by the user, thereby allowing the user to assign meaning to the local participant attributes. From a technical point of view, it allows the user to name/define variables and use them in one process structure together with the global participant attributes originating from master data, and define/name variable differently in another process structure. Thereby the variables that are only relevant for a specific process structure, does not have be implemented in the master data or be directly transferrable to other process structures. This may reduce confusions and contamination with respect to the master data, and improve the ability of the user/designer to manage and use the attributes available in a specific campaign. This makes embodiments of the present invention more robust and agile across different process structures.

In an embodiment of the invention, the graphical user interface is configured with an interface for the user to create or configure a local participant attribute and wherein the user may configure the local participant attribute by selecting at least one of a user-defined name and a predefined attribute type.

Local participant attribute may in an advantageous embodiment simply be created and configured by a user through the graphical user interface, and allowing the user to define the name and datatype. According to the present disclosure, participant attribute type generally refers to the data type of a participant attribute. This may be simple base data types such as Boolean, integer, float, etc., and may in various embodiments also be built-in or user-defined complex data types or structures such as arrays, format validated data fields like telephone numbers or email addresses, enumerations, structures of same or different datatypes like addresses, images, documents, etc.

In an embodiment of the invention, a logic template is configurable by the user for establishment of a local participant attribute and wherein the user may configure the local participant attribute by providing a user-defined attribute name to local participant attribute when configuring the logic template.

The logic template which is configurable by the user for establishment of a local participant attribute is according to an advantageous embodiment simply configured by a user activation of a graphical element referring to the relevant logic template to be configured and the user then type a name in a field predefined for naming of a new local participant attribute.

In an embodiment of the invention, a logic template is configurable by the user for establishment of a local participant attribute and wherein the user may configure the local participant attribute by providing a user-defined attribute name to the local participant attribute when configuring the logic template and wherein the local participant attribute is established by selecting one of a number of predefined attribute types.

The logic template which is configurable by the user for establishment of a local participant attribute is according to an advantageous embodiment simply configured by a user activation of a graphical element referring to the relevant logic template to be configured and the user then type a name in a field predefined for naming of a new local participant attribute and select one of a predefined attribute types.

In an advantageous embodiment of the invention a configurable logic template may be configured by means of a graphical user interface where the user interface facilitates typing of the desired name of an attribute to be applied in the campaign about to be designed. The graphical facilitation of such a naming may e.g. be obtained by means of a text editor and typography dedicated for the definition of a new local participant attribute. The text editor may e.g. activated though the configurable logic template during the configuration of template. An alternative approach could also be a configurable logic template comprising dedicated predefined fields where a user may input end thereby define the name of the local participant attribute.

The data type of the named local participant attribute may be established in the same way when configuring the relevant logic template and the user may be assisted by offering one or more predefined selectable data types.

When a local participant attribute has been defined during a configuration, the local participant attribute may be applied during the execution of the specific campaign. In this way, the user defining the campaign may not only rely on the master data for use in the configuration of the campaign but may also add further attributes without requiring such data to be present or being modelled in the master data. This adds an agility and dynamic not hitherto provided in any campaign management system. A local participant attribute may thus be defined and used in one campaign only in relation to the participants affected or specified for the present campaign.

Advantages related to this way of technical implementation a campaign are many. Two advantages include:

The user defining the campaign may have less or little knowledge to the general corporate data base as such data bases tends to grow very complex in large business and that an extreme control and maintenance of data models in such data bases must be applied in order to ensure that data fields are perceived and maintained correctly.

The option of defining local participant attributes makes it possible to provide a campaign management system which offers are high degree of privacy. The system may e.g. be programmed to disallow use of local participant attributes across campaigns. This means that the data flow, specifically the data obtained through interaction with a participant in one campaign may be contained in this specific campaign. An important point if allowing a certain degree of cross-campaign use it is completely easy to designate, find or delete such data. A participant may thus request information about which data are contained within the campaign management system as it is very easy to restrict or monitor cross-campaign use.

In an embodiment of the invention, a user defined local participant attribute is used to contain data related to interaction with specific participants.

In an embodiment of the invention, said two or more process structure versions are graphically defined, preferably by a plurality of graphical elements associated with said plurality of configured logic templates, respectively, and being couplable by graphical connections using a graphical user interface by a user, the couplings defining the process structure of said executable program fragments of said logic templates in relation to said participant records.

The graphical editability of the process structure may preferably be provided by arranging the graphical user interface to allow the user to connect graphical elements associated with logic templates by means of graphical connections, and providing an interface for editing the user editable parameters to configure the logic templates. The same graphical user interface may allow the user to define several process structure versions simultaneously or one at a time, by replacing or adding logic templates, changing and adding graphical connection, changing configurations of logic templates, etc.

The graphical user interface is configured to allow the user of the campaign management system to build and illustrate a process structure and configure individual logic templates, by presenting graphical elements, graphical connections, etc., on a screen, and facilitating interaction with the graphical elements and connections, etc., by input from the user e.g. by computer mouse, keyboard, touch gestures, etc.

In the present disclosure, a graphical element is a representation of a logic template in the graphical user interface. It may preferably be interactive for the user to drag-and-drop, relocate, and otherwise interact with the configuration of the related logic template, etc. Graphical elements are connectable by graphical connections.

When designing a campaign in the graphical user interface, the graphical elements representing the individual logic templates are getting connected by graphical connections. The graphical connections thereby become the definition of the process structure, together with the configurations made to the individual logic templates. Several logic templates may preferably have a plurality of sequence forward points, and for such logic templates, each graphical connection is preferably connected to a specific sequence forward point, in order to facilitate different connections for the different sequence forward points of a logic template. Likewise, in an embodiment providing a plurality of sequence receive points for a logic template, the graphical connections are connected to specific such sequence receive points. In other words, the graphical connections preferably bind specific sequence forward points to specific sequence receive points, and are used by the user to define and illustrate the various configured process sequences, and thereby indirectly by the processing engine to determine the sequence of execution of executable program fragments and related configurations.

In an embodiment of the invention, said campaign management system comprises a processing engine configured to process said participant records according to said process structure.

The campaign management system comprises a processing engine to process the participant records in accordance with a process structure. Besides the provision of the graphical user interface allowing a user to couple logic templates to define configured process sequences and edit user editable parameters of the logic templates to produce configured logic templates, a processing engine is provided to process the thus configured campaign. A main purpose of the processing engine is to initiate the execution of the executable program fragments of the individual logic templates in a sequence defined by the process structure and as appropriate for a particular participant record based on its track history and any relevant process structure versions, and manage this for all the participant records in a campaign or several campaigns.

By the present invention, the processing engine is enabled to process several participant records associated with the same participant.

In an embodiment of the invention, said processing of one of said participant records by said processing engine comprises executing said executable program fragments of said configured logic templates according to one of said configured process sequences determined at least partially on the basis of said one participant record.

The processing engine determines, for each participant record, which executable program fragment to execute next. The options for the processing engine is limited to the configured process sequences defined in the process structure, and further limited by the track history of the particular participant record. In other words, the prior execution of a participant record and the choices made in that connection, possibly by the associated participant, and in particular the last executed executable program fragment for that particular participant record, determines which possible configured process sequences are available to that participant record, and the outcome of the last executed executable program fragment in terms of a determined sequence forward point will due to the connections between sequence forward points and sequence receive points of logic templates defined in the process structure, determine a specific logic template and executable program fragment to execute next for that participant record.

If no connection is defined in the process structure for the particular sequence forward point, no next logic template is defined, and no further processing with respect to that participant record is performed, until a connection is defined and processing can resume, preferably in a new process structure version. Thereby an advantageous possibility of actually processing according to only partly configured campaigns to the extent possible is provided, and/or the possibility of maintaining participant records for further processing even though they have reached a point that is presently conceived as an end of the campaign. The latter allows the user to come back at a later time, even years later, and extend the campaign with further logic templates, even for the participant records that were already processed with respect to the original extent of the campaign.

The processing engine is computer-implemented, and the execution itself of the individual executable program fragments may be performed by the processing engine, preferably by parallel processing in several execution threads in a queue-based execution system. In another embodiment, for example in larger systems with many participant records and/or many logic templates, the executable program fragment execution is delegated to one or more separate execution engines, preferably running at one or more separate hardware, and the processing engine merely initiates the execution of individual executable program fragments at appropriate times according to the configured process sequences. In another embodiment, some executable program fragments are executed by the processing engine, and others are delegated for external execution, e.g. a logic template made available by a third party and hosted at a third party server with its own processor.

In an embodiment of the invention, said processing engine is configured to select a next executable program fragment to execute with respect to a particular participant record, the selection being based on a determined first sequence forward point of a configured logic template of a last executed executable program fragment of said particular participant record and said process structure defined by said graphical connections between sequence forward points and sequence receive points of said configured logic templates.

In other words, the processing engine is configured to determine which logic template's executable program fragment was last executed with respect to a particular participant record and which sequence forward point that execution resulted in. Based on that information, which may for example be retrieved from the track history of the participant record or be included in a finished-message from the logic template, the processing engine can look up in the process structure which logic template is connected to that sequence forward point, and thereby determine which executable program fragment to initiate execution of.

In an embodiment of the invention, said determined first sequence forward point of said configured logic template of said last executed executable program fragment of said particular participant record is determined from said track history of said particular participant record.

The track histories of the participant records provide an advantageous way for the processing engine to determine the next step for each participant record in the light of the process structure defined by the user.

In an embodiment of the invention, said selection of said next executable program fragment to execute with respect to a particular participant record is based on the last entry in said executed process sequence of said track history of said particular participant record.

The last entry of the track histories preferably denotes the lastly executed logic templates and resulting sequence forward points for each participant record. Comparing that information with the defined process structure directly provides the next step to execute for each participant record.

In an embodiment of the invention, said processing engine with respect to a particular participant record is configured to perform the steps of: initiating execution of a first executable program fragment of a first configured logic template on the basis of said particular participant record; determining for said particular participant record a first sequence forward point of said first configured logic template on the basis of said execution of said first executable program fragment on the basis of said particular participant record; determining for said particular participant record a second configured logic template based on said determined first sequence forward point and said process structure defined by said graphical connections between sequence forward points and sequence receive points of said configured logic templates; and initiating execution of a second executable program fragment of said determined second configured logic template on the basis of said particular participant record.

In an embodiment of the invention, said processing engine is further configured to perform the following step after determining said first sequence forward point for said particular participant record: logging said first configured logic template and determined first sequence forward point in said track history of said particular participant record.

The registration in the track history may be performed as a finishing action of each logic template, or a function of the processing engine when receiving a message that a logic template has finished processing a particular participant record.

In an embodiment of the invention, an executed process sequence for said particular participant record is determined by a sequence of executed executable program fragments for said particular participant record.

In other words, the track history comprises the sequence of executable program fragments that has been executed for the particular participant record.

In an embodiment of the invention, said processing engine is queue-based.

By providing a queue-based implementation of the processing engine, the processing of the for example tens of thousands of participant records by for example tens or hundreds of logic templates of the process structure can be made asynchronous and thereby robust and fast even when the executable program fragments of some logic templates are considerably slower to execute than others, or apply delays for unpredictable amounts of time of for example days or weeks.

At the end of the execution of an executable program fragment with respect to a particular participant record, data may for example be exchanged via a queue to notify the processing engine that this particular participant record is ready to proceed to execution by another executable program fragment. The processing engine performs the step of determining which logic template's executable program fragment should be executed next for this particular participant record as for example described above, and initiates that execution. As the queue-based processing preferably implies an asynchronous processing, the processing engine need not monitor or await the execution of an executable program fragment, but is free to determine and initiate execution of other of the possible numerous participant records. As soon as the execution is finished, a data exchange via the queue will make sure that the handling of the participant record is returned to the processing engine. Several coinciding data exchanges related to processing of different participant records may be placed on a queue and thereby await processing without risking that any participant record is skipped.

The execution of an executable program fragment with respect to a particular participant record may also in itself be asynchronous, so that an execution that applies a delay or is required to await an input from the participant or make an asynchronous request to a service, e.g. an online, external third party service, may suspend the execution with respect to that particular participant record while waiting, and instead perform execution with respect to a different participant record. In this example, queue-based data exchange may be employed as a means to resume processing when the awaited response is received. Unpredictable or unreliable wait times, e.g. awaiting a possible interaction from a participant, may also be processed in parallel with a timer function so that if a timer runs out, or a predefined time is reached, before the primary action happens, e.g. participant response, the timer sends a resumption message to the processor, which may decide according to the configuration of the logic template whether it should proceed in accordance with a lack of response condition.

Alternative to be queue-based, the processing engine may for example iterate through a collection of participant records and for each participant record initiate execution of a relevant logic template's executable program fragment based on the track history and process structure. When through all participant records, the processing engine repeats the iteration from the first participant record again. This procedure may also be used to restart processing, e.g. after a system reboot, where the system state may be recovered based on the track histories, and processing started by iterating through all participant records, after which the procedure may change to queue-based processing as described above. Alternatively, the iteration may be based on a collection of logic templates of the process structure, and for each logic template determine from the track histories of the participant records and the process structure, which participant records are to be processed by that particular logic template. When through all logic templates, the processing engine repeats the iteration from the first logic template again.

In an embodiment of the invention, the processing engine's initiation of an execution of an executable program fragment for a particular participant record involves adding the particular participant record to an execution queue of that executable program fragment.

In other words, the initiation of execution by the processing engine does not necessarily mean an immediate execution. In a large system with many participant records, it may often be the case that the execution must wait for another execution to finish first. For some logic templates, it would also be inexpedient or otherwise undesirable to allow the logic template to be processed at any time or as frequent as possible. Hence, the processing engine initiating execution means that an execution is requested to be carried out, however preferably in accordance with any configuration of execution restrictions of the logic template.

In an embodiment of the invention, a user editable parameter of a configured logic template is configured to control an execution interval of the executable program fragment of that configured logic template.

Different types of logic templates may be configured with execution intervals determining how often their executable program fragment can be executed. This may for example be relevant for a logic template that generates a communication to a participant where the timing could as well be coordinated with an expected appropriate time for communicating with that participant, e.g. avoiding phone calls during night time, or for example be relevant for a logic template that performs a request to a database or third party service to avoid an overload of redundant requests to be performed as frequently as the hardware of the processing engine allows, e.g. restricting database updates to be performed once a day. During the execution interval of a logic template, the processing engine may simply queue execution of participant records that according to the process structure are bound for execution by that logic template.

In an embodiment of the invention, the processing engine is configured to receive a manual request to initiate execution of a particular configured logic template's executable program fragment with respect to all or specific participant records located in queue for that particular configured logic template.

In a preferred embodiment, it is possible to manually overrule the restriction imposed by an execution interval, and request an immediate execution of a particular logic template. The processing engine may then perform the execution of that particular logic template's executable program fragment with respect to all the participant records waiting in queue for that logic template, or for a specific participant record. This gives the user an advantageous possibility of manually impacting the processing, for example when a generally applicable execution interval is undesirable under particular circumstances, or a planned execution was not carried out, for example because of an error situation or manual pausing of the system.

In an embodiment of the invention, the campaign management system is configured for executing a design mode and a live mode, wherein the management system in design mode executes a graphical design environment of a campaign wherein the graphical elements are couplable by a user by using said graphical user interface, the coupling defining a process structure of said executable program fragments on the basis said configured logic templates in relation to said participant records and wherein the live mode for the campaign executes the process structure designed by the user in the design mode for processing of individual participant records and wherein the management system, in the live mode, reads, processes and/or modifies participant attributes of participant records by a sequence of one of more executable program fragments according to the process structure.

In an embodiment of the invention, the campaign management system, for a specified campaign, is configured for running in both live mode and design mode at the same time by enabling a user updating the process structure to an updated process structure while at the same time running in live mode on the basis of the process structure.

In an embodiment of the invention, the campaign management system is configured for suspension of the execution of the executable program fragments associated to the process structure in live mode while the process structure is modified in design mode into an updated process structure.

In an embodiment of the invention, the processing of individual participant records in live mode involves reading and/or modification of the participant attributes of the individual participant record thereby invoking a progression of the executable program fragments relative to the process structure of the processing of the participant record.

In an embodiment of the invention, the processing of individual participant records in live mode for each participant record is executed in an executed process sequence designating the sequence of executable program fragments that have actually been executed with respect to the participant record at a given time and wherein the current state of the participant record includes the current values of the participant attributes of the record and the current participant track history at the given time.

In an embodiment of the invention, the current state of a specified participant record is monitored and optionally visualized as a progression relative to a process structure of a campaign and wherein the progression relative to the process structure is referred to as the participant location It should be noted that a participant location is a somewhat abstract designation of the process as neither the participant, nor the participant record, is moved or transferred during the process. The participant record rather captures the present state of the attributes, including the registered track history of the participant record relative to the progression along the process structure. In real life, the participant, will however experience progression along the process structure, of course only to the degree that participant interactions are in fact involved.

In an embodiment of the invention, the processing of the participant records is monitored with respect to and in relation to the process structure and graphically illustrated by means of the graphical user interface with reference to or related to graphical elements representing configured logic templates of the user-defined process structure.

It is thereby possible to illustrate the progression of the processing of the participant records and it is thereby possible to establish whether participants are dead-ended or whether some of the process structure needs to be modified.

In an embodiment of the invention, the progression of the processing of the participant records related to a specified campaign are graphically illustrated by means of the graphical user interface with reference to or related to graphical elements representing configured logic templates of the user-defined process structure as accumulated numbers of participant records having a certain participant location.

All participant records in the process of being processed according to the process structure may be illustrated or subsets of the participant records may be illustrated depending on the type of knowledge a user or a supervisor running the campaign may need.

In an embodiment of the invention, the progression of the processing of the participant records related to a specified campaign are graphically illustrated by means of the graphical user interface with reference to or related to graphical elements representing configured logic templates of the user-defined process structure as accumulated numbers of participant records having been processed via a certain participant location.

In the present context, the meaning of participant records which have been processed along a certain participant location has the meaning that a participant in the present context may pass by a certain step, e.g. an executable program fragment, several times. If this is the case, it may be highly advantageous to monitor not only participant present at a given location, but it may alternatively or also be advantageous for a campaign monitoring the number of participants, as represented by their respective participant records, having passed a certain location as defined relative to the process structure.

In an embodiment of the invention, the progression of the processing of the participant records related to a specified campaign are graphically illustrated by means of the graphical user interface with reference to or related to graphical elements representing configured logic templates of the user-defined process structure as accumulated numbers of participant records, and wherein the graphically illustrated participant records are filtered with respect to a filtering parameter.

A filtering parameter in the present context may relate to many different possible ways of extracting the desired information. The filtering could be performed with respect to the participant gender, age, preferences with respect to products, etc. The filtering would as such then e.g. provide a possibility of monitoring visually the accumulated number of total participants of a certain campaign having entered the different "steps" of the process structure, and then switch to another view where only male participants are illustrated. In this way, it may be possible for the campaign designer, the user, or the person in responsibility of the campaign in a live mode to view and check not only whether the campaign is running as intended but also check if some groups of participants are following different paths along the process structure. Everything may be performed in real-time. This is in high contrast to state of the art systems where complicated analysis can only be applied as summarized presentations and usually only after termination of the campaign.

Such filtering may also give the person responsible of the campaign information to decide whether the campaign should be optimized or paused, completely or partly.

In an embodiment of the invention, the filtering parameter includes gender, age, country, nationality, consumption history, relevant local attributes related to a specific campaign, etc.

In an embodiment of the invention, the individual participant records can be accessed for at least read-only via the graphical elements of the process structure or the graphically illustrated accumulated numbers of participant records which have entered a certain stage of the processing according to the process structure In an advantageous embodiment of the invention a user of the campaign management system may examine a campaign, preferably a running campaign, with reference to the individual graphical elements. This may e.g. be done by clicking the graphical elements, or the graphical elements may e.g. be designed to visualize accumulated number of participant records which have been "passed" the respective executable program fragments in questions. These types of live data may visualize in an easy way how the campaign is progressing, and the user may react on the development e.g. by actively suspend to campaign for a while, e.g. when updating the process structure downstream of a potential dead-end or a configured logic template not functioning according to intention.

In an embodiment of the invention, the user interface of the campaign management system facilitates a user initiated suspension upon activation of the user interface in relation to a specific campaign and wherein a suspension command suspends the processing of one or more executable program fragments in response to said activation and wherein a resume command resumes the execution of the suspended one or more executable program fragments.

When allowing a user invoked suspension of the processing of participant records in a certain campaign, it may be possible for the user to refine or restructure the process structure, e.g. according to changed ambitions with respect to the campaign but also in order to modify or "repair" the campaign in response to how the specific campaign is actually progressing.

In an embodiment of the invention, the campaign management system comprises a graphical button available for the user triggering a suspension command and triggering a resume command The graphical button for suspending and resuming the execution of the campaign may be established and defined for the user as two dedicated buttons, or they may simply be formed as one button which, when activated triggers a suspension command and when deactivated triggers a resumption of the execution of the campaign in question. Numerous other button or communication implementations may be applied within the scope of the invention as long as the user is able to trigger a suspension or a resume command.

Thus, a specific command, e.g. defined by a combination of characters which maybe input by the user, may be applied for both suspension and/or resuming of the execution of the campaign.

It should however be noted, that the special scenario, as facilitated by an embodiment of the invention, where a user, e.g. the campaign designer or the person responsible for the real-life running of the campaign, actively and manually decides to pause the execution of some of or all of the one or more executable program fragments is very advantageous in the sense that such an active pausing, including the option of restarting the process for the participants already involved in the campaign, facilitates that the user may modify or repair the current process structure without terminating the campaign completely and thereby risking annoyed participants. Such a complete termination would thus typically result in that the participants would either be discarded or re-entered into a new campaign, where choice made are cancelled and where a participant would again be faced with the same questions or choices already death with.

The invention therefore facilitates that a user may monitor the execution of the campaign, e.g. by checking the flow of participant through the process structure or e.g. by checking the current participant location of individual or accumulated groups of participants in the process structure.

In an embodiment of the invention, the user interface of the campaign management system facilitates a user initiated suspension upon activation of the user interface in relation to a specific campaign and wherein a suspension command suspends the processing of user specified one or more executable program fragments in response to said activation and wherein a resume command resumes the execution of the suspended user specified one or more executable program fragments, and wherein the suspended user specified executable program fragment is associated to a configured logic template.

In an embodiment of the invention, the user specified executable program fragment is user specified by activating a suspension command or a resume command related to a graphical element graphically forming part of the process structure of the campaign.

According to an advantageous embodiment of the invention, it is possible for a user, by means of the user interface, to select and pause a specific graphical element of a process structure of a running campaign, thereby pausing the program fragments of the pin-pointed "step", i.e. the graphical element. In this way, one or more user specified executable program fragments may be paused for a while, e.g. until a certain time period has lapsed or e.g. until a user re-activates the specified executable program fragment(s) by activating e.g. software implemented buttons of the relevant graphical elements. In this way, a user may avoid terminating the complete execution of the process structure related to the specific campaign and only pause the steps of the process structures which may facilitate either encapsulation of parts of the process structure not working according to intention or alternatively just to pause a part of the process structure until further sub-testing has been performed.

In an embodiment of the invention, said plurality of logic templates comprises one or more interaction logic templates and said executable program fragments of said interaction logic templates are arranged to establish a communication to a participant contact interface on the basis of said participant contact interface information stored in said participant records;

Various interaction logic templates may implement different kinds of communication, e.g. email, smartphone push messages, QR codes, web forms, etc. The executable program fragment of interaction logic templates may be arranged to accommodate different outcomes and error situations related to the kind of communication that they implement, such as receiving input from participant, handling communication errors, detecting absence of reaction after a timer expiration, etc. Thereby an interaction logic template may often be more complex than other categories of logic templates in its implementation and configuration as experienced by the user, i.e. the sense that a single interaction logic template can handle e.g. both transmission to participants, received response from participants, delays, bouncing of emails and other errors, etc.

In an embodiment of the invention, an interaction logic template communicates requests to participants for data to be written into a local participant attribute.

In an embodiment of the invention, the data to be written into a local participant attribute of a specified participant record is participant input.

In an embodiment of the invention, the execution of interaction logic template is at least partly suspended during test mode of a respective campaign, thereby obtaining that the participant interaction is suspended in test mode.

In an embodiment of the invention, the next executable program fragment to be executed with respect to a specific participant record is at least partly determined on the basis of the process structure and of the participant input related to the participant record.

In an embodiment of the invention, a user suspension of one or more executable program fragments of a running campaign, suspends the execution of the relevant executable program fragments and thereby freezing the status of the participant records processed in the campaign.

In an embodiment of the invention a user suspension of one or more executable program fragments of a running campaign, suspends the execution of the relevant executable program fragments and thereby freezing the state of the participant records processed in the campaign and wherein the suspension includes a suspension of executable program fragments of one or more interaction logic templates In an embodiment of the invention, a user suspension of one or more executable program fragments of a running campaign, suspends the execution of the relevant executable program fragments with respect to participant records associated to the campaign by allowing a subset of the executable program fragments to finalize the execution of the respective executable program fragments with respect to participant records at specified participant locations.

It is in particular of relevance to provide for a so-called soft suspension where some of or relevant parts of program fragments according to a predefined suspension routine are still running for a while after a user has suspended the execution of the campaign. This is in particular advantageous with respect to participant records lined up for processing by executable program fragments of one or more interaction logic templates. An illustrative example of such a scenario is when a campaign has been suspended or when specified templates has been suspended and where e.g. mails has already been forwarded to some of the participants guiding them to a relevant landing page. In the present embodiment, a soft suspension in relation to e.g. interaction logic templates would allow participants to make their inputs and the system to register the user input before pausing the further processing of the participant records in question. In this way it may be avoided that participants receives error messages when trying to register e.g. choices or input on a landing page.

In an embodiment of the invention, the subset of executable program fragments either suspends further execution of executable program fragments within respect to relevant participant records or initiates a predefined suspension routine with respect to participant records at specified participant locations, thereby allowing a limited number of executable program fragments subsequent in the process structure to execute prior to a complete suspension of the execution of executable program fragments.

By facilitating a "soft" suspension, it may be possible to ensure that participants are not suddenly experiencing malfunctioning landing pages or other interactions, contrary to a "hard" suspension, as a participant e.g. requested input via a landing page may input the requested input during a soft suspension, the input may be registered as intended by the relevant executable program fragment and then the processing of the participant record may be suspended without giving the participant a bad interactive experience.

In an embodiment of the invention, the participant records comprise a track history logging an executed process sequence of a processing according to said process structure of said participant record.

By registering and keeping the track history it is possible to ensure that a proper resumption of the campaign may be performed, even if the campaign is resumed in another version of the process structure.

In an embodiment of the invention, the participant records comprise a track history logging an executed process sequence of a processing by a given process structure version of said process structure of said participant record.

In a test mode, it may be highly relevant to distinguish between versions of process structures to be tested, and this distinguished should preferably also be reflected in the track history of the participant records forming basis of the campaign when run in test mode.

In an embodiment of the invention, the participant records comprise a track history logging an executed process sequence of a processing by a given process structure version of said process structure of said participant record and wherein the track history registered is referring to the process structure version of process structure.

In an embodiment of the invention, the track history further comprises timestamps for the starting and/or ending of the execution of each executed executable program fragment for said particular participant record.

In an embodiment of the invention, the local participant attribute of a respective participant record is updated at least partly on the basis of the track history of the participant record by an executed program fragment of a process structure.

In an embodiment of the invention, the track history further comprises a log of changes of the participant attributes.

The invention moreover relates to a method of executing a computer implemented campaign management system, the system including a graphical user interface, the management system processing a plurality of participant records according to a user-configured process structure of a plurality of configured logic templates; wherein the participant records comprise participant attributes, and wherein the processing of participant records involves processing or modification of one or more of the participant attributes of the participant record, wherein the management system reads, processes and/or modifies participant attributes of participant records by a sequence of one of more executable program fragments according to the process structure and wherein the execution of one of more executable program fragments can be suspended in response to user action and/or participant action and wherein the execution of the process structure can be resumed in response to user action and/or participant action.

In an embodiment two or more of said participant records are simultaneously associated with the same participant.

By the present disclosure is provided an advantageous solution to the challenge for campaign managing systems to handle when a participant is requested into a campaign several times, e.g. a campaign for marketing, customer service, process control, etc. This situation can occur in several different ways. For example, a campaign may be executed on the basis of clients, leads or contacts from several lists where, for any of many possible reasons, one of the clients exists on two or more of these lists. Prior art systems solve this situation by blocking all doubles as they do not want to or cannot execute the campaign for the same participant more than once. As another example, a campaign may offer a direct or indirect choice between two options to participants, and one of the participants tries to select both offers. Prior art systems solve this by either raising an error, or simply not handling the second choice because a choice was already made, or replacing the first choice by the second choice as the most recent selection by the participant.

The present disclosure provides an advantageous solution in that the present embodiment facilitates several simultaneous participant records associated with the same participant. This is also in the present disclosure referred to as several instances of a participant record associated with a participant. By decoupling the participants from the campaign process by introducing participant records associated with participants, is facilitated that the processing of the campaign can refer to participant records instead of directly to participants. Thereby is provided a technical solution of allowing the same participant to be entered into a campaign several times, even allowing taking different choices, and/or be entered at different stages in the process structure.

In other words, the campaign management system of the present disclosure is configured to create a new instance of a participant record associated with a certain participant and thus continue with two, or more, participant records simultaneously associated with the same participant. This may be occasioned for example by an interaction from the participant, by doubles existing in the base participants lists, by request from a logic template, by request from a user, by discovering two participant records in fact being associated with the same participant, etc.

A further possible advantage of various embodiments is that the campaign management system as configured and controlled by the user, can decide from campaign to campaign, from participant to participant, whether or not to allow re-entry or several instances of participants in the campaign. For many kinds of campaigns, the prior art's inherent blocking of doubles is fine as participants are only wanted through once, and this behavior is also facilitated by the present invention when desired. However, the present invention provides the user with a choice regarding this behavior. The user is with the present invention given the power to decide whether it should allow a participant through a limited or unlimited number of times, whether to proceed with the first or second instance, whether to merge the instances into one, etc.

A further possible advantage of various embodiments of this embodiment is that the processing of the same participant several times through a campaign simultaneously can be conducted asynchronously, as each participant record associated with that participant may be treated like any other participant record, causing less problems if one is being delayed by the participant interactions more than another, etc. This also allows independent manual or automatic interaction with the different instances of the same participant, as they may be processed without interfering with each other.

In an embodiment each of said plurality of participant records comprises a unique participant record identifier and a participant association, and wherein said participant association is equivalent, such as identical, for said two or more of said participant records simultaneously associated with the same participant.

By this advantageous embodiment each participant record has a unique participant record identifier for the campaign management system to process them individually, even though some of them may be associated with the same participant. In particular, two or more of the participant records comprises equivalent, preferably identical, participant associations, which is the technical way to implement that they are associated with the same participant. In an embodiment, the participant associations may be identical because they both use the same participant identifier, e.g. email-address or customer number. In another embodiment, the participant associations may be equivalent because they both refer to the same participant, only by different identifiers, e.g. one using email-address, another using customer number, but master data or participant attributes indicating that they in fact refer to the same participant.

According to the present disclosure, the participant records are identified by a participant record identifier, which is preferably unique within a campaign management system, or at least within a process structure. The participant record identifier may be the participant identifier stored as participant association for associating with a participant, such as email or customer number, but the participant record identifier is preferably an arbitrary unique identifier to keep the association with the participant flexible, and allow for several participant records associated with the same participant. When a container record is used to hold several participant records associated with the same participant, the unique participant record identifier may be implemented as a combination of a container record identifier and a sub-identifier of the individual instances stored in the container record.

In the present disclosure, the participant records each comprises a participant association being a more or less unique identifier of the participant, such as for example an email address, telephone number, customer account number, social media account name, social security number, etc.

In an embodiment two or more of said plurality of participant records have different participant record identifiers and equivalent, such as identical, participant associations.

As described above, the different participant record identifiers but equivalent participant associations facilitate the advantageous individual management of several participant records associated with the same participant of the present invention.

In an embodiment said two or more participant records simultaneously associated with the same participant comprises an equivalent, such as identical, set of global participant attributes.

As the global participant attributes are based on master data about the participant, the global participant attributes of participant records which are associated with the same participant may preferably be equivalent or even identical. In an embodiment, the individual participant records may have their global participant attributes modified individually over the course of a campaign, even though they are associated with the same participant. In another embodiment, the global participant attributes are kept synchronized between the participant records associated with the same participant.

In the present disclosure, a participant attribute denotes a piece of data related to a specific participant record and thereby a specific participant. The participant attributes may be based on master data about the participant, such as global participant attributes, or be defined during campaign design and given a value over the course of the campaign, e.g. by interaction with the participant, such as local participant attributes. The participant attributes may for example identify the participant, provide participant contact interface information to initiate interaction with the participant, receive and store inputs from the participant, store temporary processing data related to the participant, etc.

In the present disclosure, the terms global and local with respect to participant attributes denote the origin, and thereby original availability, of an attribute value in the scope of a campaign. A global participant attribute thus refers to a participant attribute of which the value is retrieved from the master data used to generate the participant record, i.e. retrieved from outside the campaign, so that the global participant attribute comprises a representation of the data or a reference to the data. The master data on which global participant attributes are based are preferably also generally available to other campaigns and any other uses, and may for example be data from a CRM system, social media account, etc. The term global in the present disclosure does not mean that changes to the attribute are necessarily reflected in the originating scope, i.e. in the master data. In a preferred embodiment, changes to the value of a global participant attribute which takes place in the scope of a campaign are not reflected in the underlying master data, unless the value is explicitly written back to the master data by a suitable logic template. In that aspect, a global participant attribute may be considered an instance of master data for the scope of a specific campaign. In case of a global participant attributed storing a reference to master data instead of a copy of the data, any update of the master data will preferably by reflected in the use of the global participant attribute in the campaign.

In an embodiment a second participant record of said two or more of said participant records simultaneously associated with the same participant are created from a first participant record associated with said same participant, such as by cloning or partial copying.

An advantageous way of creating more than one participant record associated with the same participant, is to clone or partially copy an existing participant record, so that more instances of the same participant record are created. Even when cloning, i.e. copying all data to the new participant record, the participant record identifier should be modified to a unique identifier also for the new participant record, in order to facilitate individual processing by the campaign management system. In an embodiment only selected data are copied, at least the participant association and preferably the global participant attributes, whereas local participant attributes may be left uncopied to allow for new and different data establishment during the processing of the new participant record.

The creation of another participant record associated with the same participant by means of copying or cloning is advantageous when the first participant record has been created previously, and the need for another instance only occurs later. For example, only a single participant record is created with association to a certain participant from the beginning of a campaign, but during the course of the campaign, the need for another instance becomes clear, e.g. by interaction with the participant showing a desire to participate in two different ways. In such a situation, the first participant records has already been processed according to a part of the process structure, and this would often be preferable to copy to the new instance, i.e. giving both instances an appearance of identical track histories until the point of cloning, and treat them individually after the cloning.

In an embodiment said first participant record comprises a unique participant record identifier and a participant association to said participant, and wherein said second participant record created from said first participant record, such as by cloning or partial copying, is provided with a unique participant record identifier and with a copy of the participant association of the first participant record.

More technically speaking, the partial copy, or even cloning, of a participant record, involves a new unique participant record identifier to be created, in order to allow individual processing and management. However, to maintain association to the same participant, the participant association should be cloned.

In an embodiment said two or more participant records simultaneously associated with the same participant are created on the basis of master data related to said same participant.

An advantageous way of creating several participant records associated with the same participant, is to create them all on the basis of master data related to that same participant, for example retrieved from one or more databases of master data. According to the present disclosure, this means that all the participant records associated with the same participant comprise the same global participant attributes. The participant records should be provided with individual, unique participant record identifiers, and with equivalent, such as identical, participant associations.

In the present disclosure, master data refers to data external to a campaign, about persons or objects, for example clients or leads in a CRM system, webshop users, conference participants, campaign subjects, subscribers to services, sold, leased or rented products such as cars or other means for transportation, batteries for electric vehicles. Master data may for example comprise identification information, contact information, account information, financial information, interests and sales information. A subset of the master data may preferably be used as basis for a participant record in the form of global participant attributes holding values based on master data or simply referencing master data.

The master data may be stored in one or more data sources of any kind, for example a CRM system of an enterprise, social media datacenters, CSV-files etc. The campaign management system is arranged to access the database of master data to retrieve a subset of master data for a participant record, or it may simply receive the master data as a push request. The database of master data may be stored locally, in central datacenters, cloud storage, etc., and may provide any suitable means of connection for data exchange with the campaign management system.

In an embodiment each of said two or more participant records simultaneously associated with the same participant comprise an identical instance of a selected subset of said master data related to said same participant.

According to a preferred embodiment, the participant records associated with the same participant, all comprise, by value or reference, the same subset of master data related to that same participant.

In an embodiment said two or more participant records simultaneously associated with the same participant comprise different values of local participant attributes.

This is a highly advantageous embodiment, as different instances of the same participant, i.e. different participant records associated with the same participant, may include different data, also referred to as participant attributes. In a preferred embodiment there is no requirement of data coordination between instances of the same participant. Hence, a first participant record associated with a participant may collect certain data related to the participant preferences, whereas a second participant record associated with the same participant may collect completely different data related to the same participant. Whereas master data, and thereby at least the initial value of global participant data, are preferably identical for participant records associated with the same participant, there are no preference regarding the values of local participant attributes. As the local participant attributes are typically modified by the course of the campaign, e.g. by interactions with the participant to store choices and actions, by various kinds of data retrieval possibly based on participant actions, and by other circumstances that may be different from participant record to participant record, it is highly advantageous and preferred to apply no limitations to the difference between local participant attributes of participant records associated with the same participant. This is indeed one of the benefits of an embodiment of the invention, that the same participant can make other choices or follow other configured process sequences in a second or third, etc., journey through the campaign—even while still not having finished the first journey.

In the present disclosure, the terms global and local with respect to participant attributes denote the origin, and thereby original availability, of an attribute value in the scope of a campaign. A local participant attribute thus refers to a participant attribute of which the value is produced during the course of the campaign, possibly generated within the campaign or based on external data not being master data of the campaign. Local participant attributes may comprise template-specific local participant attributes relating to or being relevant only to specific logic templates, e.g. as temporary preserving of events or choices, and campaign-specific local participant attributes generally available and relevant over the course of the campaign to several logic templates, e.g. for consolidating interactions.

In an embodiment said campaign management system is user-configurable with respect to the number of said two or more participant records simultaneously associated with the same participant.

It may be preferred by the user designing a certain campaign using the campaign management system of the present invention, that a limit can be set of how many participant records are allowed to be created for the same participant. For example, a user may only allow the same participant to participate twice, or another set number, in a campaign, such as a lottery, a limited offer, a costly procedure, etc. In another example, such as a customer service system, a product offer, etc., a user may set the allowed number of participations to unlimited. In an embodiment, a different allowed number of participant instances may be set for different participants, for example for different categories of participants, such that for example valued customers and new customers may have different allowed instances in a limited offer, or frequent flyers may have different allowed instances of checked luggage depending on their air mileage.

In an embodiment said two or more participant records simultaneously associated with the same participant comprise track histories of said processing, comprising logs of executed process sequences of said processing of said participant records according to said process structure.

The track histories record the individual processing performed on the individual participant records, including the individual processing of participant records associated with the same participant facilitated by the present invention. As the processing of each participant record is individual, also when associated with the same participant, and as the participant choices and other changing circumstances may cause a different processing of participant records associated with the same participant, this will be reflected in the track histories of the individual participant records. If a part of a track history is identical to several participant records, they may share that part of the track history instead of storing individual copies thereof. This may for example be relevant if a participant record is forked in the middle of campaign, and the two resulting participant records therefore share the track history until the point of forking.

According to the present disclosure, a track history is a part of a participant record, and refers to a logging of an executed process sequence of a processing of that participant record in accordance with the process structure. In other words, the track history is a kind of log which stores the sequence or a reference thereto of executable program fragments that the participant record has been processed by, and preferably includes timestamps and sequence forward points that were used, and possibly other data that may be relevant to be able to report in relation to the executed sequence, such as the development of a value of a participant attribute, which process structure version was used, etc. In an embodiment the values of local participant attributes may recoverable from the track history. The track history is preferably used by the processing engine to determine the next processing step for the participant record, and for embodiments that feature migration of processing between process structure versions, the track history may also be used to control the migration. The track history can also be used for reporting and statistics, such as a live view of past and current state of each participant attribute.

The sequence of executable program fragments that has actually been executed with respect to a specific participant record is denoted an executed process sequence, and is stored in the track history for that specific participant record. An executed process sequence thus corresponds to one of the configured process sequences of the process structure, or to a part thereof if the processing has not yet finished.

In an embodiment said two or more participant records simultaneously associated with the same participant are different by at least one of said track histories and said local participant attributes.

By processing the participant records individually even when associated with the same participant, they will in many cases lead to different track histories and/or different local participant attributes.

In an embodiment the executed process sequence of said two or more participant records simultaneously associated with the same participant are different.

By processing the participant records individually even when associated with the same participant, they will in many cases lead to different executed process sequences.

In an embodiment said two or more participant records simultaneously associated with the same participant are processed asynchronously by said campaign management system in accordance with said process structure.

Thereby a technically advantageous embodiment is achieved, as the individual instances can be treated individually, and not interfere with each other, for example not delaying each other. This may be very advantageous when manual, such as human, interactions are involved, e.g. interaction with a participant being a person. For example, the delay before a participant responds to an email may be days or weeks.

In an embodiment said campaign management system is configured to merge said two or more participant records simultaneously associated with the same participant into one participant record associated with said participant.

This embodiment provides an advantageous solution to consolidating several participant records associated with the same participant, if several parallel processings of the same participant are impossible, undesired, or simply do not make sense at a certain stage. The merging may comprise comparing the global participant attributes and the local participant attributes of the different participant records, and decide which should be maintained in the merged participant record. The track histories are preferably all maintained in the merged participant record with indication of which individual participant record they relate to, or one of the track histories may be selected for keeping. In an embodiment the individual different participant attributes may also all be kept with indications of which individual participant record they relate to.

In an embodiment an additional participant record associated with the same participant as an existing participant record is created in response to an interaction by said same participant.

This advantageous embodiment of the invention allows the interactions of a participant to cause the creation of another instance of the associated participant record. This may for example be relevant when the participant is offered several options, and the participant desires to make use of two or more of these options. In order for the campaign management system to process these two or more options in parallel, without requiring the participant to start over when finishing the first option, the present invention provides for a creation of another participant record associated with the same participant, also referred to as forking of the participant record. This kind of creation may preferably be conducted by an interaction logic template according to the present disclosure, and may preferably involve a cloning or partial copying of the existing participant record.

Other embodiments may comprise the creation of another participant record associated with the same participant to be performed in response to a request from a logic template, or in response to a request from a user of the campaign management system, and may involve a cloning or partial copying of the existing participant record, or a creation based on master data related to the participant.

Other embodiments may comprise the creation of another participant record associated with the same participant to be performed in response to a discovery that two existing participant records in fact are associated with the same participant. This may for example happen if the two participant records uses different categories of participant associations, e.g. one using email address and the other using customer number. In that case, one of the participant records may change the participant association to be identical to the other, or the campaign management system may register the equivalence of the one participant association, e.g. email address, with the other participant association, e.g. customer number.

In an embodiment an additional participant record associated with the same participant as an existing participant record is created by an injection logic template.

According to the present disclosure, an injection logic template is a category of logic templates for managing the injection of participants into a campaign. The executable program fragments of injection logic templates are arranged to create participant records, including creating global participant attributes from master data when relevant, and preferably to detect and manage situations where a particular participant to be injected already has a related participant record in the same campaign. The injection logic templates are different from other categories of logic templates because their executable program fragment can be executed without reference to a specific participant record, as it is the injection logic template which creates the participant record.

In an embodiment an additional participant record associated with the same participant as an existing participant record is created by an interaction logic template.

According to the present disclosure, an interaction logic template is a category of logic templates for interacting with the participant related to the specific participant record processed. The executable program fragments of interaction logic templates are arranged to establish or facilitate a communication with the participant. Various interaction logic templates may implement different kinds of communication, e.g. email, smartphone push messages, QR codes, web forms, etc. The executable program fragment of interaction logic templates may be arranged to accommodate different outcomes and error situations related to the kind of communication that they implement, such as receiving input from participant, handling communication errors, detecting absence of reaction after a timer expiration, etc. Thereby an interaction logic template may often be more complex in its implementation and configuration than other categories of logic templates.

As an interaction logic template may allow selection of more than one sequence forward point, i.e. more than one configured process sequence, e.g. by allowing the participant to click on several links, select several options from a list, select the same option twice, etc. it may require the possibility to create additional participant records related to the same participant to pursue each of these selections. This mechanism may also be referred to as forking the participant record.

In an embodiment an additional participant record associated with the same participant as an existing participant record is created by a decision logic template.

According to the present disclosure, a decision logic template is a category of logic templates for performing selection, filtering, etc., or otherwise decide a sequence forward point based on various criteria, participant attributes, external data or event, etc. The selection may be based on interaction with a participant, and/or based on other input, data or randomly. A decision logic template may for example select a configured process sequence based solely on user editable parameters, i.e. configuration of the logic template, for example in the case of random A/B branching. Other decision logic templates may use the current participant attributes, for example to make branching based on ranges of values, e.g. age, geographic location, sales amount, etc., or use external data such as current weather condition at the participant's address, cloud data, social media data, e.g. 'likes', etc. Different decision logic template types may for example include branching decision logic templates, exclusion decision logic templates, parallelization decision logic templates, pass decision logic templates, time decision logic templates, manual decision logic templates and AI decision logic templates.

As a decision logic template may allow selection of more than one sequence forward point, i.e. more than one configured process sequence, it may require the possibility to create additional participant records related to the same participant to pursue each of these selections. This mechanism may also be referred to as forking the participant record.

In an embodiment said process structure comprises a plurality of configured logic templates.

In the present disclosure, logic templates are the active building blocks of a process structure of a campaign. A logic template comprises an executable program fragment defining and implementing its action(s) and user editable parameters to configure it. Different categories of logic templates may be provided, for example injection logic templates to inject participants in a campaign by generating participant records, interaction logic templates to perform interactions with the participant, decision logic templates to perform selection, filtering, etc., and data logic templates to perform data operations such as serialization/deserialization, import/export of data from/to master data or third party systems, changing attribute values, etc.

In the present disclosure, a configured logic template refers to a logic template which has been configured for a particular campaign and process structure by editing the user editable parameters to the extent necessary for achieving the intended functionality in the process structure. This may for example involve setting various initialization parameters, filter criteria, references to participant attributes and campaign attributes, definition of sequence forward points, etc. Some logic templates, in particular ones with simple functionality, may be preconfigured by default values or not need any configuration to function, and are thus considered configured logic templates as soon as they are placed into a process structure.

In the present disclosure, an executable program fragment denotes a piece of code that can be executed to perform one or more actions with respect to a specified participant record. Each logic template comprises an executable program fragment which is configured, e.g. by software programming and/or hardware circuits, to perform the special function or several functions related to that logic template. The executable program fragments are preferably configured to rely on a configuration established by the user editable parameters, and further to rely on one or more specific participant records. An executable program fragment may also be configured to further rely on external data, e.g. data retrieved from a webservice such as weather data, event booking data, etc. The executable program fragments of the various logic templates are configured to be executed in a sequence relative to each other as determined by the processing engine on the basis of the process structure.

In the present disclosure, user editable parameters are the user-configurable part of logic templates, thereby configuring how the executable program fragments of the logic templates process the participant records. A logic template where a required minimum of the user editable parameters have been appropriately adjusted for a particular campaign is also referred to as a configured logic template. The user editable parameters may for example relate to criteria such as ranges, thresholds, comparison values, filters, values, etc., selection or configuration of optional features of the executable program fragment, configuration of settings, default values, predefined values, etc., to influence and configure the execution of the executable program fragment in relation to a participant record. The user editable parameters may refer to data available in the participant record, i.e. participant attributes, as subject of comparison, selection, etc., and/or referencing campaign attributes of the process structure, i.e. common data generally available for all participant records processed by a particular process structure. In an embodiment a reference to a non-existing participant attribute or campaign attribute in a user editable parameter may cause automatic creation of such participant attribute or campaign attribute. The user editable parameters may allow the user to create further options for the executable program fragment to select from based on user-definable criteria, and automatically generate sequence forward points corresponding to the created further options.

In an embodiment said process structure comprises a number of configured process sequences defined by couplings of said configured logic templates.

According to the disclosure, configured process sequences denote the possible sequences through the process structure, defined by the couplings of logic templates in the graphical user interface. In other words, each configured process sequence defines a possible way of execution of participant records through a campaign or other process. Each branch or rejoin of graphical connections and graphical sequence connection points, and each possible process feedback from a forward point of a logic template back to the receive point of the same logic template, possible via other logic templates, results in a different configured process sequence. As the user editable parameters are a significant part of configuring the possible connection points of the logic templates, they thereby also in practice facilitate the possible couplings and thereby the possible configured process structures.

In an embodiment the configured process sequences are user-defined in a graphical user interface of said campaign management system.

Thereby an advantageous embodiment is provided, as the campaign management system provides a highly user friendly and intuitive procedure for defining a process structure with configured logic templates, thereby forming configured process sequences.

The graphical user interface is configured to allow the user of the campaign management system to build and illustrate a process structure and configure individual logic templates, by presenting graphical elements, graphical connections, etc., on a screen, and facilitating interaction with the graphical elements and connections, etc., by input from the user e.g. by computer mouse, keyboard, touch gestures, etc.

In an embodiment said campaign management system is arranged to perform said processing of said participant records being associated with said participants, such as persons or tangible objects, so that said processing of a participant record according to said process structure thereby causes a configured process sequence to be executed with respect to said participant being associated with said participant record.

In other words, the processing of a participant records follows a configured process sequence, though an advantageous feature of the present invention is that it is not predefined which particular configured process sequence is followed. However, a number of configured process sequences are defined, and over the course of processing it turns out which one is followed in a particular processing. The selections that decide the particular configured process sequence may for example be results of interactions with the participant, other data input, or other circumstances.

In an embodiment said campaign management system is arranged to perform said processing of said two or more of said participant records being simultaneously associated with the same said participant, so that said processing of said two or more participant records according to said process structure thereby causes execution of configured process sequences two or more times with respect to said same participant being associated with said two or more participant records.

A configured process sequence is also followed by each of the different instances of the same participant, i.e. by the individual of the two or more participant records associated with the same participant. In other words, if there are three participant records associated with the same participant, they will each be processed according to configured process sequences, so that three configured process sequences, same or different, are processed.

In an embodiment said execution of configured process sequences two or more times with respect to said same participant includes execution of two or more different configured process sequences.

According to an advantageous embodiment, the configured process sequences followed by different instances of the same participant, i.e. by individual of the two or more participant records associated with the same participant, are different. This reflects that the inputs, for example participant interactions, may often be different from participant record to participant record, even though it is the same participant, for example when the reason for participating several times is indeed to make different selections and thereby take different paths, i.e. configured process sequences.

In an embodiment said campaign management system comprises a plurality of graphical elements each associated with one of said configured logic templates; and said graphical user interface is arranged to display said graphical elements.

In the present disclosure, a graphical element is a representation of a logic template in the graphical user interface. It may preferably be interactive for the user to drag-and-drop, relocate, and otherwise interact with the configuration of the related logic template, etc. Graphical elements are connectable by graphical connections.

In an embodiment said configured logic templates comprise user editable parameters being editable using the graphical user interface and an executable program fragment being executable on the basis of said user editable parameters and one or more of said participant records.

In the present disclosure, user editable parameters are the user-configurable part of logic templates, thereby configuring how the executable program fragments of the logic templates process the participant records. A logic template where a required minimum of the user editable parameters have been appropriately adjusted for a particular campaign is also referred to as a configured logic template. The user editable parameters may for example relate to criteria such as ranges, thresholds, comparison values, filters, values, etc., selection or configuration of optional features of the executable program fragment, configuration of settings, default values, predefined values, etc., to influence and configure the execution of the executable program fragment in relation to a participant record. The user editable parameters may refer to data available in the participant record, i.e. participant attributes, as subject of comparison, selection, etc., and/or referencing campaign attributes of the process structure, i.e. common data generally available for all participant records processed by a particular process structure. In an embodiment a reference to a non-existing participant attribute or campaign attribute in a user editable parameter may cause automatic creation of such participant attribute or campaign attribute. The user editable parameters may allow the user to create further options for the executable program fragment to select from based on user-definable criteria, and automatically generate sequence forward points corresponding to the created further options.

In the present disclosure, an executable program fragment denotes a piece of code that can be executed to perform one or more actions with respect to a specified participant record. Each logic template comprises an executable program fragment which is configured, e.g. by software programming and/or hardware circuits, to perform the special function or several functions related to that logic template. The executable program fragments are preferably configured to rely on a configuration established by the user editable parameters, and further to rely on one or more specific participant records. An executable program fragment may also be configured to further rely on external data, e.g. data retrieved from a webservice such as weather data, event booking data, etc. The executable program fragments of the various logic templates are configured to be executed in a sequence relative to each other as determined by the processing engine on the basis of the process structure.

In an embodiment the graphical elements are couplable using said graphical user interface by a user, the coupling defining a process structure of said executable program fragments of said configured logic templates in relation to said participant records.

In an embodiment said process structure and said participant records for processing by said process structure represent a campaign.

In an embodiment the participant records comprise participant attributes being processable by said executable program fragments of said configured logic templates according to said process structure.

In the present disclosure, a participant attribute denotes a piece of data related to a specific participant record and thereby a specific participant. The participant attributes may be based on master data about the participant, such as global participant attributes, or be defined during campaign design and given a value over the course of the campaign, e.g. by interaction with the participant, such as local participant attributes. The participant attributes may for example identify the participant, provide participant contact interface information to initiate interaction with the participant, receive and store inputs from the participant, store temporary processing data related to the participant, etc.

In an embodiment one or more campaign attributes are associated with said process structure.

Some data may be relevant across all participants of a campaign, and such data are referred to as campaign attributes. Campaign attributes may for example be useful when exactly one object is needed to coordinate actions across the campaign. This may for example be initialization data for the campaign, general settings and configuration of the campaign, or a value that is shared between all participants, e.g. the number of prizes in a lottery, the number of seats at an event, the current leader of a collection, etc. In other words, the campaign attributes may in an aspect be considered 'singletons' in the scope of a campaign. In embodiments features two or more process structure versions, the campaign attributes may be managed individually for each version, or also here be managed as singletons across versions.

In an embodiment said participant records store participant contact interface information associated with participant contact interfaces; said participant contact interface information comprises at least one of an email-address, a telephone number, a social media account name, a street address, an IP-address, a MAC-address, an advertising identifier or a participant identifier.

In the present disclosure, a participant contact interface is referring to any interface to interacting with a participant being a person or an object. Such interfaces may e.g. be email client, telephone, message service interface, social media interface, geographical address for postal services or physical meeting, a communication client on a computer, smartphone or other connected device, etc.

In the present disclosure, a participant contact interface information is information enabling establishing a communication through a participant contact interface, e. g. email-address, a telephone number, a social media account name, a street address, an internet address or other network address e.g. IP-address, a device address e.g. MAC-address or advertising identifier, or a participant identifier. The participant contact interface information may for example be stored as a global participant attribute or local participant attribute in the participant record.

In an embodiment said participant attributes comprise global participant attributes derived from said master data, and preferably initialized together with said participant record.

In an embodiment said participant attributes comprise local participant attributes.

In an embodiment said global participant attributes are defined across a plurality of campaigns defined by different respective process structures, and wherein said local participant attributes are defined for a subset of said plurality of campaigns CAM).

When a campaign management system according to the present disclosure operates two or more campaigns each having their own process structure, the global participant attributes may be common to all or several of the campaigns. This may for example include name and contact information for the participants, which will be relevant in most, if not all, campaigns. Other information, in particular the data stored as local participant attributes, is more campaign-specific, and is therefore typically not shared among a lot of campaigns, and in particular a campaign may typically include at least one user-defined local participant attribute which does not exist in any of the other campaigns of the campaign management system. It is noted, that new versions of process structures relating to the same campaign, e.g. by updating a process structure in a design mode which naturally leads to several equal local participant attributes in both versions, are considered as one campaign within this disclosure.

In an embodiment one or more of said local participant attributes are template-specific local participant attributes related to a specific configured logic template.

In the present disclosure, a template-specific local participant attribute is a local participant attribute which relates to or is relevant only to specific logic templates, e.g. as temporary preserving of events or choices. The relation to a specific logic template may in an embodiment also imply a scope of availability being restricted to the specific logic template.

By applying local participant attributes in relation to one or more given logic templates it is not necessarily given that the local participant attributes are only defined in the participant record when it is available for processing according to a specific adapted logic template. It may typically imply that the local and global participant attributes contained in a participant record intended for a user-defined campaign include all attributes relevant for the processing of the participant record during its journey. A participant record of one campaign may thus include some global participant attributes derived from the master data and another participant record used in relation to another campaign may include other global participant attributes, still derived from the same master data. The same applies for the local participant attributes as these may be established differently in number and meaning in different campaigns.

In an embodiment one or more of said local participant attributes are campaign-specific local participant attributes available to several configured logic templates of said process structure.

In the present disclosure, a campaign-specific local participant attribute is a local participant attribute which is generally available and relevant over the course of the campaign to several logic templates, e.g. for consolidating interactions. By providing local participant attributes which are available to more than one logic template, preferably to any logic template, of the process structure, i.e. of a specific campaign, it is possible to track information, participant interaction, counters, etc., across the various logic templates. This may for example be an advantageous way of storing campaign specific participant preferences, without requiring export of the information to the master data. In that sense, the local participant attributes may also be considered temporary as compared to master data.

In an embodiment one or more of said local participant attributes is a user-defined or user-named variable.

The user may configure local participant attributes of different data types and provide user-defined variable names for reference in the process structure, e.g. in different logic templates. According to the present invention, local participant attributes may be variables which can be named/defined by the user, thereby allowing the user to assign meaning to the local participant attributes. From a technical point of view, it allows the user to name/define variables and use them in one process structure together with the global participant attributes originating from master data, and define/name variable differently in another process structure. Thereby the variables that are only relevant for a specific process structure, does not have be implemented in the master data or be directly transferrable to other process structures. This may reduce confusions and contamination with respect to the master data, and improve the ability of the user/designer to manage and use the attributes available in a specific campaign. This makes embodiments of the present invention more robust and agile across different process structures.

In an embodiment the graphical user interface is configured with an interface for the user to create or configure a local participant attribute and wherein the user may configure the local participant attribute by selecting at least one of a user-defined attribute name and a predefined attribute type.

Local participant attribute may in an advantageous embodiment simply be created and configured by a user through the graphical user interface, and allowing the user to define the name and datatype. According to the present disclosure, participant attribute type generally refers to the data type of a participant attribute. This may be simple base data types such as Boolean, integer, float, etc., and may in various embodiments also be built-in or user-defined complex data types or structures such as arrays, format validated data fields like telephone numbers or email addresses, enumerations, structures of same or different datatypes like addresses, images, documents, etc.

In an embodiment a logic template is configurable by the user for establishment of a local participant attribute and wherein the user may configure the local participant attribute by providing a user-defined name to the local participant attribute when configuring the logic template.

The logic template which is configurable by the user for establishment of a local participant attribute is according to an advantageous embodiment simply configured by a user activation of a graphical element referring to the relevant logic template to be configured and the user then type a name in a field predefined for naming of a new local participant attribute.

In an embodiment a logic template is configurable by the user for establishment of a local participant attribute and wherein the user may configure the local participant attribute by providing a user-defined name to the local participant attribute when configuring the logic template and wherein the local participant attribute is established by selecting one of a number of predefined attribute types.

The logic template which is configurable by the user for establishment of a local participant attribute is according to an advantageous embodiment simply configured by a user activation of a graphical element referring to the relevant logic template to be configured and the user then type a name in a field predefined for naming of a new local participant attribute and select one of a predefined attribute types.

In an advantageous embodiment of the invention a configurable logic template may be configured by means of a graphical user interface where the user interface facilitates typing of the desired name of an attribute to be applied in the campaign about to be designed. The graphical facilitation of such a naming may e.g. be obtained by means of a text editor and typography dedicated for the definition of a new local participant attribute. The text editor may e.g. activated though the configurable logic template during the configuration of template. An alternative approach could also be a configurable logic template comprising dedicated predefined fields where a user may input end thereby define the name of the local participant attribute.

The data type of the named local participant attribute may be established in the same way when configuring the relevant logic template and the user may be assisted by offering one or more predefined selectable data types.

When a local participant attribute has been defined during a configuration, the local participant attribute may be applied during the execution of the specific campaign. In this way, the user defining the campaign may not only rely on the master data for use in the configuration of the campaign but may also add further attributes without requiring such data to be present or being modelled in the master data. This adds an agility and dynamic not hitherto provided in any campaign management system. A local participant attribute may thus be defined and used in one campaign only in relation to the participants affected or specified for the present campaign.

Advantages related to this way of technical implementation a campaign are many. Two advantages include:

The user defining the campaign may have less or little knowledge to the general corporate data base as such data bases tends to grow very complex in large business and that an extreme control and maintenance of data models in such data bases must be applied in order to ensure that data fields are perceived and maintained correctly.

The option of defining local participant attributes makes it possible to provide a campaign management system which offers are high degree of privacy. The system may e.g. be programmed to disallow use of local participant attributes across campaigns. This means that the data flow, specifically the data obtained through interaction with a participant in one campaign may be contained in this specific campaign. An important point if allowing a certain degree of cross-campaign use it is completely easy to designate, find or delete such data. A participant may thus request information about which data are contained within the campaign management system as it is very easy to restrict or monitor cross-campaign use.

In an embodiment a user defined local participant attribute is used to contain data related to interaction with specific participants.

In an embodiment each configured logic template comprises at least one sequence connection point, each sequence connection point being a sequence receive point or a sequence forward point.

The logic templates are configured to be processed in sequence, and the possible sequences available in a campaign are defined by the process structure, the so-called configured process sequences. In order to define the possible sequences of logic templates, the logic templates may preferably comprise sequence connection points to facilitate combining them into possible sequences. A logic template may preferably comprise a sequence receive point referring to the availability to define the logic template as a subsequent step in a process, i.e. receiving the duty of processing from a previous logic template in a sequence. A logic template may further preferably comprise one or more sequence forward points in order to pass the processing duty on to a subsequent logic template in a sequence.

In other words, the sequence connection points are considered an advantageous means for the definition of process sequences, as well as an advantageous means for an intuitive and user-friendly graphical representation and graphical editability of the process structure versions.

In the present disclosure, a sequence receive point refers to the availability to define the logic template as a subsequent step in a process, i.e. receiving the duty of processing from a previous logic template in a sequence. Most logic templates comprise a sequence receive point, but some kinds of logic templates, in an embodiment in particular injection logic templates, may not need a sequence receive point as they are configured to be the start of a process sequence and create the participant records.

In the present disclosure, a sequence forward point is a type of sequence connection point, and the one or more sequence forward points of a logic template define the one or more options a logic template has of passing the processing duty on to a subsequent logic template in a sequence, or in other words, the one or more outcome states that a logic template provides. For example, a logic template that performs a random A/B split, may have two sequence forward points, one for the A outcome, and one for the B outcome, or a participant interaction logic template may have sequence forward points related to the different choices made available to participant as part of the interaction, and further sequence forward points for various reasons that no interaction was performed.

In an embodiment one or more of said configured logic templates comprises a plurality of sequence forward points.

Providing several sequence forward points of the same one logic template may enable different possible configured process sequences, as it allows the choice of different subsequent logic templates, i.e. different sequences.

In an embodiment said graphical elements comprise graphical indications of said sequence connection points of said associated configured logic templates.

The graphical indications of the logic templates' sequence connection points provide an advantageous means for an intuitive and user-friendly graphical representation and graphical editability of the process structure.

In an embodiment said coupling of said graphical elements using said graphical user interface comprises one or more graphical connections of a sequence connection point being a sequence forward point of a graphical element with a sequence connection point being a sequence receiving point of the same or a different graphical element.

When designing a campaign in the graphical user interface, the graphical elements representing the individual logic templates are getting connected by graphical connections. The graphical connections thereby become the definition of the process structure, together with the configurations made to the individual logic templates. Several logic templates may preferably have a plurality of sequence forward points, and for such logic templates, each graphical connection is preferably connected to a specific sequence forward point, in order to facilitate different connections for the different sequence forward points of a logic template. Likewise, in an embodiment providing a plurality of sequence receive points for a logic template, the graphical connections are connected to specific such sequence receive points. In other words, the graphical connections preferably bind specific sequence forward points to specific sequence receive points, and are used by the user to define and illustrate the various configured process sequences, and thereby indirectly by the processing engine to determine the sequence of execution of executable program fragments and related configurations.

The graphical connections may preferably have one start point and one end point, such as a straight line, a curve, a poly-line, etc., thereby allowing connecting one sequence forward point to one sequence receive point. A sequence forward point may in some embodiments be connectable to a sequence receive point of the same logic template or a previous logic template in the sequence, thereby establishing the possibility of a process flow loop. From a graphical point of view, any sequence forward point may be connectable to any sequence receive point. However, in a preferred embodiment, certain logic templates may be configured to only allow connections to certain other logic templates, not allow process flow loops, or other limitations on the connectability of the sequence connection points.

In an embodiment said user editable parameters of a configured logic template, when edited by said user, form a configuration of said executable program fragment of said configured logic template.

The user editable parameters editable to configure the executable program fragment may for example relate to criteria such as ranges, thresholds, comparison values, filters, values, etc., selection or configuration of optional features of the executable program fragment, configuration of settings, default values, predefined values, etc., to influence and configure the execution of the executable program fragment in relation to a participant record. The user editable parameters may refer to data available in the participant record as subject of comparison, selection, etc. A logic template where a required minimum of the user editable parameters have been appropriately adjusted for a particular campaign is also referred to as a configured logic template. For some logic templates the required minimum of user editable parameters to be adjusted before the logic template is considered a configured logic template is zero; meaning that some logic templates may not require configuration but works directly from their generic state.

In an embodiment one or more of said sequence forward points of a configured logic template is created based on user configuration of said user editable parameters.

In an embodiment one or more of said user editable parameters of a configured logic template, when edited by said user, defines one or more of said sequence connection points of said configured logic template, preferably one or more of said sequence forward points.

In a preferred embodiment some or all logic templates may allow user-definable sequence connection points, whereby the user may create sequence connection points, in particular sequence forward points, by editing the user editable parameters. For example, the user editable parameters may allow the user to create further options for the executable program fragment to select from based on user-definable criteria, and automatically generate sequence forward points corresponding to the created further options. For example, a decision logic template may allow the user to create a number of possible options for the executable program fragment to select from based on corresponding user-created criteria, for example a decision logic templates which determines which user-defined range a certain value from the participant record, e.g. a participant attribute, belongs to, and creates a sequence forward point for each user-defined range. This example may for example be used to group participants into different age-ranges, performance ranges, geographical areas, etc. In another example, an interaction logic template may allow the user to create a number of possible reply options for the participant in response to the communication performed by the interaction logic template, and create a sequence forward point for each user-defined reply option. This example may for example be used to group participants according to their input, e.g. selection of a preference, affirmative answer to a question, etc.

In an embodiment said executable program fragment of a configured logic template is configured to select one of said one or more sequence forward points of said configured logic template.

At the end of the execution of the executable program fragment of a configured logic template based on a particular participant record, a particular one of the available sequence forward points of that logic template has been selected in accordance with the role of the logic template, and based on the user editable parameters and data referenced thereby. For example, a certain sequence forward point may be selected in dependency of a participant reply to a communication configured by the user editable parameters, or a selection of several options based on participant attribute criteria or for example the weather report configured by the user editable parameters. In case the logic template is configured to fork a participant record, i.e. create another participant record associated with the same participant as an existing participant record, for example in a logic template where a participant can select two or more options having different sequence forward points, or where the logic template is configured to fork the participant record as decided by the user of the campaign management system, the executable program fragment may be configured to select more than one of the sequence forward points, and then create the required corresponding number of participant records to proceeds along the more than one sequence forward point.

In an embodiment said configured process sequences of said process structure is defined by said graphical connections between said sequence forward points and said sequence receive points of said configured logic templates.

This advantageous embodiment provides for a graphical building of process structure which may thereby be highly user friendly and provide an intuitive overview the process structure.

In an embodiment said plurality of logic templates comprises injection logic templates and said executable program fragments of said injection logic templates are arranged to create participant records on the basis of master data.

According to the present disclosure, an injection logic template is a category of logic templates for managing the injection of participants into a campaign. The executable program fragments of injection logic templates are arranged to create participant records, including creating global participant attributes from master data when relevant, and preferably to detect and manage situations where a particular participant to be injected already has a related participant record in the same campaign. The injection logic templates are different from other categories of logic templates because their executable program fragment can be executed without reference to a specific participant record, as it is the injection logic template which creates the participant record. The master data from which the global participant attributes are derived, may be any kind of data about a participant, with or without explicit identification. It may for example be master data from a client database or similar, but also data from CSV files, imports from a REST Service, information gathered from the participant doing a QR-Scan or a website call possibly leaving only an IP address or device identification, etc.

In an embodiment said create participant records comprises, for each created participant record, defining and initializing global participant attributes of said participant record as said instance of said selected subset of master data related to said participant to establish said association of said participant record with said participant.

The initialization of the global participant attributes as an instance of a subset of master data may for example comprise declaring global participant attribute variables corresponding to the data fields in the selected subset of master data, and initializing them by copying the data from master data to thus corresponding global participant attributes or storing a reference to the master data instead of the data themselves. In another embodiment, the global participant attributes do not correspond directly in value and datatype to data fields of the master data one to one, but are still arranged to establish an instance of the information of the selected subset of master data by a number of global participant records, e.g. by combining data fields into one global participant attribute, using different datatypes, etc.

In an embodiment said participant contact interface information is derived from said selected subset of master data related to said participant and stored in said participant record as a global participant attribute.

In many use cases, the master data, e.g. CRM system comprising data about clients or leads, also typically comprises contact information for the persons or objects for which participant records are being created by the injection logic template. In such use case, the participant contact interface information may preferably be retrieved from the master data for use in the process structure, in particular in interaction logic templates with the role of establishing communication with the participants. The retrieving of data from the master data may include copying, possibly with processing, or storing a reference to the master data instead of the data themselves.

In an embodiment said injection logic template is arranged to retrieve said selected subset of master data from one or more databases of master data.

The campaign management system of the present invention may be integrated with enterprise systems such as CRM systems, e.g. implemented in SAP systems, SQL systems, cloud systems, e.g. Marketing Cloud by Salesforce, Microsoft Dynamics 365 CRM, etc. The campaign management system may also be implemented as a separate stand-alone system having access to master data from a third party CRM system and/or other databases, e.g. social media accounts, webshop databases, web provided information, etc.

In an embodiment said plurality of logic templates comprises one or more decision logic templates and said executable program fragments of said decision logic templates are arranged to select a configured process sequence defined by said process structure for a participant record.

According to the present disclosure, a decision logic template is a category of logic templates for performing selection, filtering, etc., or otherwise decide a sequence forward point based on various criteria, participant attributes, external data or event, etc. The selection may be based on interaction with a participant, and/or based on other input, data or randomly.

In an embodiment said selection of a configured process sequence does not involve an interaction with said participant.

The decision logic templates can be considered to select a configured process sequence for a particular participant record without the requirement of interaction with the particular participant associated with the particular participant record.

In an embodiment said selection of a configured process sequence is based on one or more of current values of participant attributes, user editable parameters, external data or master data, or any combination thereof.

A decision logic template may for example select a configured process sequence based solely on user editable parameters, i.e. configuration of the logic template, for example in the case of random A/B branching. Other decision logic templates may use the current participant attributes, for example to make branching based on ranges of values, e.g. age, geographic location, sales amount, etc., or use external data such as current weather condition at the participant's address, cloud data, social media data, e.g. 'likes', etc.

In an embodiment said decision logic template is selected from the list of: branching decision logic templates, exclusion decision logic templates, parallelization decision logic templates, pass decision logic templates, time decision logic templates, manual decision logic templates, AI decision logic templates.

Manual decision logic templates select a configured process sequence based on input from e.g. campaign manager, supervisor, sales person, user, etc. For example, a salesperson having knowledge about the participants may be asked by the campaign system which configured process sequence to proceed with for a certain participant record. Another advantage of the manual decision logic template is that the process can be maintained in both time and choice of sequence with manual interaction, thereby providing human intelligence to the execution of the process structure.

In an embodiment the process structure comprises two or more process structure versions and wherein said campaign management system is configured to migrate said processing of said participant records between said two or more process structure versions on the basis of said track histories and said two or more process structure versions.

By the present disclosure is provided an advantageous solution to the challenge of having a running campaign which the user would like to be able to adjust or evolve further, but numerous participants are already in the existing, running campaign probably at different steps and with different choices made, thereby making it practically impossible to change the existing campaign. This embodiment ensures that all participant records have track histories of their processing in the campaign, and on the basis of these track histories, and knowledge about the process structure, provides for a migration of the processing of participant records from one version of the process structure, i.e. campaign, to another version of the process structure.

When there are more than one process structure version, the campaign management system, for example by means of a processing engine, may determine whether or not to perform a migration of processing to a different process structure version. In particular if a newer process structure version exists, and it includes the same configured logic template which is determined as the next configured logic template to execute, i.e. that logic template being a common configured logic template, the processing may advantageously be migrated to the newer process structure version.

A campaign management system offering migration, may process a participant from an old version in a new version while retaining the state of choices made, interactions, etc., between the version. The migration may be an intelligent migration so that the participant is migrated at an appropriate time and state with respect to the differences between the old and new version, the choices made, etc.

In particular for embodiments according to the present disclosure allowing several participant records related to the same participant to co-exist in campaign, the several participant records related to the same participant may also exist in different versions of a campaign, i.e. process structure versions, and be migrated to another version, even if that version already includes a participant record related to that participant.

In an embodiment each of said two or more process structure versions comprises at least one configured logic template being a common configured logic template common with at least one other of said two or more process structure versions.

By common configured logic template is referred to a configured logic template that is present in two or more process structure versions. As different process structure versions may define different possible experiences, events, actions, etc. and/or different ways or criteria to reach the different points, the common configured logic templates represent points in the process structure which exist in at least one other version, and thereby forms a matching position in terms of process flow. The common configured logic template is preferably configured substantially similar in both versions. However, a configured logic template can be a common configured logic template even if configured differently in the two or more process structure versions to which it is common. For example, a new process structure version may be different from an earlier process structure version by having changed filter criteria of a logic template, added options, e.g. sequence forward points, of a logic template, etc., but such logic template is still considered a common configured logic template for the two process sequence versions despite of the difference in configuration. On the other hand, a logic template that only exists in one of the versions, or has been significantly reconfigured, such as by removing sequence forward points or local participant attributes, cannot be a common configured logic template to the two versions. The subsets of configured logic templates that is used in the different process sequence versions thus overlap by at least one, and often several, common configured logic templates. In other words, a common configured logic template represents a similar functionality in two or more versions of a campaign. A common configured logic template thereby also determines an advantageous position in the process sequence for the processing of a participant record to be migrated from one version to another, as the functionality at that location in the processing sequence is substantially the same or at least overlapping.

In an embodiment said two or more process structure versions each comprises a subset of said plurality of configured logic templates.

Among all the configured logic templates comprised by the campaign management system, some or all of them are used in each process structure version.

In an embodiment said subsets of said plurality of configured logic templates are different.

The process sequence versions are different because they consist of different subsets of configured logic templates. In an embodiment, the difference need only be in the configuration of a configured logic template, i.e. the user editable parameters, meaning that two process structure versions may consist of the same logic templates, as long as there is a difference in configuration, e.g. when the campaign is changed only by adjusting a user editable parameter such as a threshold, a participant filter, etc. In an embodiment the differences may be in the types of configured logic templates, e.g. when a campaign has been changed by replacing a configured logic template with one of a different type. In an embodiment the differences may include a different number of configured logic templates, e.g. when the campaign has evolved by adding further logic templates to the configured process sequences.

The present invention advantageously provides for a migration of processing between such different process structure versions.

In an embodiment said two or more process structure versions are graphically defined, preferably by a plurality of graphical elements associated with said plurality of configured logic templates, respectively, and being couplable by graphical connections using a graphical user interface by a user, the couplings defining the process structure of said executable program fragments of said logic templates in relation to said participant records.

The graphical editability of the process structure may preferably be provided by arranging the graphical user interface to allow the user to connect graphical elements associated with logic templates by means of graphical connections, and providing an interface for editing the user editable parameters to configure the logic templates. The same graphical user interface may allow the user to define several process structure versions simultaneously or one at a time, by replacing or adding logic templates, changing and adding graphical connection, changing configurations of logic templates, etc.

The graphical user interface is configured to allow the user of the campaign management system to build and illustrate a process structure and configure individual logic templates, by presenting graphical elements, graphical connections, etc., on a screen, and facilitating interaction with the graphical elements and connections, etc., by input from the user e.g. by computer mouse, keyboard, touch gestures, etc.

In the present disclosure, a graphical element is a representation of a logic template in the graphical user interface. It may preferably be interactive for the user to drag-and-drop, relocate, and otherwise interact with the configuration of the related logic template, etc. Graphical elements are connectable by graphical connections.

When designing a campaign in the graphical user interface, the graphical elements representing the individual logic templates are getting connected by graphical connections. The graphical connections thereby become the definition of the process structure, together with the configurations made to the individual logic templates. Several logic templates may preferably have a plurality of sequence forward points, and for such logic templates, each graphical connection is preferably connected to a specific sequence forward point, in order to facilitate different connections for the different sequence forward points of a logic template. Likewise, in an embodiment providing a plurality of sequence receive points for a logic template, the graphical connections are connected to specific such sequence receive points. In other words, the graphical connections preferably bind specific sequence forward points to specific sequence receive points, and are used by the user to define and illustrate the various configured process sequences, and thereby indirectly by the processing engine to determine the sequence of execution of executable program fragments and related configurations.

In an embodiment said campaign management system comprises a processing engine configured to perform said processing of said participant records according to said two or more process structure versions.

A processing engine is provided to process participant records according to the thus configured campaign. A main purpose of the processing engine is to initiate the execution of the executable program fragments of the individual logic templates in a sequence defined by the process structure and as appropriate for a particular participant record based on its track history and the relevant process structure versions, and manage this for all the participant records in a campaign or several campaigns. The processing engine is computer-implemented, as described above regarding the campaign management system.

In an embodiment said track histories comprise logs of executed process sequences of said processing of said participant records according to one or more of said process structure versions.

The sequence of executable program fragments that has actually been executed with respect to a specific participant record is denoted an executed process sequence, and is stored in the track history for that specific participant record. An executed process sequence thus corresponds to one of the configured process sequences of the process structure, or to a part thereof if the processing has not yet finished.

In an embodiment each of said configured logic templates is based on a logic template comprising user editable parameters for configuration of said logic template and an executable program fragment being executable on the basis of said user editable parameters and one or more of said participant records.

In the present disclosure, logic templates are the active building blocks of a process structure of a campaign. A logic template comprises an executable program fragment defining and implementing its action(s) and user editable parameters to configure it. Different categories of logic templates may be provided, for example injection logic templates to inject participants in a campaign by generating participant records, interaction logic templates to perform interactions with the participant, decision logic templates to perform selection, filtering, etc., and data logic templates to perform data operations such as serialization/deserialization, import/export of data from/to master data or third party systems, changing attribute values, etc.

In the present disclosure, user editable parameters are the user-configurable part of logic templates, thereby configuring how the executable program fragments of the logic templates process the participant records. A logic template where a required minimum of the user editable parameters have been appropriately adjusted for a particular campaign is also referred to as a configured logic template. The user editable parameters may for example relate to criteria such as ranges, thresholds, comparison values, filters, values, etc., selection or configuration of optional features of the executable program fragment, configuration of settings, default values, predefined values, etc., to influence and configure the execution of the executable program fragment in relation to a participant record. The user editable parameters may refer to data available in the participant record, i.e. participant attributes, as subject of comparison, selection, etc., and/or referencing campaign attributes of the process structure, i.e. common data generally available for all participant records processed by a particular process structure. In an embodiment a reference to a non-existing participant attribute or campaign attribute in a user editable parameter may cause automatic creation of such participant attribute or campaign attribute. The user editable parameters may allow the user to create further options for the executable program fragment to select from based on user-definable criteria, and automatically generate sequence forward points corresponding to the created further options.

In the present disclosure, an executable program fragment denotes a piece of code that can be executed to perform one or more actions with respect to a specified participant record. Each logic template comprises an executable program fragment which is configured, e.g. by software programming and/or hardware circuits, to perform the special function or several functions related to that logic template. The executable program fragments are preferably configured to rely on a configuration established by the user editable parameters, and further to rely on one or more specific participant records. An executable program fragment may also be configured to further rely on external data, e.g. data retrieved from a webservice such as weather data, event booking data, etc. The executable program fragments of the various logic templates are configured to be executed in a sequence relative to each other as determined by the processing engine on the basis of the process structure.

In an embodiment a first process structure version of said two or more process structure versions is a process structure of said executable program fragments of a first subset of said plurality of configured logic templates in relation to said participant records; wherein a second process structure version of said two or more process structure versions is a process structure of said executable program fragments of a second subset of said plurality of configured logic templates in relation to said participant records; and wherein said first subset of said plurality of configured logic templates and said second subset of said plurality of configured logic templates overlap by at least one common configured logic template.

As described above, the common configured logic template is a configured logic template that is present in both the first and second process structure version, thereby defining an overlap, although the configuration of the common configured logic template in an embodiment need not to be exactly the same in both versions. The two process structure versions may have many common configured logic templates, even all configured logic templates may be common to the two versions.

In an embodiment said migration of said processing between said two or more process structure versions on the basis of said track histories and said two or more process structure versions comprises said processing engine being configured to migrate processing of one or more of said participant records from said first process structure version to said second process structure version based on respective of said executed process sequence of the one or more participant record.

The control of migration of processing of a particular participant record to a different process structure version may advantageously be based on the already executed process sequence of that particular participant record.

In an embodiment said two or more process structure versions is three or more, such as 8 or more, such as 20 or more, process structure versions of the same campaign.

An embodiment of the present invention is advantageous by providing the migration functionality for any number of versions of process structures of a campaign, whether representing large or small changes between each. Preferably, the campaign management system also offers a user-friendly way of making changes and creating new versions of the process structure by means of the described graphical user interface. The migration may be to the next version, or may preferably jump to the newest version possible. Migration may not be possible between any version for any participant record at any state, but may preferably at least be possible for a participant record currently to be processed by a common configured logic template which may then migrate to the newest process structure version including this common configured logic template.

In an embodiment said two or more process structure versions are ordered according to their individual creation times and wherein said migration between said two or more process structure versions comprises migrating from a first process structure version to a second process structure version which is newer than said first process structure version.

Migration is preferably, and in some embodiments only, to a newer process structure version. The newer process structure version may be the next in the order, or may be any newer version, for example the newest process structure version.

In an embodiment a process structure version not being the newest among said two or more process structure versions is automatically stopped from processing when all of said plurality of participant records are being processed by process structure versions newer than said not newest process structure version.

In other words, an advantageous embodiment is provided, where old process structure versions are automatically stopped when all their participant records have migrated to newer versions, and no participant records can no longer be injected for processing according to the old process structure version. This is highly advantageous, as it helps cleaning up the system, saving processing power and making it easier for the user to manage the process structure version.

In an embodiment a process structure version is configured to disable any injection logic templates when it is no longer the newest among said two or more process structure versions to automatically prevent injection of new participants into said no longer newest process structure version.

In an embodiment, each time a newer process structure version is created, the older process structure versions are put in a special mode, also referred to as 'sunset mode', where migration to newer versions are intended for all participant records as soon as they get to a common configured logic template, and it is regularly evaluated whether the process structure version can be stopped entirely. In this mode, the injection logic templates are also disabled to prevent injection of new participants into an old version.

In an embodiment the campaign management system is configured to suspend processing of a participant record when it has been processed in accordance with the last configured logic template of a configured process sequence of a first process structure version, and wherein said suspended processing is resumed when a second process structure version is created which second process structure version defines a further configured logic template of said configured process sequence.

According to this advantageous embodiment of the invention, a participant record which gets to the last configured logic template of a planned campaign, is not simply ejected or forgotten. Instead processing of it is just suspended until further processing is made possible, which may advantageously be made possible by creating a new version of the process structure, which new version provides further options or configured logic templates to the participant record to be processed in accordance with. By the advantageous present invention, these participant records may be migrated to the newer process structure version to resume their processing. Hence, when processing of participants has reached an end of a processing sequence, instead of considering the campaign finished for their part and ejecting them, it is possible to resume their processing if a later version of the campaign adds further steps to the particular processing sequence selected by those participants. In other words, according to an embodiment of the present invention, a campaign never ends for a participant, as evolvement of the campaign may cause resumption of processing for that participant.

According to the disclosure, configured process sequences denote the possible sequences through the process structure, defined by the couplings of logic templates in the graphical user interface. In other words, each configured process sequence defines a possible way of execution of participant records through a campaign or other process. Each branch or rejoin of graphical connections and graphical sequence connection points, and each possible process feedback from a forward point of a logic template back to the receive point of the same logic template, possible via other logic templates, results in a different configured process sequence. As the user editable parameters are a significant part of configuring the possible connection points of the logic templates, they thereby also in practice facilitate the possible couplings and thereby the possible configured process structures.

In an embodiment said plurality of participant records comprises two or more participant records associated with the same participant.

A participant may be represented by two or more participant records for various reasons. For example by being injected into the campaign several times where allowed, or by being forked after an interaction where several options are selected where allowed. The different participant records associated with the same participant may be processed in accordance with the same or different process structure versions, and may be migrated to newer versions, even if there already exists a participant record associated with that participant.

According to the present disclosure, a participant is an external and real person or object which the campaign basically is directed towards. In the present context a participant may thus be a person, a machine, a device, etc., to which a campaign can be directed. Each campaign is typically directed to a specific kind of participants, e.g. persons. Examples of participants may include clients or leads in a CRM system, webshop users, conference participants, campaign subjects, subscribers to services, sold, leased or rented products such as cars or other means for transportation, batteries for electric vehicles, etc. In the processing of the campaign, the participants are represented by participant records. The participants may or may not know that they are subject of a campaign, but a campaign typically causes some kind of interaction with the participants, irrespective of the participants being aware that it is controlled by the processing of the campaign. A participant may be anonymous to the campaign in the sense that the participant record may include more or less information about the participant it represents, from an arbitrary GUID or serial number or the like when nothing else is available, to complete participant identifiable data such as name, address, email address, social security number, etc. in campaigns where this kind of information is relevant.

In an embodiment said common configured logic template is a configured logic template which corresponds in type between said subsets of said plurality of configured logic templates.

The migration between two process structure versions may be preferably be implemented when the common configured logic template being the point of migration is of the same type of logic template in both versions, however possibly with different configurations.

In an embodiment said common configured logic template is a configured logic template which corresponds substantially in configuration between said subsets of said plurality of configured logic templates.

The migration between two process structure versions may be advantageously implemented when the common configured logic template being the point of migration is configured similarly or substantially identical in both versions. This means, that new options or features, e.g. sequence forward points, may have been added, some parameters be changed, e.g. filters, but generally no options or features have been removed. In other words, a reconfiguration involving disabling sequence forward points or removing local participant attributes may disqualify the configured logic template for use as migration point, i.e. common configured logic template.

In an embodiment said process structure versions and said participant records for processing by said process structure versions represent a campaign.

In an embodiment one or more campaign attributes are common between said two or more process structure versions.

Some data may be relevant across all participants of a campaign, and such data are referred to as campaign attributes. Campaign attributes may for example be useful when exactly one object is needed to coordinate actions across the campaign. This may for example be initialization data for the campaign, general settings and configuration of the campaign, or a value that is shared between all participants, e.g. the number of prizes in a lottery, the number of seats at an event, the current leader of a collection, etc. In other words, the campaign attributes may in an aspect be considered 'singletons' in the scope of a campaign. In an advantageous embodiment with two or more process structure versions and migration functionality between them, the campaign attributes may be managed individually for each version, or be managed as singletons across versions.

In an embodiment one or more campaign attributes are different between said two or more process structure versions.

It may be advantageous to facilitate campaign attributes that are tied to specific versions of a campaign, in order to have different attributes in different versions, or in order to facilitate different values of a campaign attribute in different versions.

In an embodiment said global participant attributes are defined across a plurality of campaigns defined by different respective process structures, and wherein said local participant attributes are defined for a subset of said plurality of campaigns CAM).

In the present disclosure, the terms global and local with respect to participant attributes denote the origin, and thereby original availability, of an attribute value in the scope of a campaign. A local participant attribute thus refers to a participant attribute of which the value is produced during the course of the campaign, possibly generated within the campaign or based on external data not being master data of the participant. Local participant attributes may comprise template-specific local participant attributes relating to or being relevant only to specific logic templates, e.g. as temporary preserving of events or choices, and campaign-specific local participant attributes generally available and relevant over the course of the campaign to several logic templates, e.g. for consolidating interactions.

The use of local participant attributes allows a user, i.e. the campaign designer to establish campaigns which may be logically executed based on local logical or variable parameters and where values may be derived and obtained entirely during the execution of a campaign. The attributes and the values they contain, may thus be restricted to the individual campaigns by design, thereby offering data-protection by design.

There are numerous further technical advantages by allowing and applying such local participant attributes. One such advantage is that the global participant attributes may be maintained by a centralized ERP or CRM management according to enterprise policies across all company. Such management and maintenance may easily be relatively rigid and the result in most larger enterprises is high inertia with respect to attributes desired or needed for running of relevant campaigns. In the present context, a user, here a system designer, may establish local variables applied for just one or a few campaigns.

In an embodiment said local participant attribute is campaign specific.

Again, when a local participant is campaign specific, it is possible to encapsulate the obtained data, i.e. the data contained by the local participant attributes, completely within a campaign, thereby ensuring that data are not applied for the execution of other campaigns. Campaign specific in the present context not only designates that a local copy of an attribute is in play for use and processing in participant records. It also means that a user, e.g. a system designer, may define attributes/variables applicable for execution to the respective campaign alone. This means that a campaign can be executed within requiring the user to have in-depth knowledge about all master data, e.g. a client database of a CRM and in particular, no requirement for in-depth knowledge about the attributes of the client database. A particular nice feature of the local participant attributes which may be applied for logical use/gathering of campaign specific information/relevant communication with the participants is that the user may relatively easy and with no risk of cross contamination with other campaigns established relevant attributes/variables instead of just using available and globally allowed/defined attributes.

In an embodiment the local participant attribute is named and defined by a user.

The name of the local participant attribute is typically defined as a combination of characters. The naming may e.g. be performed according to conventional principles when naming variables, and the defining of the local participant attributes may e.g. be performed with reference to general attribute types allowed and defined for the overall campaign management system. The campaign management system may also provide for user-established data types or data sets, which may be applied in relation to a user defined campaign.

To be named and defined may typically involve a user-defined attribute name. A user-defined attribute name may e.g. be established by means of a logic template provided for such purpose and where the name is established during configuring of the template. A user-defined attribute name may thus be introduced e.g. in a template applied for communication with a participant, e.g. a "letter" template where a relevant text and design is applied for communication with the participants and where a participant, by means of a user interaction defined and established in the campaign in question, may perform logical choices or give text input in a language which is easy to understand for both the participant and the user and also which is easily captured and processable by the campaign management system. A simple example could e.g. be that a system designer wants to run a campaign where the participants are offered e.g. three different loyalty awards; a box of chocolate, a free walking tour in your own garden or a Porsche car.

Thus, local attributes called e.g. "Chocolate", "Walking tour" and Porsche may be established by the user when configuring a logic template and the template may also be configured for establishment of communication with the individual participant, e.g. landing page, SMS, e-mail or whatever interactive communication method available now and in the future. The choices made may easily be captured in the individual participant records and the choices may also be applied logically, e.g. to congratulate the ones who chose the Porsche as they were clearly the only ones who read the offer. It is also easy e.g. to establish maximum number in relation to the chosen items as the choices are now captured and logically available for e.g. automatic modification of the campaign when all the chocolate available has been chosen and where the campaign is to be terminated or where other items are to be offered.

Again, it is important to understand that such local participant attributes makes is easy for a user, even a user having limited training in programming, to design a relatively complex campaign as the local participant attributes are easy to understand and apply logically as the user designing the specific campaign has an in-depth understanding of what he or she intended the local attribute to logically cover or infer. In a campaign management system, which is always designed for execution of a plurality of campaigns, at least over time, such a features makes it possible for a user to establish a campaign without disturbing logic in other campaigns and also without being limited by the logic understanding of the attribute as established by another user in another campaign.

In an embodiment the local participant attribute for a campaign is named and defined by a user by means of the graphical interface and wherein the local participant attribute is contained and updated in the participant records processed by the process structure of the campaign.

By keeping local participant attributes and updates values/states of the local participant attributes in participant records of a respective campaign it is easy to capture the obtained information from the participants, but it is also easy to keep track of how the individual participants have acted with respect to the local participant attribute. It thus not only means that information with respect to the particular participant is directly and unambiguously available for access, reading, modification, counting, etc.

In an embodiment the local participant attribute is named and defined during configuration of the logic templates into a configured logic template.

A logic template may advantageously include predefined data fields, where a user may name a local participant attribute and optionally associate a data type to the attribute.

The logic template may furthermore include different options for configuration of interaction with a participant, e.g. e-mail, landing pages, SMS, etc and wherein the configured interaction channels input data from a participant to the campaign management system to be used in the specific campaign, and wherein the channeling of input data to the campaign via the configured logic template is captured as local participant attributes in the context as defined by the user when configuring the logic template in question.

In an embodiment the logic template when configured defines a name of a local participant attribute and moreover a participant interaction channel, by means of which a participant may update the local participant attribute of the participant record associated to the participant.

The updating of the local participant attribute includes choices made, i.e. logical choices or e.g. input data such as numbers, names, characters, etc. These data is then available for the use during the execution of the process structure with respect to the participant records.

An interacting channel in the present context included a means for communication with a participant, e.g. an e-mail, where a participant may be requested information, choices, etc and where a user may communicate back to the campaign management system and where a choice made by a particular participant as related to a associated particular participant record may be captured more or less directly in a participant record. In other words, a choice made by the participant, may be directly captured and applied for branching/executing the campaign as the participant interaction channel is configured for capturing the incoming data and registering and capturing these incoming data to the correct respective participant records. The participant interaction channel may for example be established through a participant contact interface by means of a configured interaction logic template. +

In an embodiment at least one of said configured logic templates is established for execution of program logic on the basis of a local participant attribute of a participant record to be processed according to the process structure of a respective campaign.

In an embodiment the execution of executable program fragments according to the process structure include campaign specific logic operating on the basis of local participant attributes of participant records processed according to process structure of the campaign.

In an embodiment the local participant attribute of a respective participant record is updated at least partly on the basis of the track history of the participant record by an executed program fragment of a process structure.

In an embodiment a campaign is further associated with a campaign attribute of a campaign record and wherein the campaign attribute is updated in relation to the individual campaign.

A campaign attribute may advantageously be a local attribute in the sense that it is a campaign specific attribute which is not globally defined and the campaign attribute may contain relevant data describing or reflection the execution of the process structure on a campaign basis, thereby e.g. capturing accumulated data obtained through the processing of the individual participant records. Such data could e.g. include the capturing of the accumulated number of participants of a campaign who have chosen or won a certain gift.

In other words, such campaign attributes may be applied for capturing of data related to the campaign rather than capturing data specific for participants in a given campaign as captured in the individual participant records. Such campaign attributes may thus be applied by a user to capture data of interest related to the campaign as such. Such data could e.g. be a campaign attribute "Participant number" and simply designate the number of initiated participant records related to a specific campaign. If a user, by example, would target a minimum or maximum participants—as represented by respective participant records—in a campaign such a campaign attribute would be an easy instrument of automatically continuing the campaign until a certain amount of participant records have been processed/initiated or e.g. automatically terminating the campaign when the desired amount of participant records has been processed/initiated. In other words, such a campaign attributes contains data related to the campaign across the involved participants.

In an embodiment said global participant attributes are established on the basis of master data available for all campaigns and where local participant attributes are generated with respect to individual campaigns.

In an embodiment said global participant attributes are established on the basis of master data available for all campaigns and where local participant attributes are established on the basis of campaign-specific data and/or campaign-specific data definition defined by the user independent of said master data.

In the present context campaign specific data may e.g. refer to the name of the local participant attribute in question, where a user, during the process of setting up a campaign establishes and defines a name of the local participant attribute to be used in the campaign in question. Moreover, in relation to the established attribute, the user may associate or rather define a data type associated with the local participant attribute in question. Where the name would be an appropriate example of campaign-specific, a data type such as e.g. a string of characters, integer whatever appropriate data type relevant for the named local participant attribute.

In an embodiment the campaign management system is configured for execution of alive mode and a test mode, wherein the live mode for the campaign executes executable program fragments of the process structure for processing of the individual participant records established for a respective campaign, wherein the test mode executes executable program fragment of the process structure of the respective campaign and wherein participant interaction is suspended in test mode, and wherein the test mode is executed on the basis of a plurality of participant records and wherein the participant records comprises participant attributes and wherein the participant attributes include participant record track history.

Suspension of participant interaction in the present context primarily refers to the technical implication that automatic communication to and from participants related to respective participant records are not automatically communicated with by means of the campaign management system.

In an embodiment the test mode is executed on the basis of a plurality of participant records which have already been at least partly processed in a respective campaign running in live mode and/or in test mode.

According to the invention, a system is e.g. provided for testing partly processed participant records of a given campaign. This means both that a test can make sense even if test participant records are only processed partly along and according to the process structure. A testing may thus be executed for testing of how the filter creating the participant records of the respective process structure are working. It is also possible to check weather dead-ends or deadlocks may be expected.

Another advantageous feature of an embodiment of the invention is that testing may be performed on the basis of participant records copied or derived from a live mode campaign which has not finalized.

In an embodiment a current state of the participant record includes current values of the participant attributes of the record and current participant track history related to the participant record at a given time.

The time at which a current state is recorded may refer to a real time at which a live campaign was/is running or it may refer to an emulated time.

In an embodiment a campaign includes at least two process structure versions of the process structure.

A campaign is generally run with respect to a process structure or different versions of the process structure. The process structure may be updated during the life cycle of a campaign to newer versions or test versions. Each version may be applied as a basis for execution in either test or live mode. A campaign should preferably only run one live mode version of a process structure in which new participant records may be injected. It is thus possible to have more than one process structure version running in live mode however new participant records are only injected in to the newest of the process structure versions running in live mode. In test mode, it is possible to run more than one version of a process structure as such execution will not interfere with real participant and not interfere with the current participant records of a campaign. Such interference would be unacceptable or at least very difficult to handle and should be avoided.

By registering and keeping the track history in the track history it is possible to ensure that a proper resumption of the campaign may be performed, even if the campaign is resumed in another version of the process structure.

In a test mode, it may be highly relevant to distinguish between versions of process structures to be tested, and this distinguished should preferably also be reflected in the track history of the participant records forming basis of the campaign when run in test mode.

In an embodiment the test mode is executed on the basis the test participant records.

In an embodiment the test mode is executed without affecting the participant records of the respective campaign run in live mode.

In an embodiment the test participant records is produced as a copy of participant records in a current state at a given time.

In an embodiment the test participant records are produced as an emulation of participant records in an emulated state of a specified campaign.

It may be advantageous to establish an emulated state of participant records for use in test mode instead of applying real data obtained from a live mode. It may thus be possible to establish an artificial group of participant test records designed specifically for testing a part of the process structure. This way of testing within the process structure may be even more advantageous when a process structure is under redesign as a user may specifically test the part of the process structure which have been redesigned. Such a testing may of course be performed by means of real data obtained from a live mode, but dedicated test participant records may be designed for testing obscure or particular states of a campaign.

In an embodiment the test participant records processed during test mode includes participant attributes.

In an embodiment the test participant records comprise participant attributes being processable by said executable program fragments of said logic templates according to said process structure and wherein the participant records comprises global participant attributes and local participant attributes.

In an embodiment the test participant records includes track history.

When including track history in the individual test participant records of a campaign it is possible to run a test on participant records which have already been processed in live mode of the respective campaign, thereby facilitating an advantageous facility for a user redesigning the process structure of the campaign. Such a track history may also be emulated with the same result, namely that a process structure of a campaign may even be tested on the basis of test participant records which have already be partly processed through the process structure.

In an embodiment the campaign management system is designed for running in live mode on the basis of a first version of a process structure of a campaign and running in test mode one the basis of a second version of a process structure of the same campaign, and wherein the first version of the process structure is different from the second version of the process structure.

In an embodiment the campaign management system is designed for simultaneous execution of live mode of a process structure of a campaign and a test mode, the live mode operating on participant records related to the campaign and the test mode operating on test participant records.

In an embodiment the test participant records are derived and copied from participant records of the campaign when running in live mode.

In an embodiment the test participant records are emulated.

In an embodiment current state of a specified participant record in live mode and/or in test mode is monitored and optionally visualized as a progression relative to a process structure of a campaign and wherein the progression relative to the process structure is referred to as the participant location It should be noted that a participant location is a somewhat abstract designation of the process as neither the participant nor the participant record is moved or transferred during the process. The participant record rather captures the present state of the attributes, including the registered track history of the participant record relative to the progression along the process structure. In real life, the participant, will however experience progression along the process structure, of course only to the degree that participant interactions are in fact involved.

In an embodiment the processing of the participant records in live mode and/or in test mode is monitored with respect to and in relation to the process structure and graphically illustrated by means of the graphical user interface with reference to or related to graphical elements representing configured logic templates of the user-defined process structure.

It is thereby possible to illustrate the progression of the processing of the participant records and it is thereby possible to establish whether participants are dead-ended or whether some of the process structure needs to be modified.

In an embodiment the progression of the processing of the participant records related to a specified campaign in live mode and/or in test mode are graphically illustrated by means of the graphical user interface with reference to or related to graphical elements representing configured logic templates of the user-defined process structure as accumulated numbers of participant records having a certain participant location.

All participant records in the process of being processed according to the process structure may be illustrated or subsets of the participant records may be illustrated depending on the type of knowledge a user or a supervisor running the campaign may need.

In an embodiment the progression of the processing of the participant records related to a specified campaign in live mode and/or in test mode are graphically illustrated by means of the graphical user interface with reference to or related to graphical elements representing configured logic templates of the user-defined process structure as accumulated numbers of participant records having processed via a certain participant location.

In the present context, the meaning of participant records which have been processed along a certain participant location has the meaning that a participant in the present context may pass by a certain step, e.g. an executable program fragment, several times. If this is the case, it may be highly advantageous to monitor not only participant present at a given location, but it may alternatively or also be advantageous for a campaign monitoring the number of participant, as represented by their respective participant records, having passed a certain location as defined relative to the process structure.

In an embodiment the progression of the processing of the participant records related to a specified campaign in live mode and/or in test mode are graphically illustrated by means of the graphical user interface with reference to or related to graphical elements representing configured logic templates of the user-defined process structure as accumulated numbers of participant records, and wherein the graphically illustrated participant records are filtered with respect to a filtering parameter.

A filtering parameter in the present context relates to many different possible ways of extracting the desired information. The filtering could be performed with respect to the participant gender, age, preferences with respect to products, etc. The filtering would as such then e.g. provide a possibility of monitoring visually the accumulated number of total participants of a certain campaign having entered the different "steps" of the process structure, and then switch to another view where only male participant are illustrated. In this way, it may be possible for the campaign designer, the user, or the person in responsibility of the campaign in a live mode to view and check not only whether the campaign is running as intended but also check if some groups of participants are following different paths along the process structure. Everything may be performed in real-time.

Such filtering may also give the person responsible of the campaign information to decide whether the campaign should be optimized or paused, completely or partly.

In an embodiment the filtering parameter includes gender, age, country, nationality, consumption history, relevant local attributes related to a specific campaign, etc.

In an embodiment the campaign management system when running in test mode is configured for emulation of the participant input for each or a plurality of the test participant records related to a tested process structure.

In an embodiment the campaign management system when running in test mode is configured for user input of participant input for each or a plurality of the test participant records related to a tested process structure.

In an embodiment an emulation of participant input is configured to be a pre-defined or user-defined percentage in relation to possible participant input over the complete group of test participant records entering processing by a respective executable program fragment of a configured interaction logic template.

In the present context, the system may be configured for different pre-defined percentages of possible outcomes of participant input facilitating execution of configured interaction logic templates, or rather their associated executable program fragment on the basis of virtual participant—input rather than real participant input. This is of attractive as a complete testing of the process structure may be completely executed when participant input is suspended.

In an embodiment an emulation of participant input is configured to be a pre-defined or user-defined percentage in relation to possible participant input over the complete group of test participant records entering processing by a respective executable program fragment of a configured interaction logic template and wherein the emulated participant input are distributed over the complete group of test participant records entering processing by the respective executable program fragment of a configured interaction logic template in a randomized way to obtained the pre-defined or user defined percentage.

When a certain distribution of possible participant input has been established, the distribution may advantageously be obtained semi-randomly. An example of such a testing could be that the user, when testing a configured YES/NO interaction logic template in test mode simply inputs that a 50/50 distribution is desired. The testing logic will then distribute a YES input to 50 percent of randomly chosen test participant records and a NO input to 50 percent other of randomly chosen test participant records. It goes without saying that other percentages may be preconfigured or determined by the user.

In an embodiment user-emulated participant input are input by graphically activating the respective graphical element of the configured interaction logic template and inputting the user-emulated participant input in predefined test fields corresponding to participant attributes of the configurable interaction logic template of the process structure.

In an embodiment the campaign management system when running in test mode is configured for user input of participant input for each or a plurality of the test participant records related to a tested process structure and wherein user-input participant input are input by graphically activating the respective graphical element of the configured interaction logic template and inputting the user-input participant input in predefined test fields corresponding to participant attributes of the configurable interaction logic template of individual test participant records.

In an embodiment the management system reads, processes and/or modifies participant attributes of participant records by a sequence of one of more executable program fragments according to the process structure and wherein the execution of one of more executable program fragments can be suspended in response to user action and/or participant action and wherein the execution of the process structure can be resumed in response to user action and/or participant action.

In an embodiment the management system reads, processes and/or modifies participant attributes of participant records by a sequence of one of more executable program fragments according to the process structure and wherein the execution of one of more executable program fragments can be suspended in response to user action and/or participant action and wherein the execution of the process structure can be resumed in response to user action and/or participant action and wherein the campaign management system is configured for executing a test mode during suspension initiated by a user action.

In an embodiment the campaign management system in configured with a design mode, wherein the campaign management system is configured for executing a design mode and a live mode, wherein the management system in design mode executes a graphical design environment of a campaign wherein the graphical elements are couplable using said graphical user interface by a user, the coupling defining a process structure of said executable program fragments on the basis said configured logic templates in relation to said participant records and wherein the test mode is running during design mode.

It may be desirable to configure the system for running the test mode and the design mode at the same time, thereby facilitating that a user may both graphically a process structure and at the same time or switch between design and test mode, without entering the live mode of the designed/test version of the process structure. In this way, a user may design or re-design a process structure or a new version of an already running process structure and test the new version from time to time during the design or re-design process.

In an embodiment the campaign management system is configured for execution of alive mode and a test mode, In an embodiment the live mode for the campaign executes executable program fragments of the process structure for processing of the individual participant records established for a respective campaign, In an embodiment the test mode executes executable program fragment of the process structure of the respective campaign and wherein participant interaction is suspended in test mode, and In an embodiment the test mode is executed on the basis of a plurality of participant records which have already been at least partly processed in a respective campaign running in live mode and/or in test mode.

In an embodiment the test mode is executed on the basis of a plurality of participant records and wherein the participant records comprises participant attributes and wherein the participant attributes include participant record track history.

In an embodiment said plurality of participant records is stored in a participant record database, such as a distributed database.

In an embodiment said plurality of configured logic templates is hosted on one or more server computers arranged to execute said executable program fragment.

A logic template may be distributed so that for example the executable program fragment is stored in a different storage possibly at a different physical location than for example the user editable parameters, and/or the GUI displaying the associated graphical element. The executable program fragment of a logic template may be a fully contained program fragment, or may merely include code or a pointer to another executable program fragment, subprocedure, software library, etc., or a combination thereof. Thereby different logic templates may partially share code and/or utilize general code.

In an embodiment said process structure is stored in a process structure database, such as a distributed database.

In an embodiment said participant record database and/or said process structure database is hosted on said one or more server computers.

THE DRAWINGS

Figure 2:
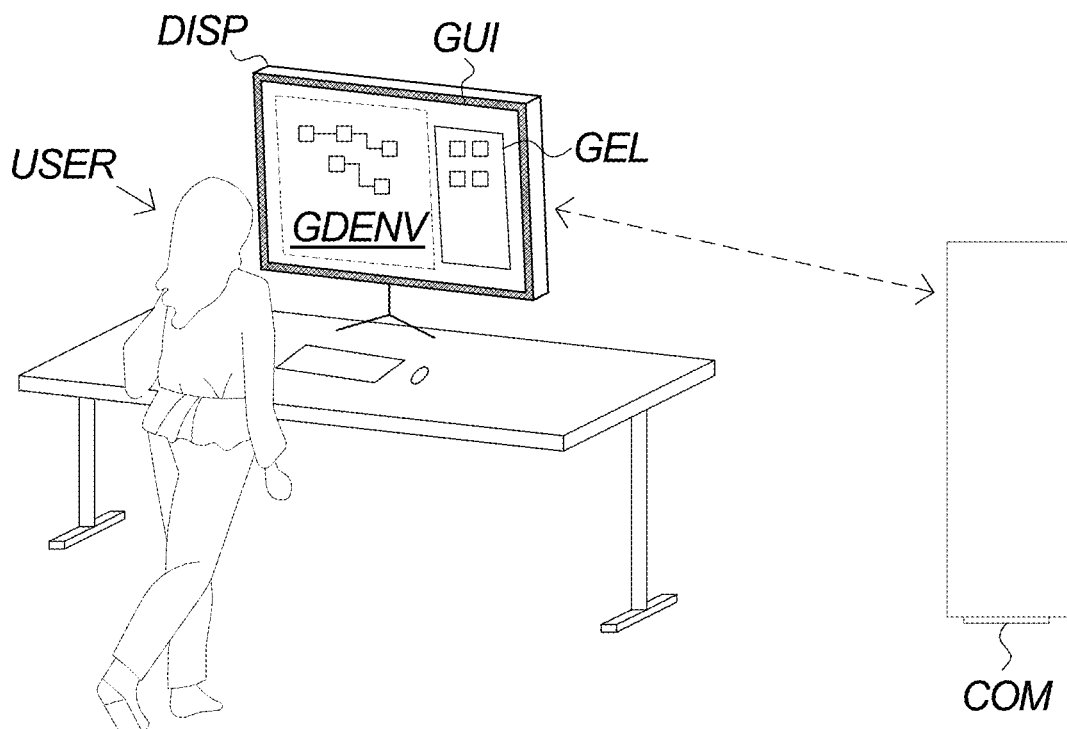
Figure 3:
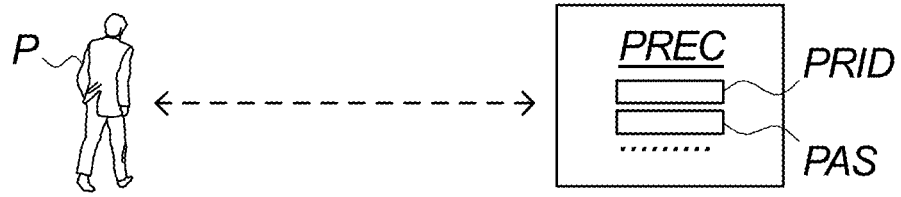
Figure 4:
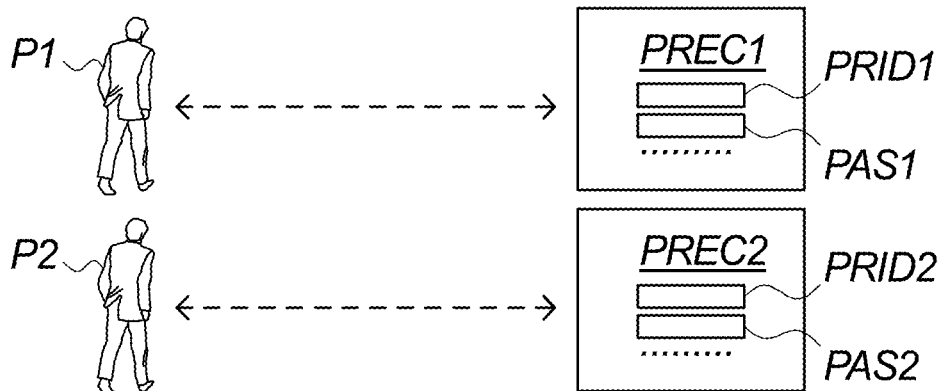
Figure 5:
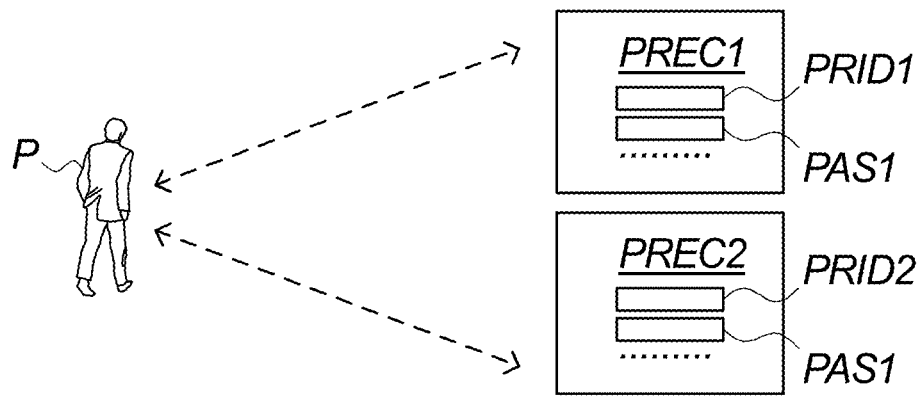
Figure 6:
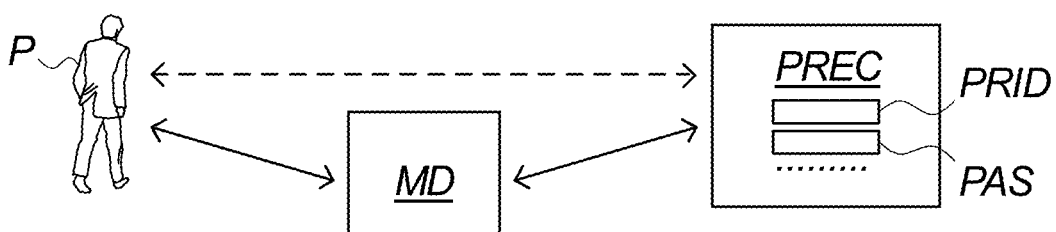
Figure 7:
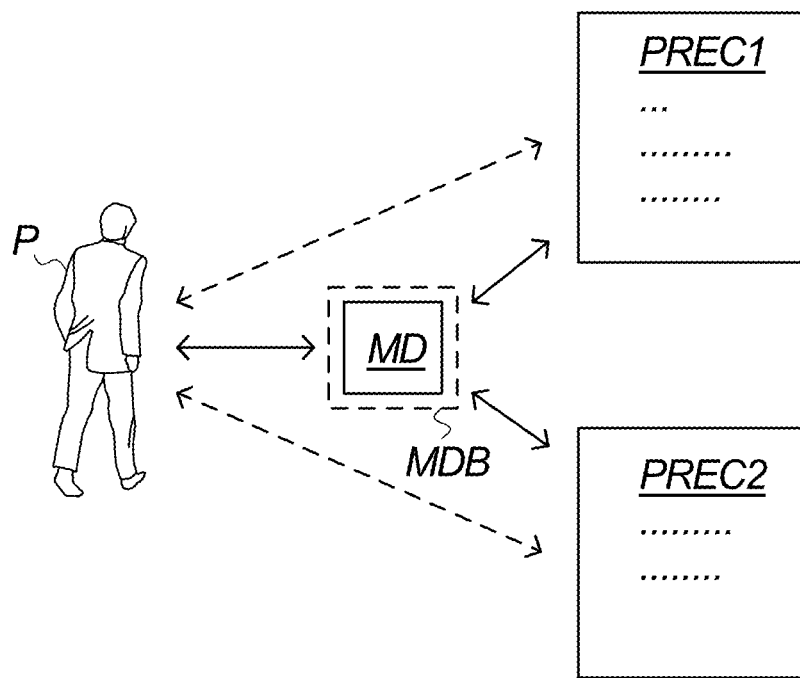
Figure 8:
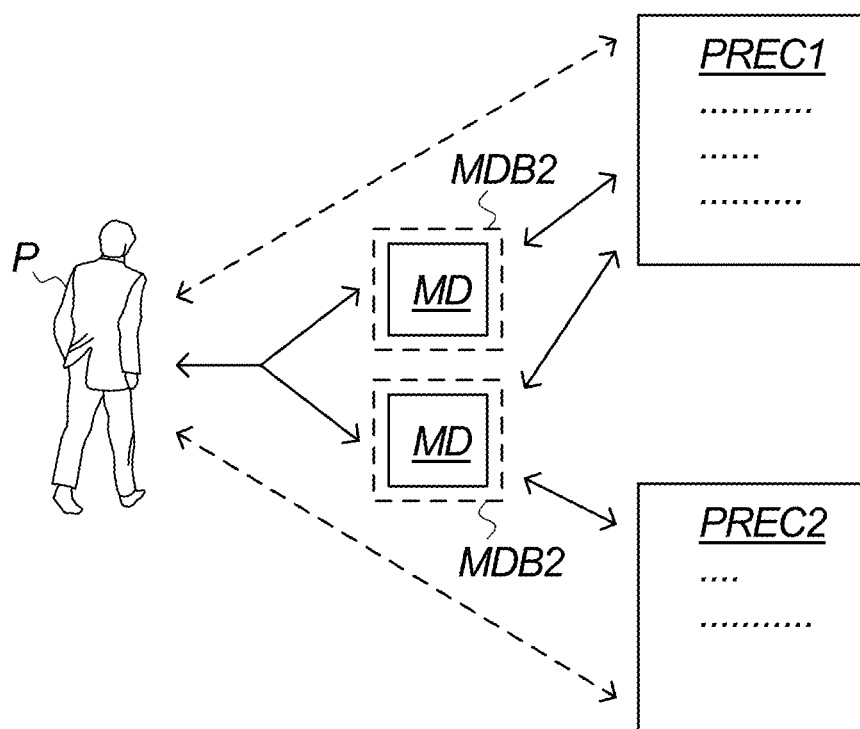
Figure 9:
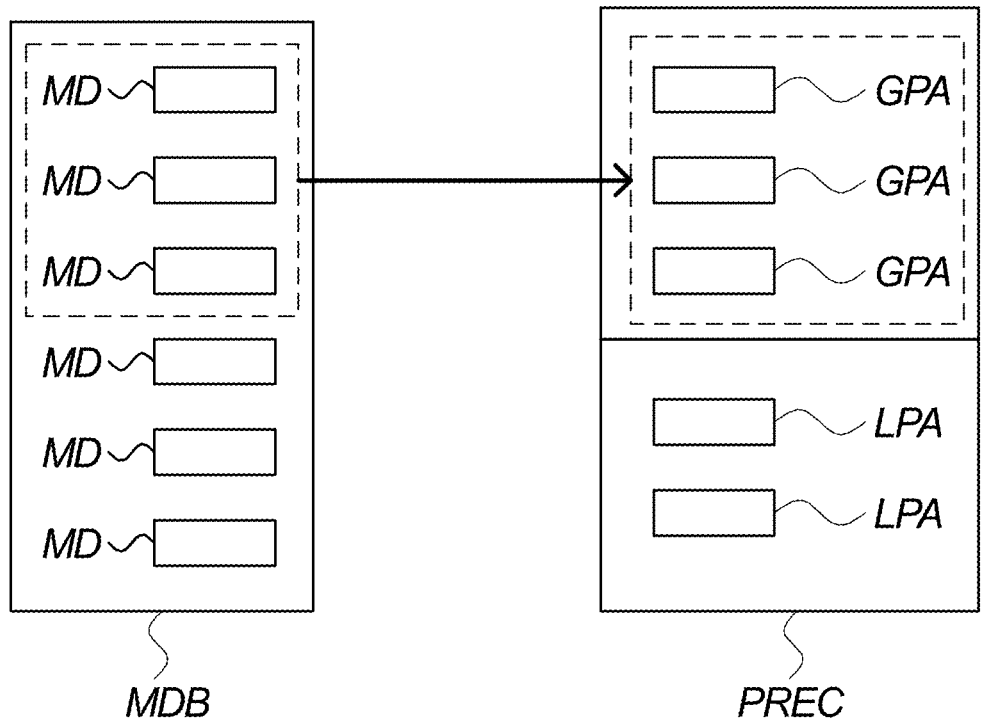
Figure 10:
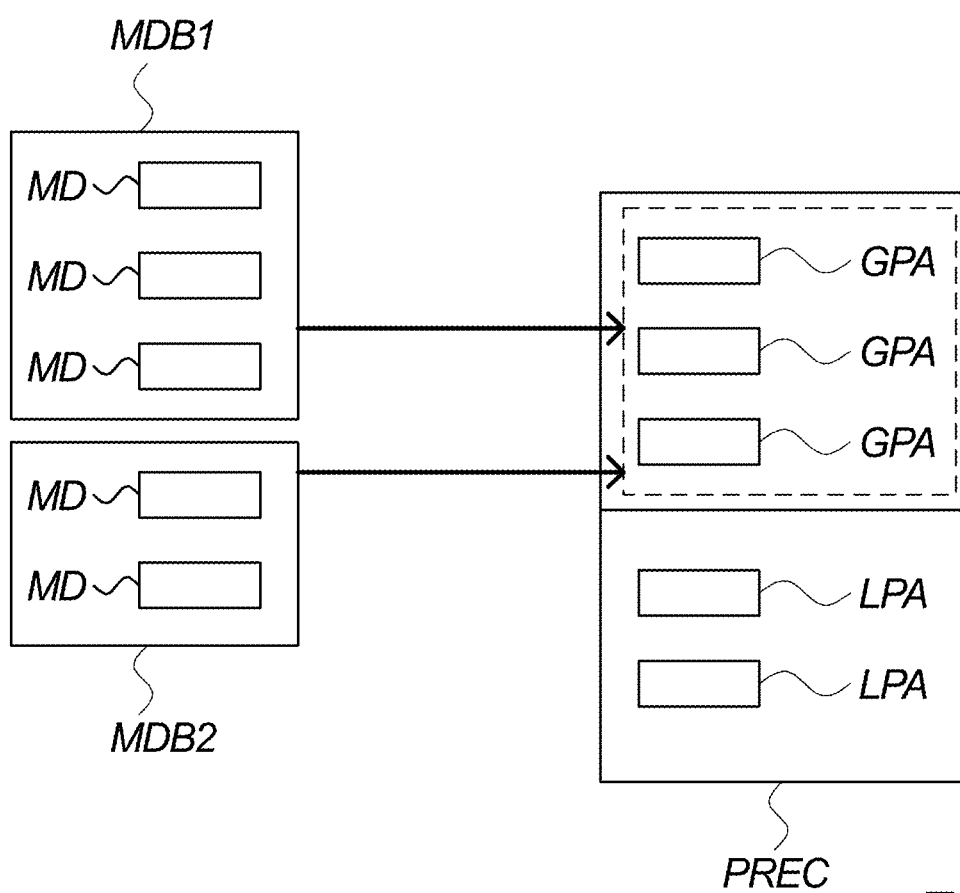
Figure 11:
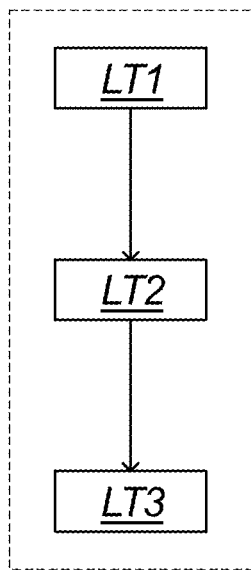
Figure 12:
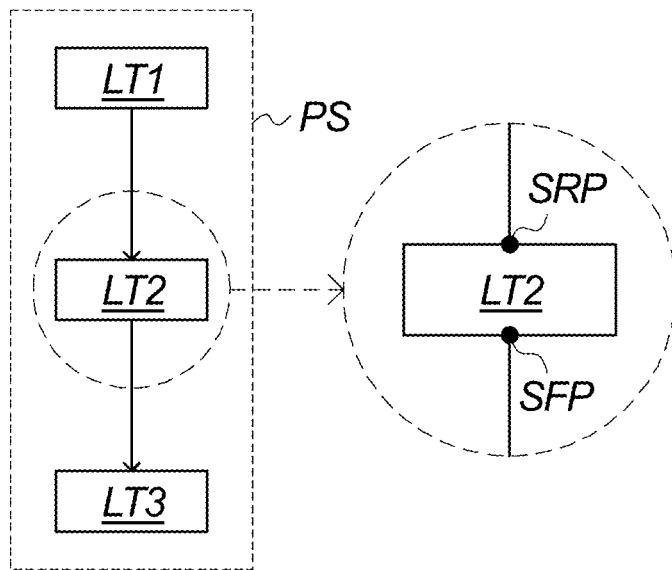
Figure 13:
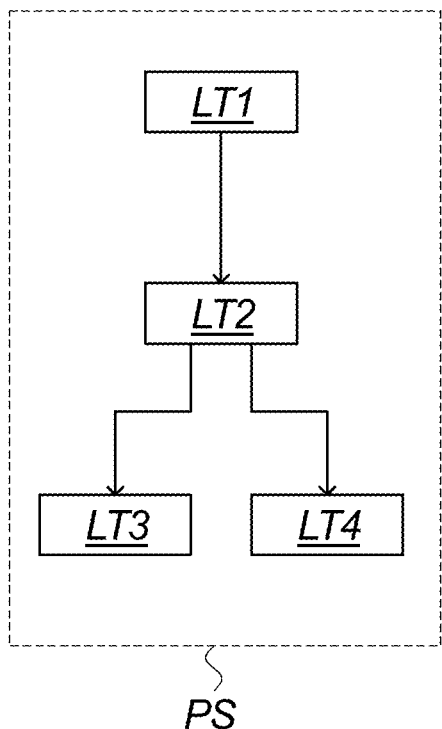
Figure 14:
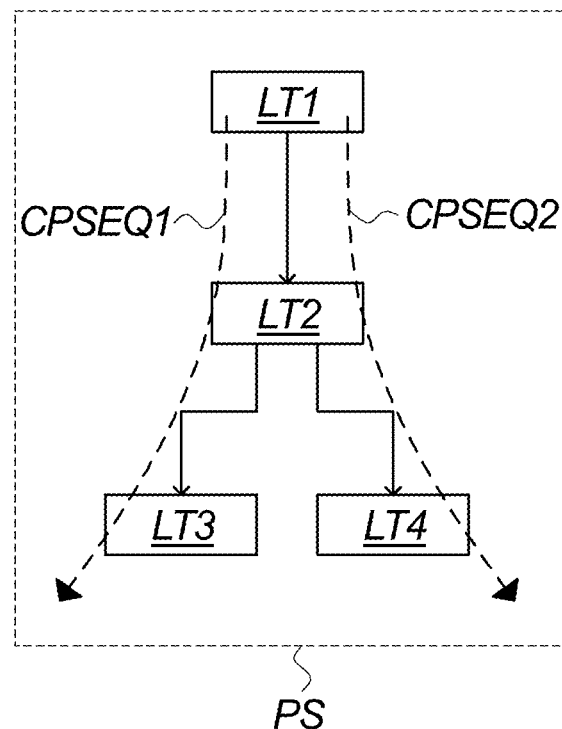
Figure 15:
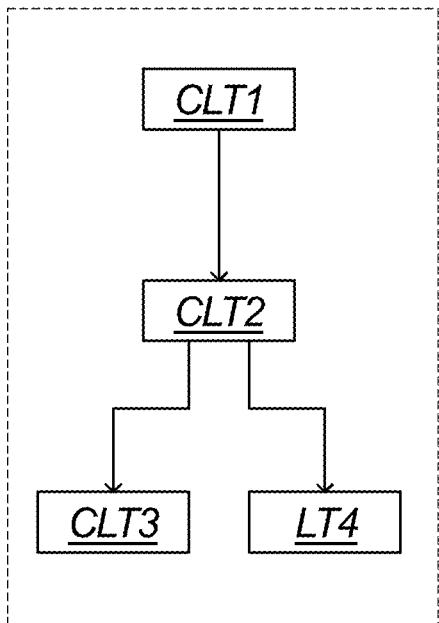
Figure 16:
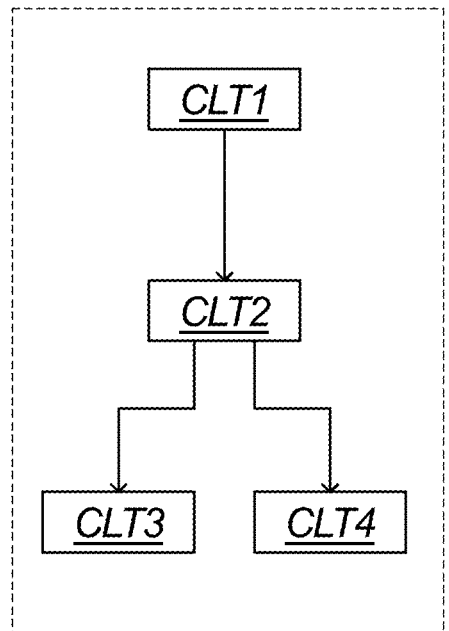
Figure 17:
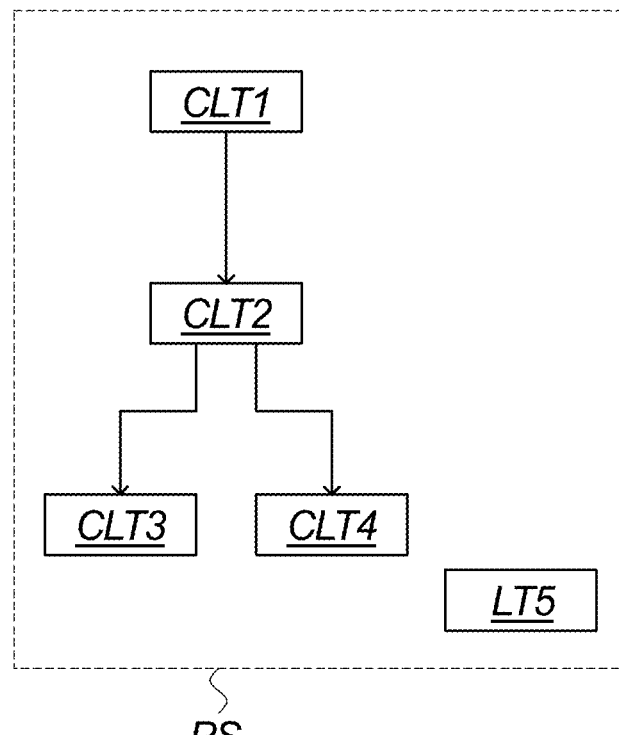
Figure 20:
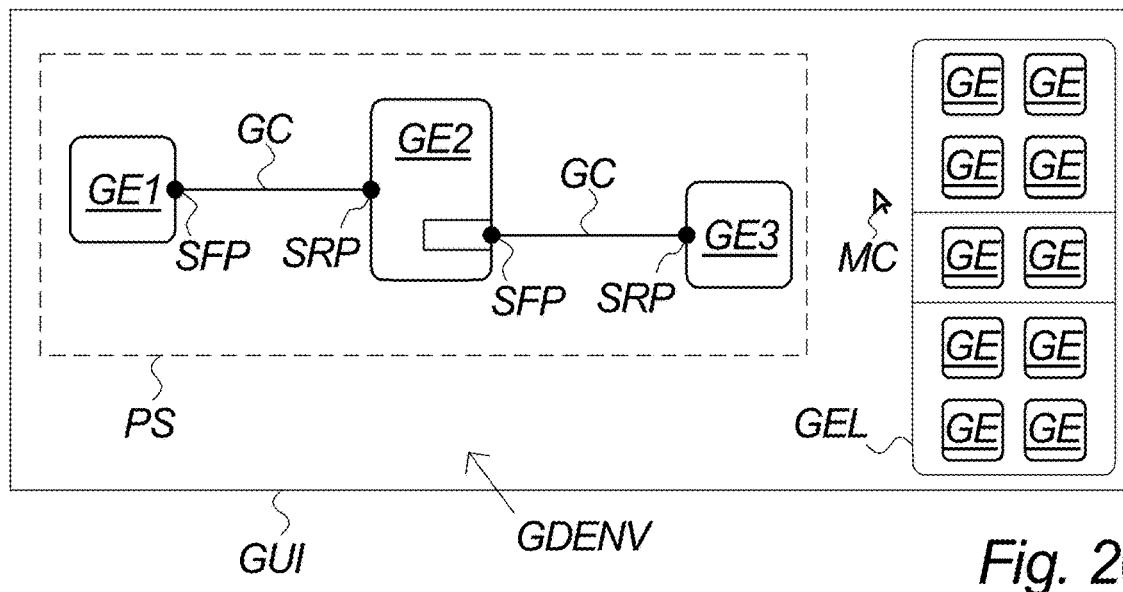
Figure 21:
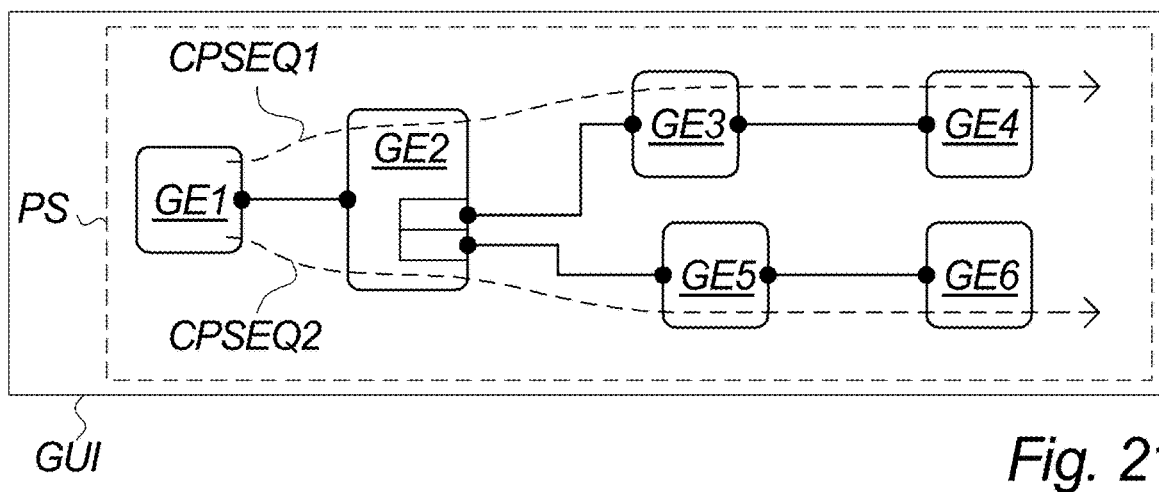
Figure 22:
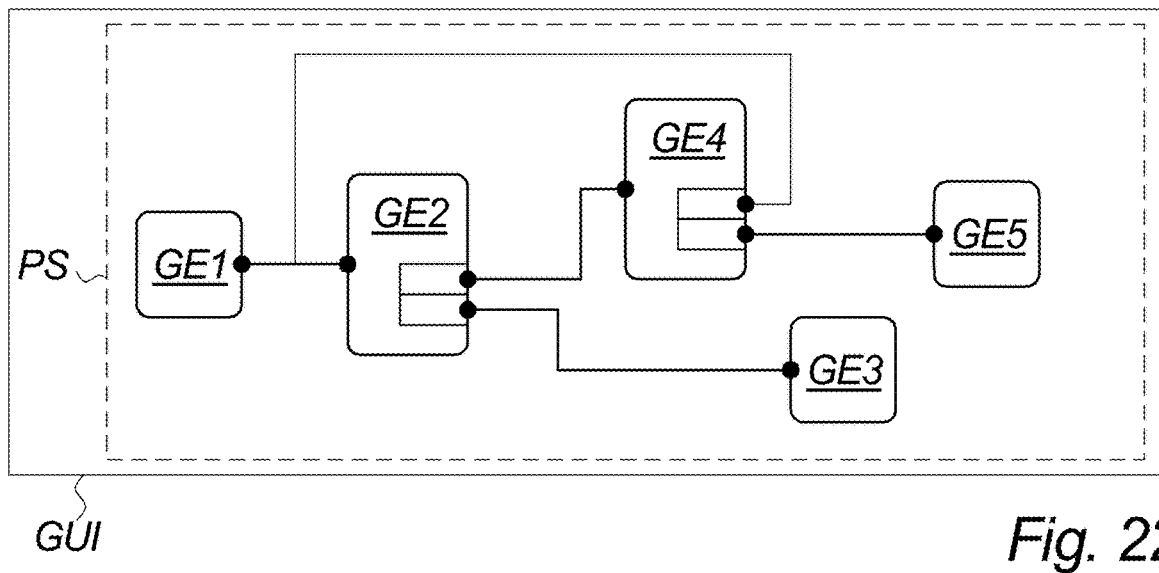
Figure 23:
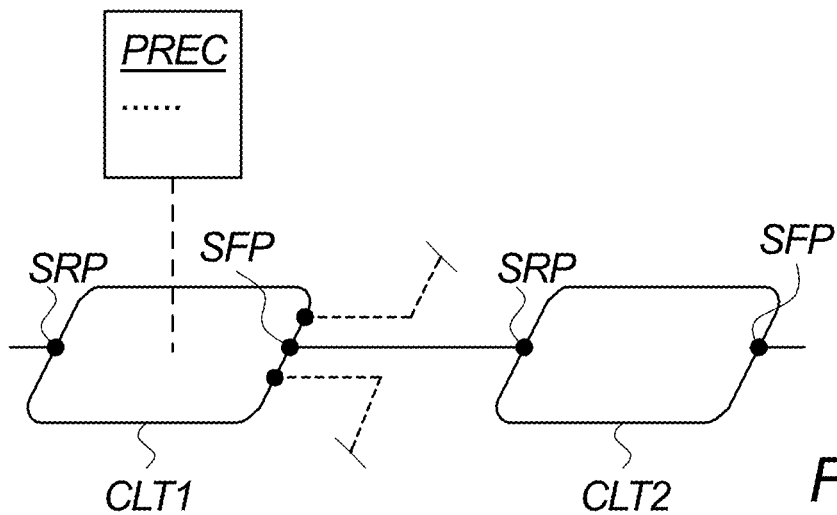
Figure 24:
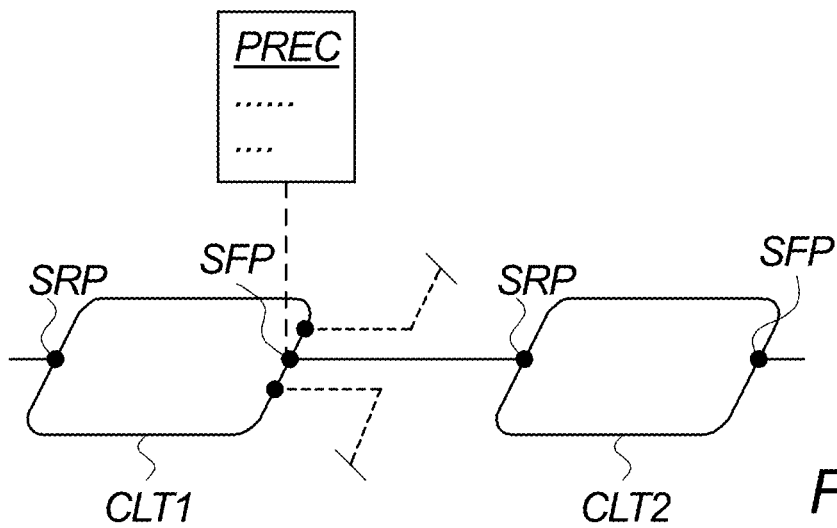
Figure 25:
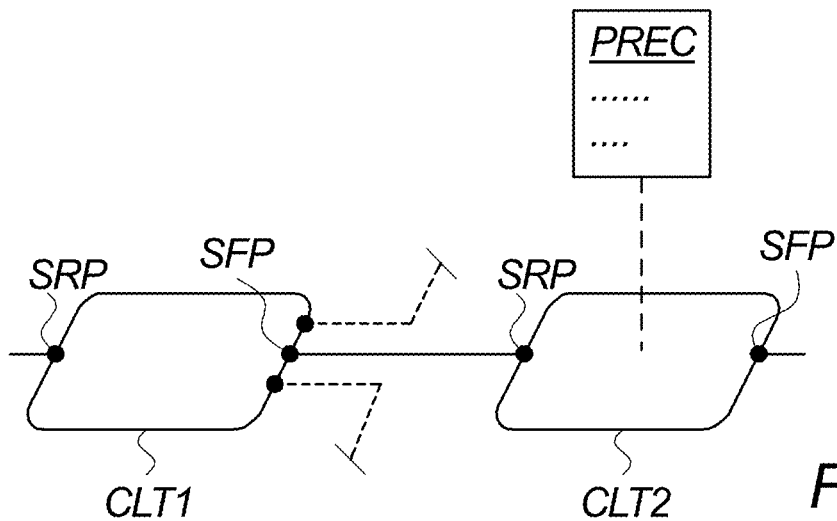
Figure 26:
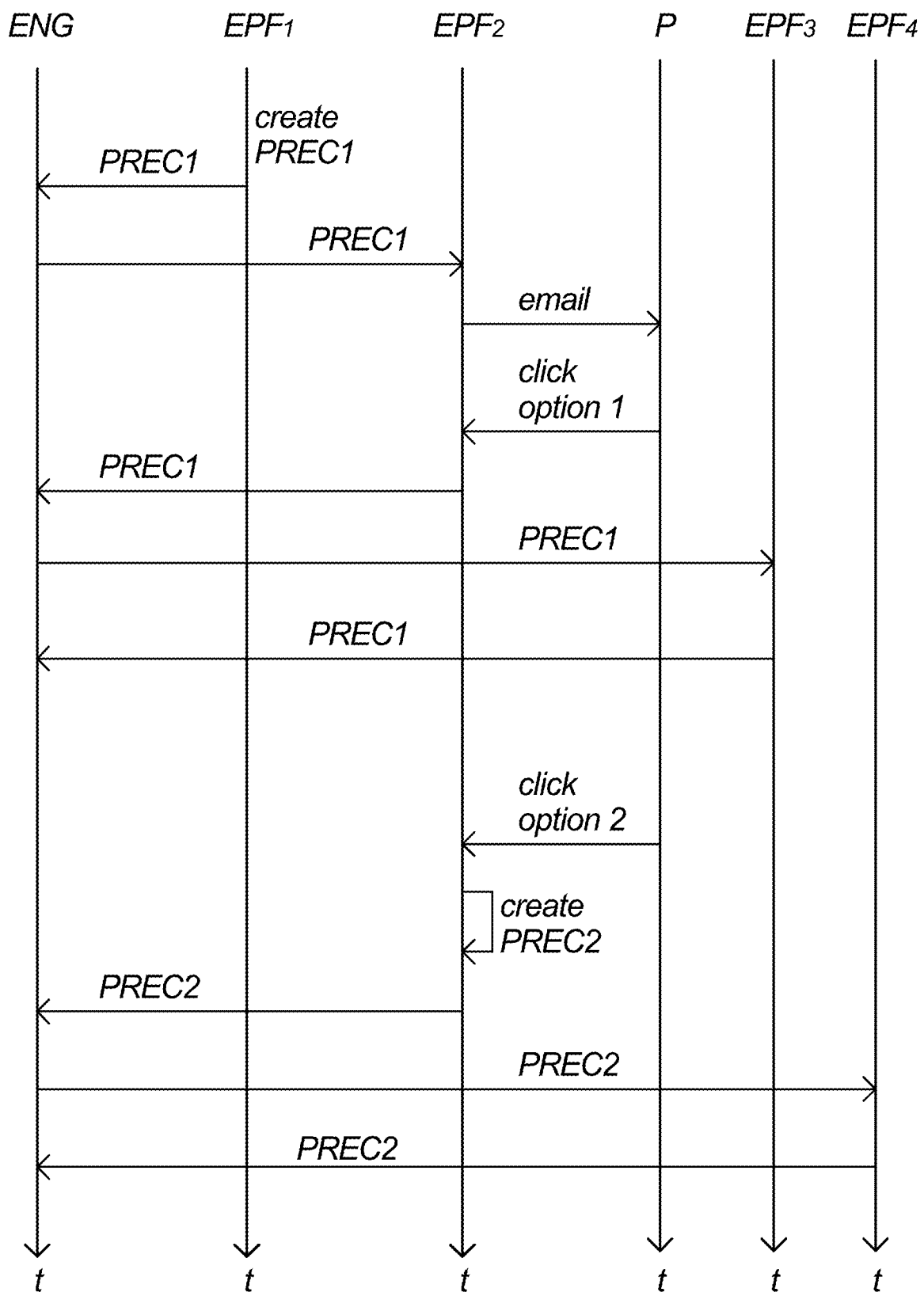
Figure 27:
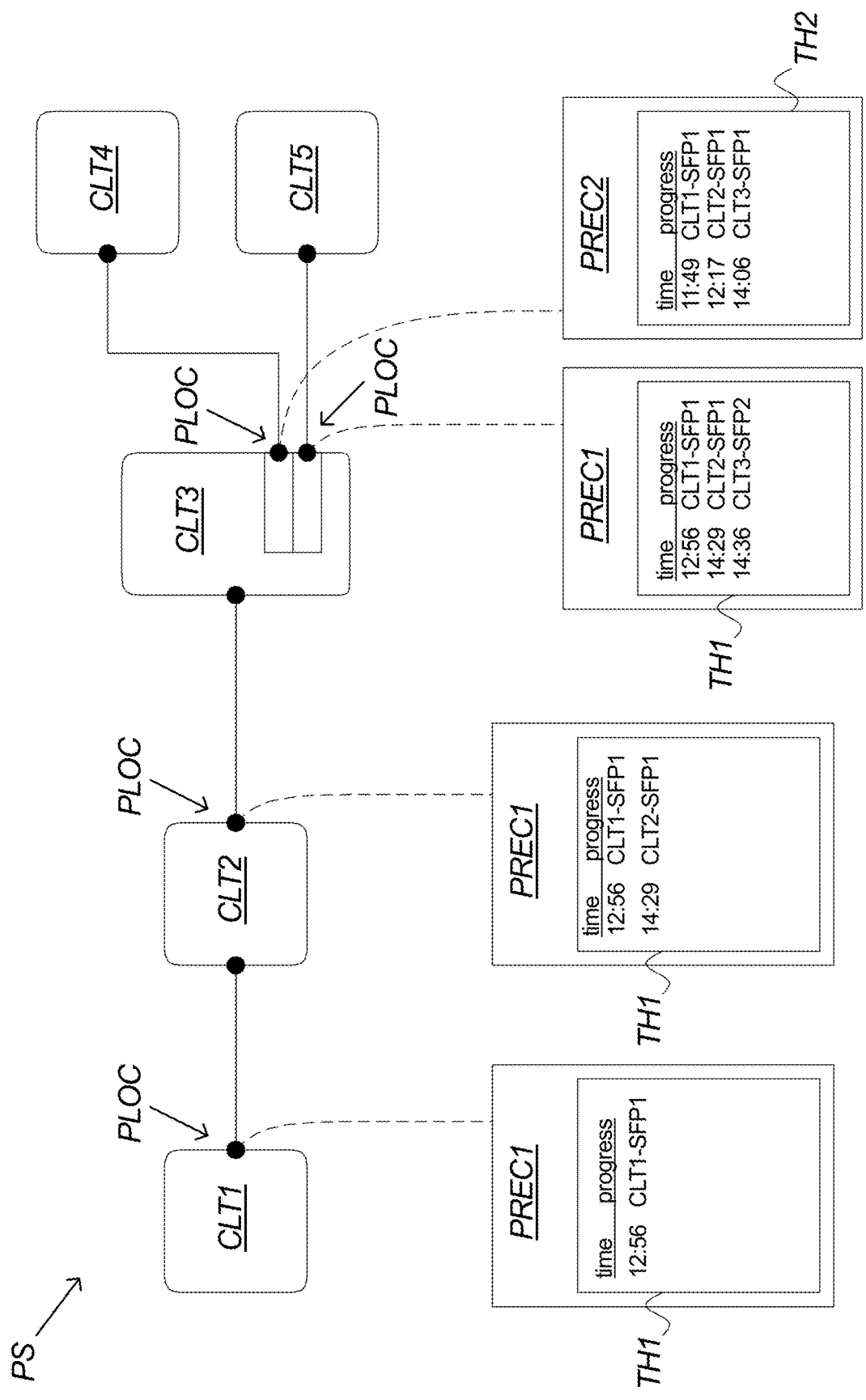
Figure 28:
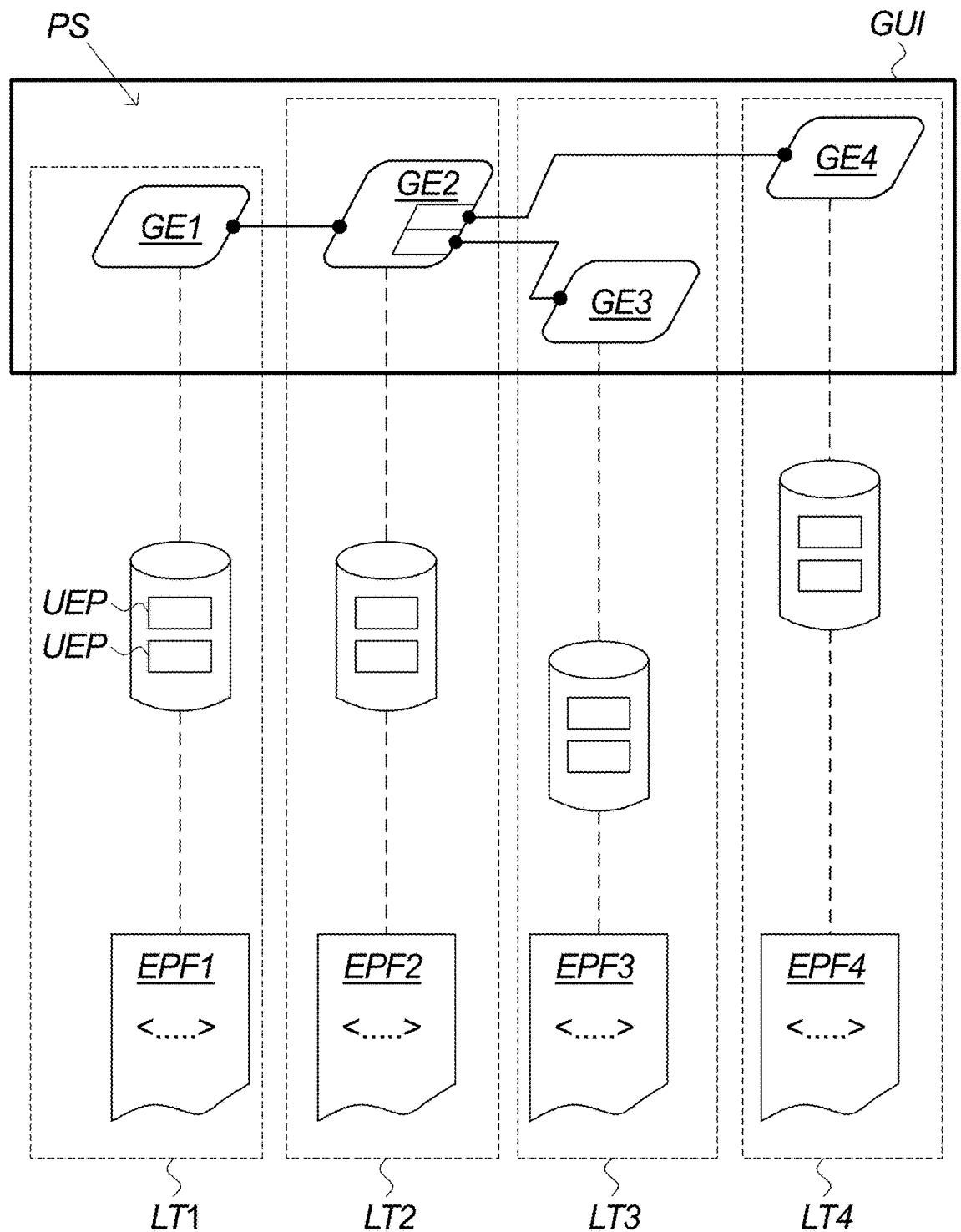
Figure 29:
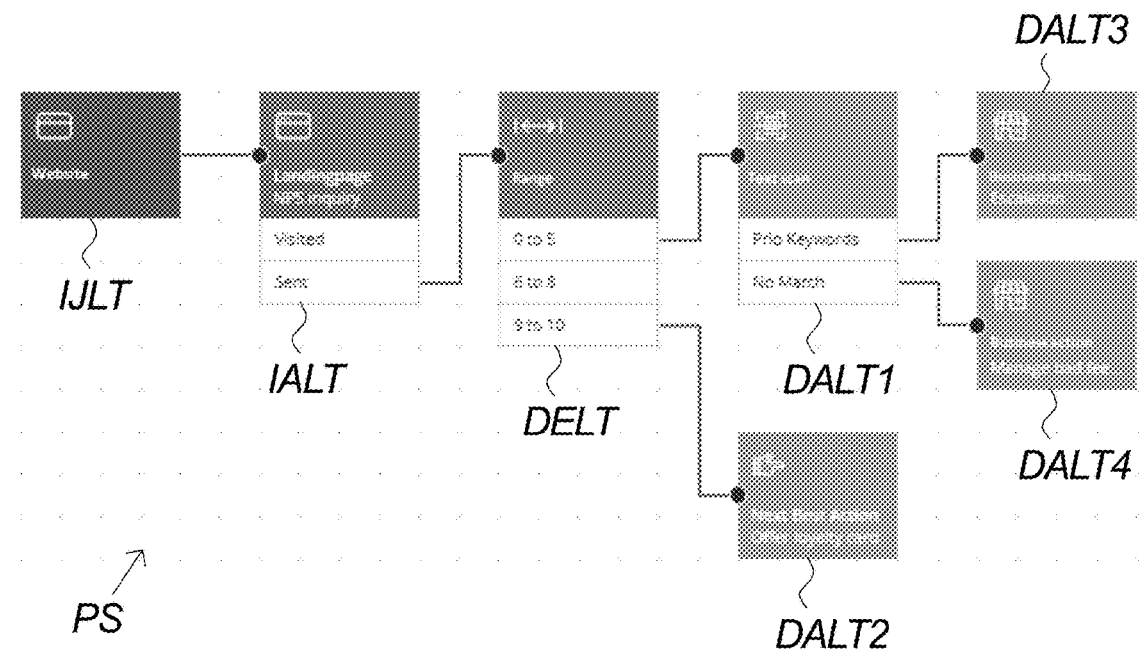
Figure 30:
Figure 31:
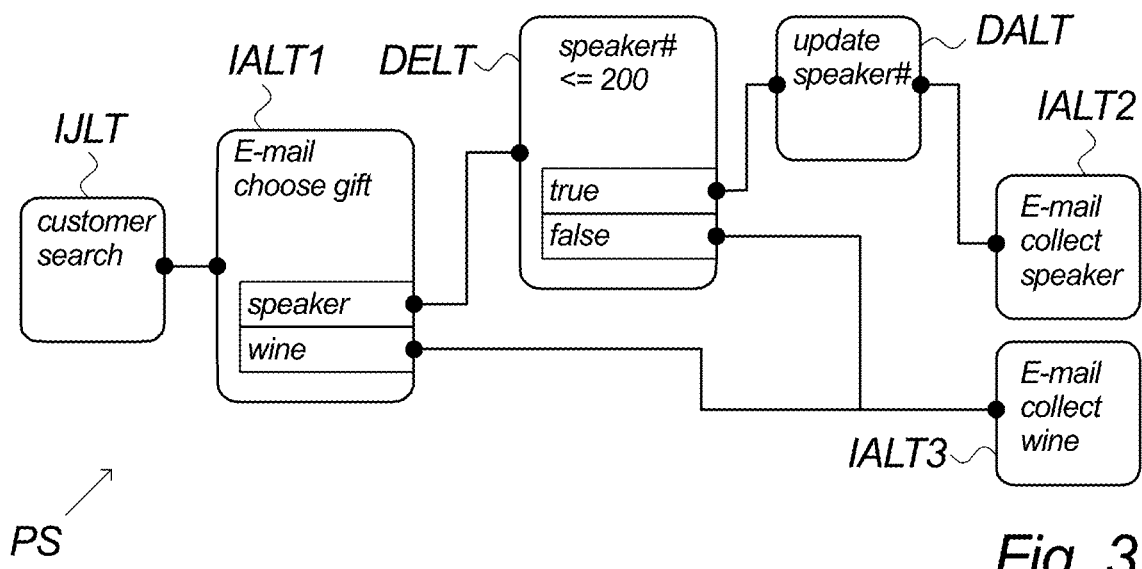
Figure 32:
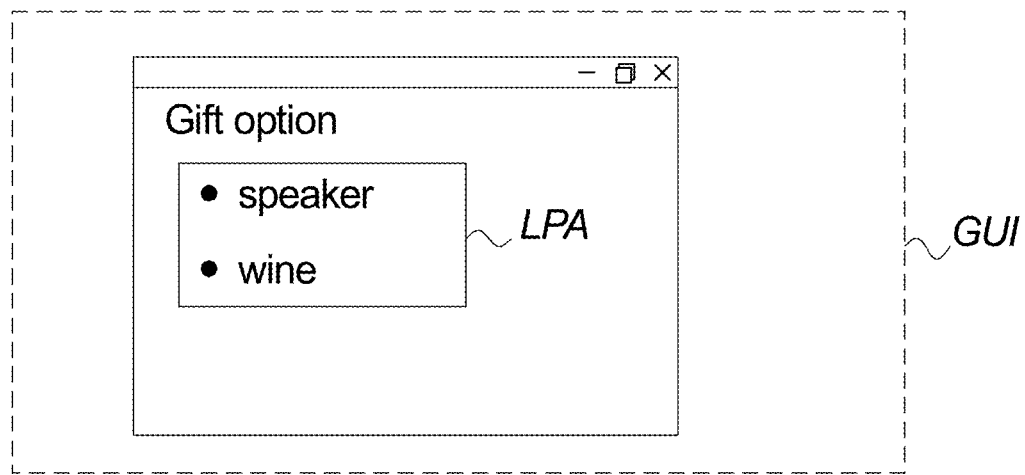
Figure 33:
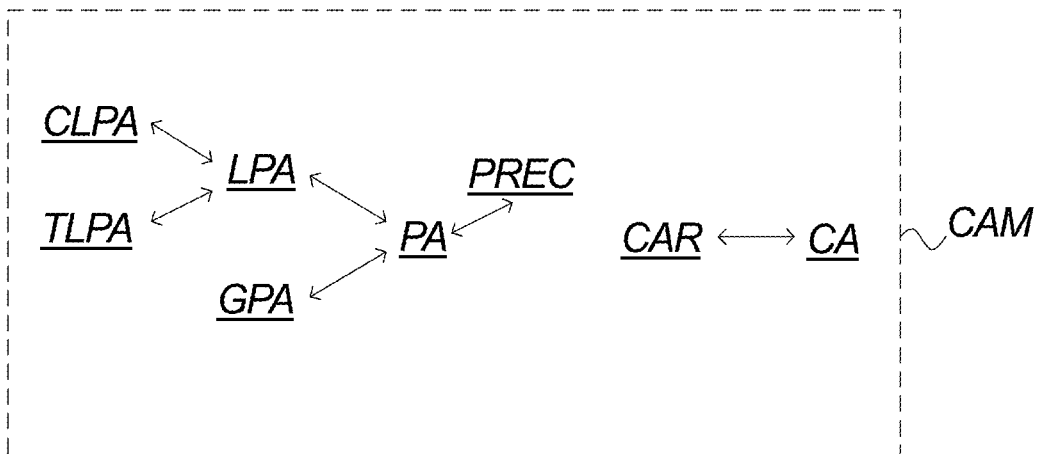
Figure 34:
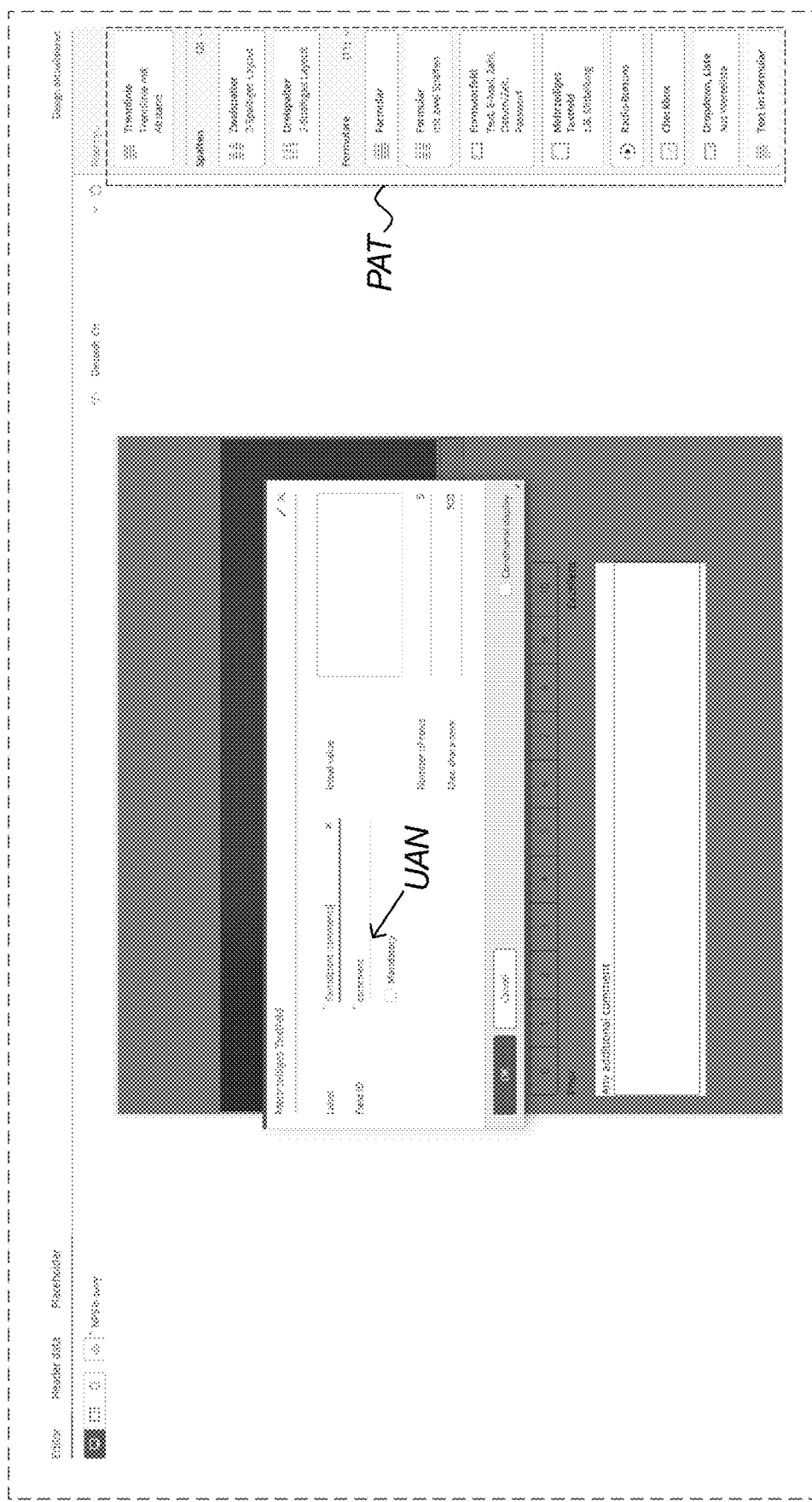
Figure 35:
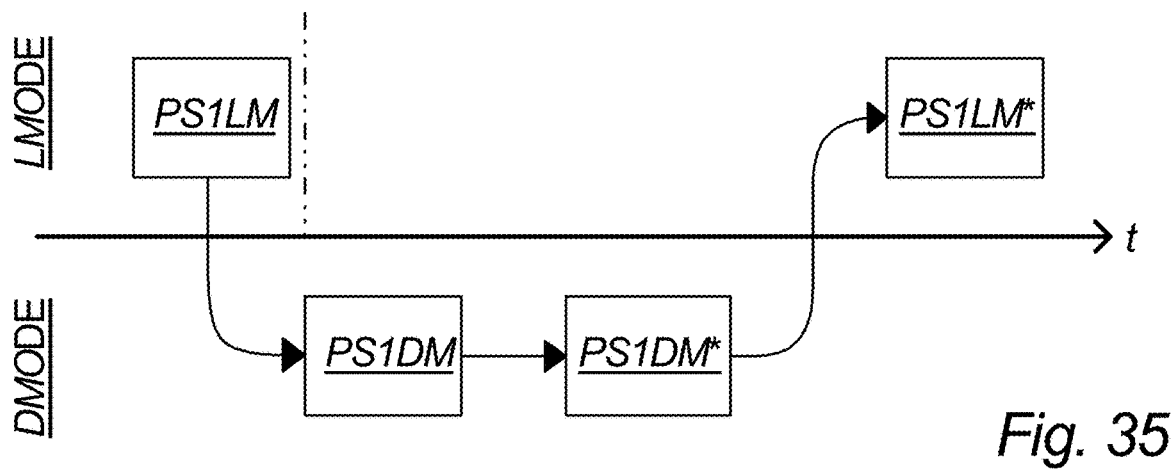
Figure 36:
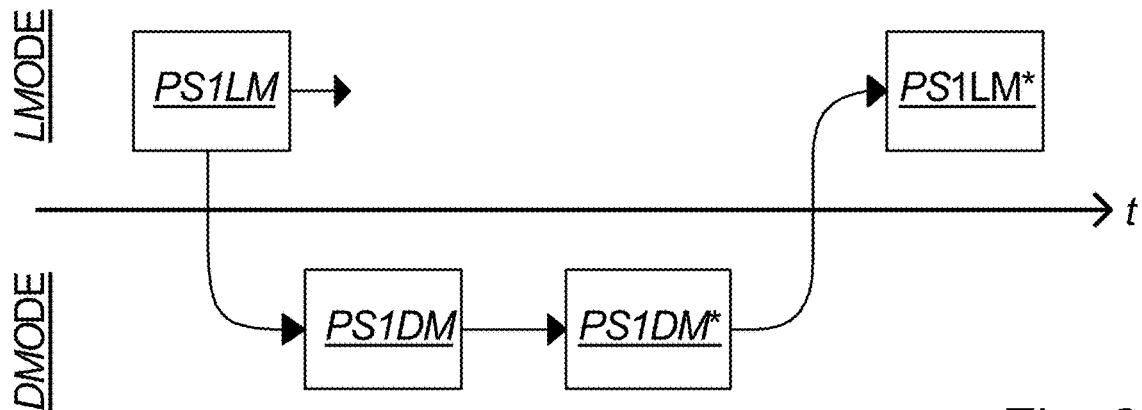
Figure 37:
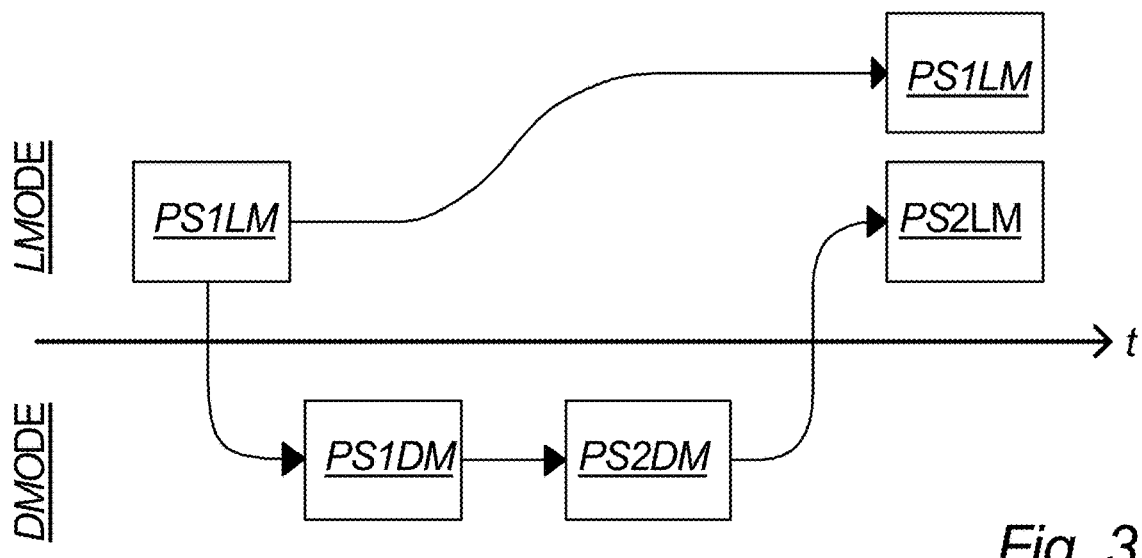
Figure 41:
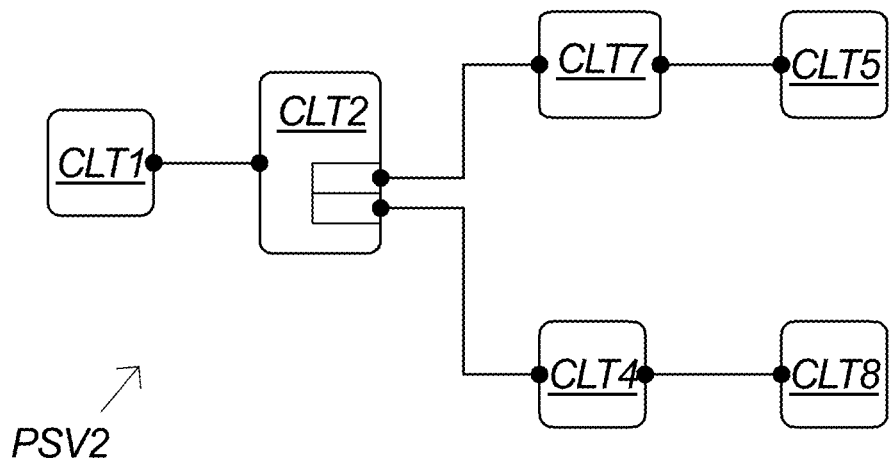
Figure 42:
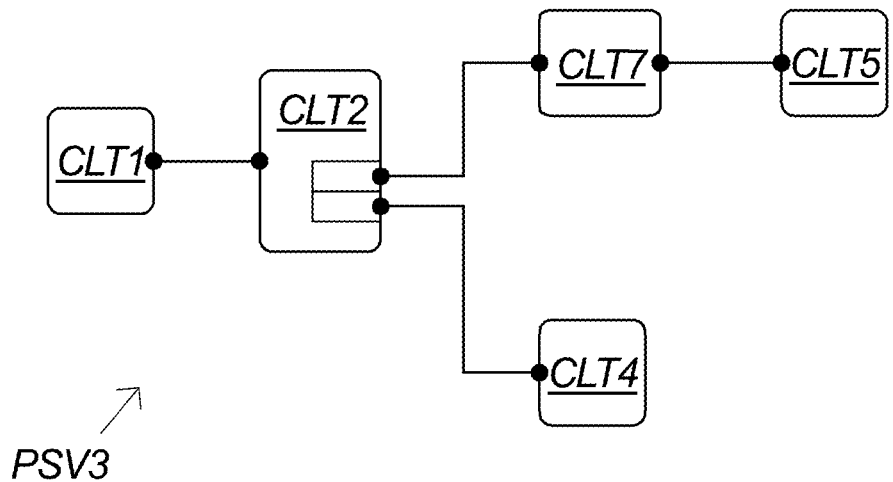
Figure 43:
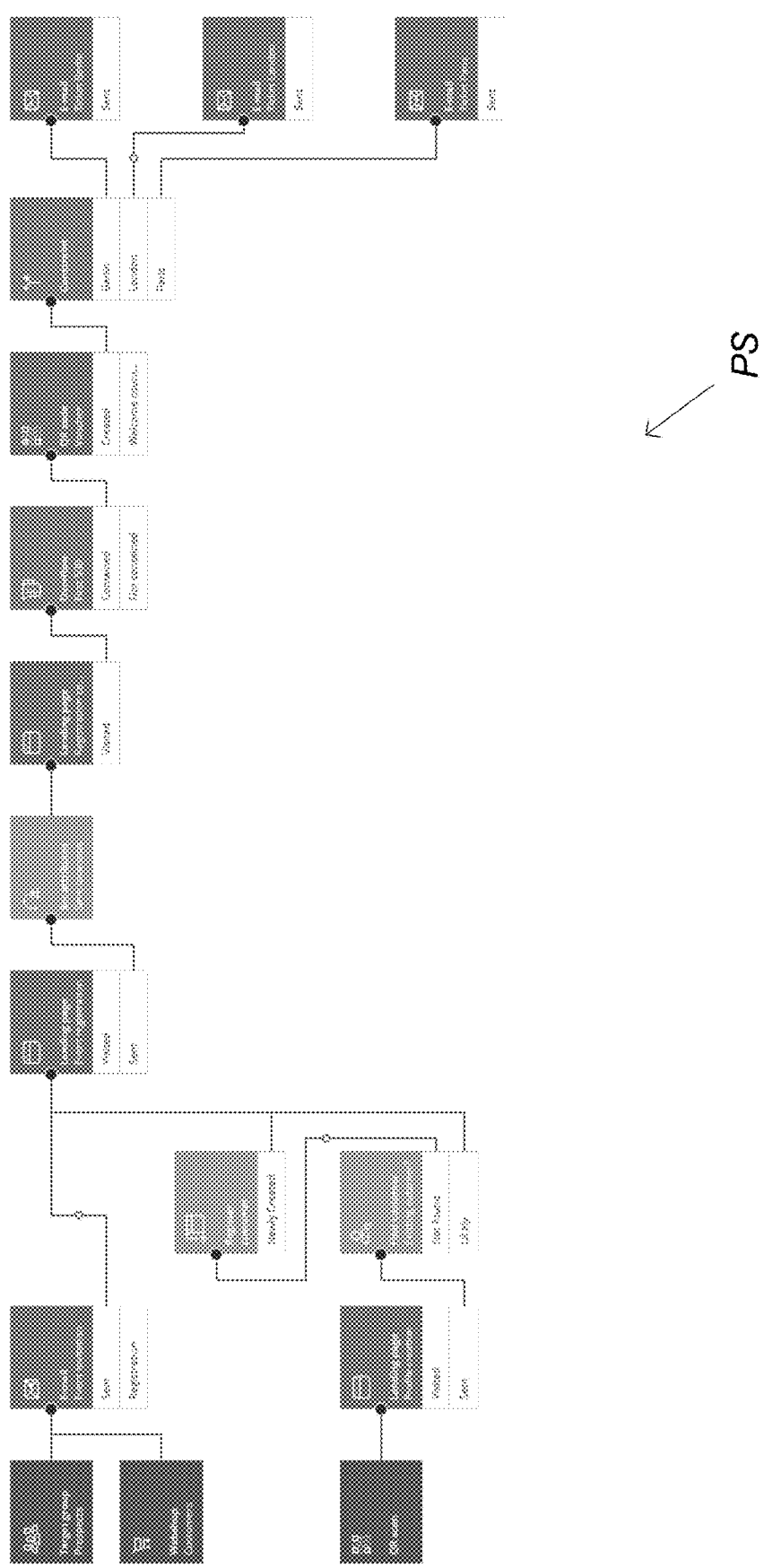
Figure 44:
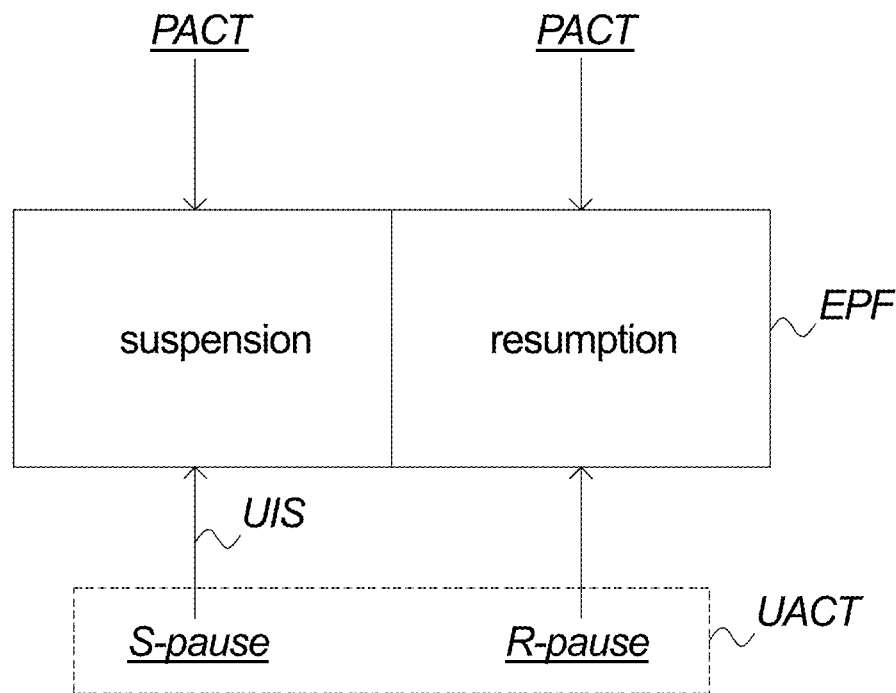
Figure 45:
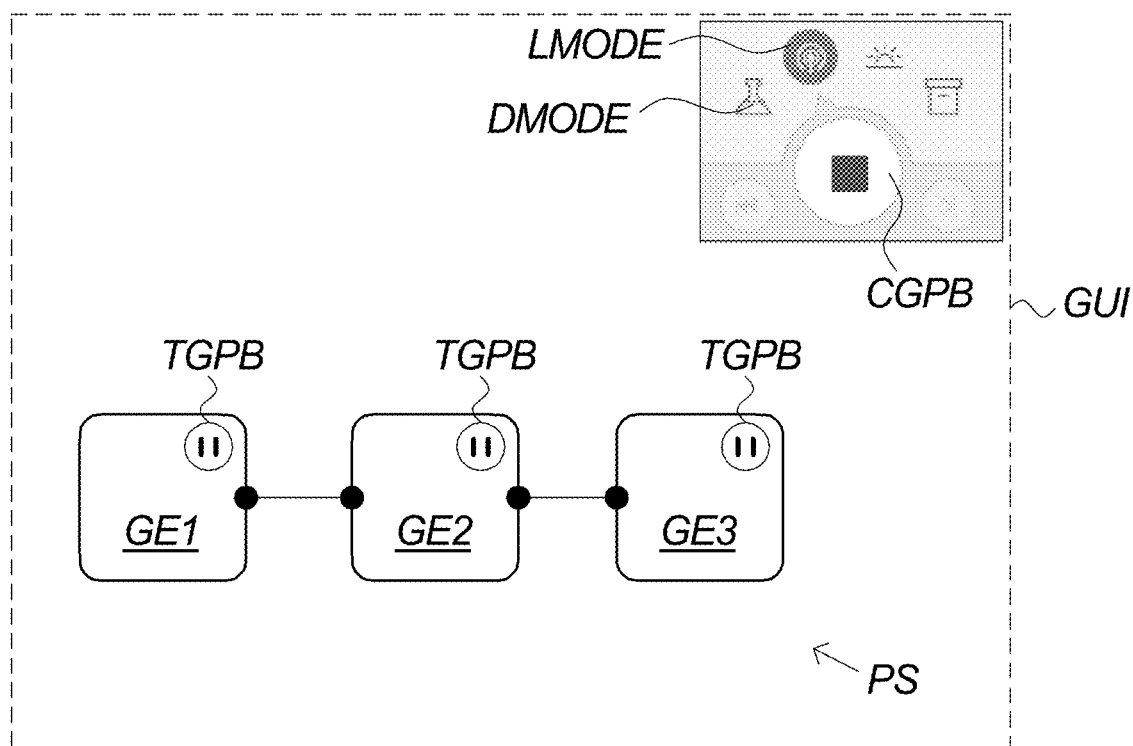
Figure 52:
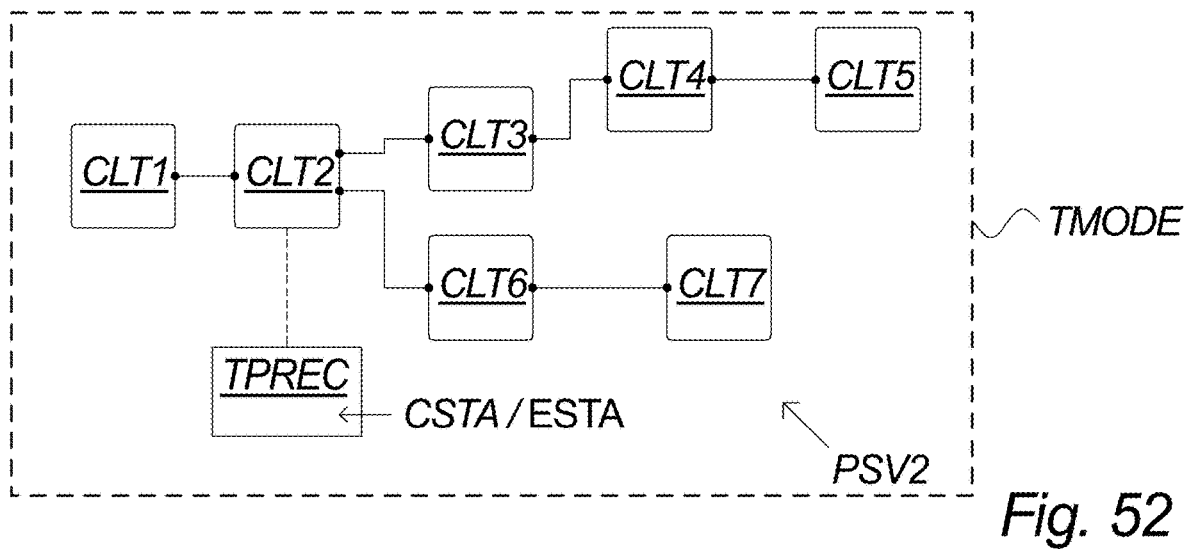
Figure 53:
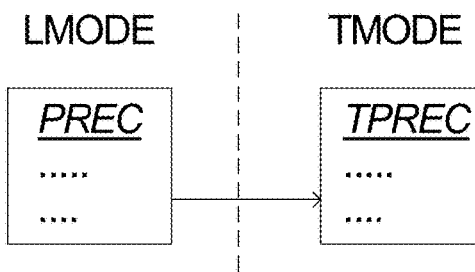
Figure 54:
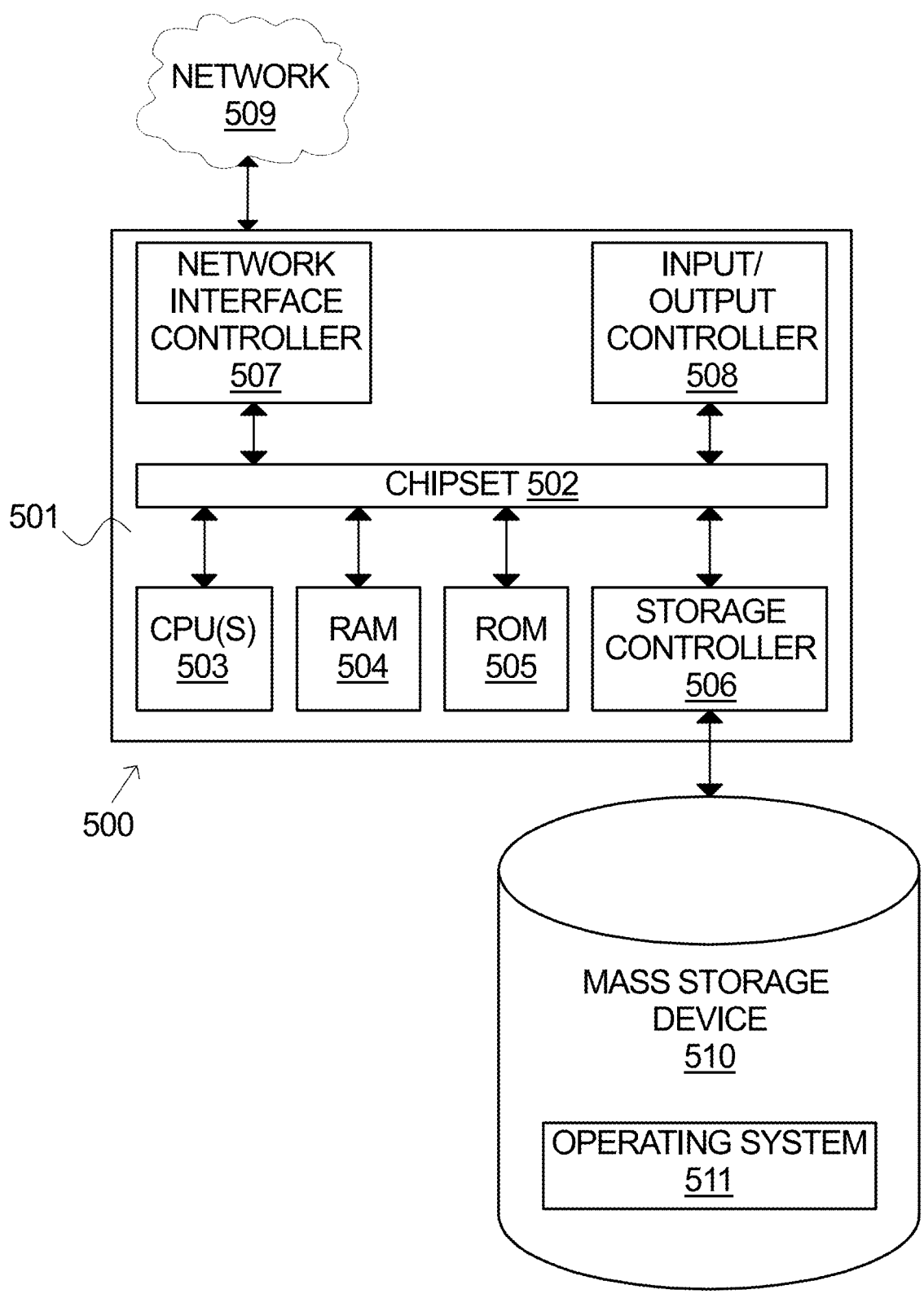

Various embodiments of the invention will in the following be described with reference to the drawings where FIG. 1 illustrates an embodiment of a campaign management system, FIG. 2 illustrates an embodiment of a computer system and a graphical user interface as experienced by a user of a campaign management system, FIGS. 3-5 illustrate embodiments of participant and participant record associations, FIGS. 6-8 illustrate embodiments of relations to master data of the participant, FIGS. 9-10 illustrate embodiments of relations of master data to participant attributes, FIGS. 11-13 illustrate embodiments of process structures defined by logic templates, FIG. 14 illustrates an embodiment of a configured process sequence, FIGS. 15-17 illustrate embodiments of configuring logic templates of a process structure, FIGS. 18-19 illustrates embodiments of looping in a process structure, FIG. 20 illustrates an embodiment of a graphical user interface comprising a graphical design environment and a graphical element library, FIGS. 21-22 illustrate embodiments of process structures as graphically illustrated in a graphical user interface, FIGS. 23-25 illustrate embodiments of progressing a participant record between configured logic templates, FIG. 26 illustrates an embodiment of processing participant records by executable program fragments, FIG. 27 illustrates an embodiment of a track history of a participant record processed according to a process structure, FIG. 28 illustrates an embodiment of logic template comprising a graphical element and an executable program fragment, FIGS. 29-30 illustrate embodiments of configuring user editable parameters, FIGS. 31-32 illustrate embodiments of configuring local participant attributes, FIG. 33 illustrates an embodiment attributes in a campaign, FIG. 34 illustrates an embodiment of choosing a predetermined attribute type and defining a user-defined attribute name, FIGS. 35-37 illustrate embodiments of a live mode and a design mode, FIGS. 38-42 illustrate embodiments of migrating participant records between process structure versions, FIG. 43 illustrates an embodiment of an exemplary campaign, FIG. 44 illustrates an embodiment of suspension and resumption of an executable program fragment, FIG. 45 illustrates an embodiment of a campaign graphical pause button and a template graphical pause button, FIGS. 46-49 illustrate embodiments of pausing a decision logic template and numbering of participant records, FIGS. 50-53 illustrate embodiments of handling participant records and test participant records in live mode and test mode, and FIG. 54 illustrates an embodiment of a computer architecture capable of executing executable program fragments.

DETAILED DESCRIPTION

The present invention relates to campaign management systems CAMS for defining and executing campaigns CAM with respect to participants P. A campaign in the present disclosure may be considered the technical structure set up to manage a customer relationship, advertising campaign, complaint, service or booking procedure, event participant management, project management, object management, product life cycle management, etc. The campaign CAM is defined as a process structure PS in the campaign management system CAMS by a user USER through a graphical user interface GUI, and the participants P are represented in the campaign management system CAMS by participant records PREC. The campaign management system CAMS is described and explained in further details in FIGS. 1, 2, 43 and 54 with optional variants as described in FIGS. 20-22.

The invention campaign management system may advantageously according to advantageous embodiments focus on different ways a participant and a user may affect the execution of a campaign by invoking actively or passively a pause of the campaign as such or e.g. by pausing specified or groups of configured logic templates of a process structure of the campaign. The use of a suspension and the possibility of a subsequent resumption of the campaign makes it possible to pause campaigns e.g. because of overall business strategic or tactical goals but it also makes it possible to address and modify campaigns which have already initiated processing of participant records, i.e. campaigns already running. Different attractive aspects of suspension are described in relation of FIG. 44-49.

FIG. 1 illustrates that the campaign management system CAMS comprise at least a participant record PREC, a process structure PS and a graphical user interface GUI. The participant P is associated with the participant record PREC and the user USER of the campaign management system CAMS is interacting with the process structure PS by means of the graphical user interface GUI. The campaign management system CAMS is hosted by a computer system COM. The campaign management system CAMS may comprise any number of participant records PREC associated with any number of participants P.

FIG. 2 shows an embodiment of the invention. A user USER of the campaign management system CAMS may interact with the system through the graphical user interface GUI which is presented on a display DISP. The display DISP is in communication with a computer system COM, or server computer, which is the computer system hosting the campaign management system. In one embodiment the computer system is a distributed computer system comprising several nodes of processing, and in another embodiment the computer system is a stand-alone computer not forming part of a distributed computer system.

FIG. 3 shows an embodiment of the invention. The drawing illustrates a participant P, which is a real person who is engaging with a campaign CAM, such as for example a marketing campaign. In this context, the participant P may represent a customer to a company who has launched a marketing campaign aimed at their customers. The participant P is represented in the campaign CAM by a participant record PREC which serves as a digital representation of the participant P. Thus, an association exists between the participant P and the participant record PREC, as illustrated by the dotted line in FIG. 3. The association may for example be implemented by the participant records PREC comprising a participant association PAS referring to a more or less unique identifier of the participant P, such as for example an email address, telephone number, customer account number, social media account name, social security number, etc. The participant association PAS may in an embodiment comprise a combination of several data fields, e.g. email address and customer number.

Each participant record PREC preferably comprises a unique participant record identifier PRID in order for the campaign management system CAMS to manage them differently according to their individual processing and interactions with the associated participants P. The participant record identifier PRID may in an embodiment be the participant association PAS used to associate with a participant P, e.g. email address, customer number, etc. In preferred embodiments, the participant record identifiers PRID are arbitrary unique identifiers, e.g. a sequential serial number or a universally unique identifier UUID, whereby the field for association with a participant can be changed and does not have to be unique, without the participant record losing its identification. Thereby is facilitated embodiments to manage several participant records PREC being associated with the same participant P, and embodiments where the association with a participant can change e.g. when better knowledge is achieved. When a container record is used to hold several participant records associated with the same participant, the unique participant record identifier may be implemented as a combination of a container record identifier and a sub-identifier of the individual instances stored in the container record. The container record identifier may be an arbitrary identifier or a participant association PAS.

The participant P may actively engage with the campaign CAM through different interactions such as E-mails, text messages, e.g. SMS (Short Message Service) and a landing page in a web-browser as presented by e.g. a computer, smart phone, electronic tablet, or other electronic devices featuring a display suited for display of such. The interactions by the participant P are thus reflected in the participant record PREC within the campaign CAM. In practice, the participant record PREC comprises a track history TH which is a history, or electronic log, of the interactions of the participant P with the campaign CAM. From the perspective of the participant P, the participant may not be aware of the scope of the campaign CAM that he or she is engaging with, but a user of the campaign management system CAMS managing and overlooking the campaign CAM may be fully aware of the possible ways the participant P can interact with the campaign.

FIG. 4 shows an embodiment of the invention where two participants P1-P2 are each associated with their respective participant records PREC1-PREC2 having unique participant record identifiers PRID1-PRID2 as well as unique participant associations PAS1-PAS2. Thereby the campaign management system CAMS can process each participant individually in accordance with the process structure PS of the campaign CAM. Any number of participants P and associated participant records may be managed by the campaign management system. From the viewpoint of the campaign management system CAMS participant records PREC1-PREC2 not associated with the same participant P, for example because they were created from different master data, are accordingly handled differently by the campaign management system CAMS. An embodiment is configured with a check whereby, at a later point in time during the campaign CAM, the campaign management system CAMS may realize that the two participant records PREC1-PREC2 are actually associated with the same participant P, i.e. participant P1 is the same as participant P2, and treat the two participant records as the same participant record for example by merging the participant records PREC1-PREC2. This situation may for example be discovered if it turns out contact information, e.g. email-addresses, for two participants are identical.

FIG. 5 shows an embodiment of the invention. The drawing illustrates that a single participant P is associated with two participant records PREC1-PREC2, as illustrated by the two dotted lines. Each of the two participant records PREC1-PREC2 comprise a unique participant record identifier PRID1-PRID2, but they share the same participant association PAS1. In other embodiments of the invention the participant P may be associated with any number of participant records PREC. The reasoning behind having associations between a single participant P and two or more participant records PREC is that a participant P may have different relations to a campaign CAM based on e.g. the way the participant P entered the campaign CAM. As an example, a participant P may first enter a campaign CAM through a social media channel such as Facebook, Twitter or LinkedIn and later join the same campaign CAM using a different channel, such as by E-mail or by scanning a QR-code which redirects him or her to a landing page in a web browser where the participant may fill in a registration form that enters the participant P in the campaign CAM. Since the participant P may enter the same campaign CAM through different channels, and e.g. by using different credentials, such as Facebook account name and email address, different participant records PREC are created. This is advantageous since it allows for different ways of processing the same participant P through the campaign which may be of great benefit to campaigns where it is interesting to process participants P differently depending on the way they were injected to the campaign CAM. Two or more participant records PREC associated with the same participant P may also occur when the participant decides to pursue several options provided by the campaign CAM and requiring processing according to different parallel threads, or when a process structure PS requires parallel handling of the same participant P, thereby requiring a forking of the participant record PREC.

FIG. 6 shows an embodiment of the invention. The drawing further elaborates on the associations between a participant P and a participant record PREC as illustrated in FIGS. 3-5. The participant P is related to master data MD which is data about the participant such as identification information, contact information, account information, E-mail addresses, address, telephone number, financial information, interests and sales information, or any other data related to the participant P. The participant record PREC is also related to master data MD concerning the participant P, and thus the association between a participant P and a participant record PREC is facilitated by master data MD. The relation between the participant P and the master data MD and the relation between the participant record PREC and the master data MD are illustrated by solid lines in FIG. 6.

FIG. 7 shows an embodiment of the invention. The drawing illustrates that a participant P is associated with two distinct participant records PREC1-PREC2. The associations with the participant P are facilitated through master data MD which is stored in a database of master data MDB, which could be any data source for data about the participant. In this embodiment, the two participant records PREC are related to different subsets of the master data MD contained in the same database of master data MDB, and may therefore be regarded as different instances of the master data MD or different instances of the participant P. As an example, the database of master data MDB may contain an email address, social media contact information, a home address and a telephone number. A first participant record PREC1 may include a first subset of master data, such as social media contact information and the other participant record PREC2 may include another subset of master data, such as email address and a telephone number. Because the two participant records PREC1-PREC2 are not relating to identical subsets of master data MD, they may be regarded as different instances of the master data, or different representations of the participant P in the context of the campaign CAM. In an embodiment, the two participant records PREC1-PREC2 associated with the same participant P may comprise identical subsets of the master data MD, as the several participant records PREC1-PREC2 associated with the same participant P still facilitates individual processing of each participant record, and thereby the possibility for the participant to experience different processing sequences through the campaign, or the same processing sequence several times.

FIG. 8 shows an embodiment of the invention. The drawing illustrates that master data MD relating to a participant P is stored in two different databases of master data MDB1-MDB2, which can be any data source. As an example, the participant may have master data MD stored in a cloud-based data source managed by a social media service provider, such as Facebook, Twitter and LinkedIn and other master data MD stored in a local CRM database, or for example a database managed by an email service provider such as Google, Microsoft and AOL. In other embodiments of the invention, the master data MD relating to a participant P is stored in a plurality of databases of master data MDB.

The master data MD, stored in different databases of master data MDB1-MDB2, are related to two different participant records PREC1-PREC2 which are each associated with the same participant P. Master data MD from a first database MDB1 may be related to two different participant records PREC1-PREC2. As an example, a database may store a telephone number and an email address of a participant P, and one participant record may use the telephone number whereas another participant record may use the email address. In this example, master data MD from the second database of master data MDB2 is uniquely related to the first participant record PREC1.

FIGS. 9-10 show embodiments of the invention. The drawing of FIG. 9 illustrates a participant record PREC comprising global participant attributes GPA and local participant attributes LPA. The participant record PREC is associated with a participant P of a campaign CAM as described above.

The global participant attributes GPA relate to data for the participant P which have existed prior to the beginning of the campaign CAM and which data represents at least a subset of available master data MD. This may for example be participant contact interface information PCII relating to a participant contact interface PCI, data about the identity of the participant, e.g. name, customer number, social security number, etc., data about preferences of the participant such as interests, favorites, etc., data about earlier history with the participant such as earlier webshop visits, transactions, communications, complaints, etc. Participant contact interfaces may e.g. be email client, telephone, message service interface, social media interface, geographical address for postal services or physical meeting, a communication client on a computer, smartphone or other connected device, etc. The participant contact interface information PCII is information enabling establishing a communication through a participant contact interface, e. g. email-address, a telephone number, a social media account name, a street address, an internet address or other network address e.g. IP-address, a device address e.g. MAC-address or advertising identifier, or a participant identifier.

The master data MD is stored in a database of master data MDB, e.g. a data source, such as for example a CRM database. Therefore, the master data MD may not be uniquely linked to global participant attributes GPA of participant records PREC of a specific campaign CAM but may be used for various participant records PREC each belonging to a specific campaign CAM. The global participant attributes GPA corresponds represents only a subset of the available master data MD as illustrated. The subset may in various embodiments include all available master data MD, a part thereof, a derived version thereof, or simply a single piece of information forms the master data MD, e.g. a name or a customer number. The global participant attributes GPA may store a copy of the subset of master data MD or a derived version thereof, or it may simply store a reference to the master data MD which also allows the campaign management system CAMS to later rely on possibly updated values of the master data MD.

The local participant attributes LPA are attributes that are not derived from external master data MD but are defined and used within a specific campaign CAM.

FIG. 10 shows an embodiment of the invention. The drawing illustrates that global participant attributes GPA of a participant record PREC relate to master data MD stored in two different databases of master data MDB1-MDB2.

The campaign CAM as discussed in the above is managed and overlooked by a user of the campaign management system CAMS. The campaign management system CAMS is a computer implemented system which a user of the system may interact with in order to design a campaign CAM. The campaign CAM in the context of the campaign management system CAMS is represented by a process structure PS comprising logic templates LT and/or configured logic templates CLT as will be explained in the following.

FIG. 11 shows an embodiment of the invention. The drawing illustrates an example of a simple process structure PS representing a campaign CAM. The process structure PS comprises three logic templates LT1-LT3 which together defines a processing sequence of a participant record PREC within the campaign CAM. In this regard, the logic templates LT1-LT3 may be regarded as the execution steps of the campaign which are capable of processing participant records PREC throughout the campaign CAM. Different campaigns CAM may be designed by the user of the campaign management system CAMS by defining more process structures PS with logic templates LT. A participant P interacts with the campaign CAM, as defined by the process structure PS, and the representation of the participant, i.e. an associated participant record PREC is processed by the individual logic templates LT1-LT3 according to the process structure PS. In the example, a participant record PREC is first processed by the first logic template LT1 before respectively being processed by the second and third logic templates LT2-LT3. By processing of a participant record PREC is understood e.g. updating of a track history TH, described below e.g. with reference to FIG. 27, of the participant record PREC, modifying participant attributes PA, described below e.g. with reference to FIG. 31, of the participant record PREC, executing actions defined by the logic templates, etc. The logic templates LT1-LT3 are steps of processing which may create participant records PREC within the campaign CAM, facilitate interactions with a participant P and perform logical operations to participant records PREC, e.g. filtering operations. Various roles, tasks and features of different logic templates are described below, for example with reference to FIG. 29.

FIG. 12 shows a zoom-in on the second logic template LT2 of FIG. 11. The zoom-in, as illustrated by a dashed circle, shows that the second logic template LT2 comprises two sequence connection points referred to as a sequence receive point SRP and a sequence forward point SFP. In this embodiment, the first logic template LT1 comprises a sequence forward point SFP which is coupled to a sequence receive point SRP of the second logic template LT2, and the sequence forward point SFP of the second logic template LT2 is coupled to a sequence receive point SRP of the third logic template LT3. It is the couplings of sequence forward points SFP and sequence receive points of logic templates LT that define possible processing sequences of logic templates LT within a process structure PS. In this example, only one possible sequence of logic templates is shown, i.e. the sequence starting with the first logic template LT1, passing through the second logic template LT2 and ending with the third logic template LT3.

FIG. 13 shows an embodiment of the invention. The drawing illustrates another process structure PS comprising four logic templates LT1-LT4. As seen in the figure, the structure of logic templates features a sequence branching at the second logic template LT2. This branching is due to the fact that the second logic template LT2 comprises two sequence forward points SFP. Clearly, by increasing the number of sequence forward points SFP of a logic template LT, more complex sequences of logic templates LT may be formed.

FIG. 14 shows the same process structure PS as in FIG. 13. The branching of the sequence of logic templates clearly facilitates different paths, referred to as processing sequences, throughout the process structure. In this example, two different paths are generated due to the configuration of the second logic template LT2 with two sequence forward points which are both connected to individual logic templates LT3-LT4. These two distinct paths are referred to as configured process sequences CPSEQ. The first configured process sequence CPSEQ1 comprises the sequence of the first logic template LT1, the second logic template LT2, and the third logic template LT3. The second configured process sequence CPSEQ2 comprises the sequence of the first logic template LT1, the second logic template LT2, and the fourth logic template LT4.

In the context of this process structure PS, other configured process sequences CPSEQ are also present. As an example, the coupling of the second logic template LT2 and the fourth logic template LT4 defines another configured process sequence CPSEQ. In this sense, a configured process sequence CPSEQ is any coupling of any number of logic templates LT through couplings between sequence forward points SFP and sequence receive points SRP. It is further evident from FIGS. 13-14 that a logic template LT may be included in more than one configured process sequence CPSEQ. In fact, depending on the complexity of the process structure PS, a logic template LT may be included in any number of configured process sequences CPSEQ.

The user of the campaign management system CAMS may design a campaign CAM by defining a process structure PS comprising logic templates LT that are coupled to define one or more configured process sequences CPSEQ which participant records PREC may be processed by reference to. In order for the campaign CAM to be fully executable, the logic templates LT have to be fully configured by properly defining user editable parameters UEP of the respective logic templates LT. The user editable parameters UEP may be regarded as settings for the individual logic templates LT, and are described in more detail below, for example with reference to FIGS. 29-30. A logic template LT which is fully configured by the user of the campaign management system CAMS is referred to as a configured logic template CLT. A configured logic template CLT is executable by a processing engine ENG of the campaign management system CAMS, described below, e.g. with reference to FIGS. 23-26.

FIG. 15 shows an embodiment of the invention. The drawing illustrates a process structure PS comprising logic templates that have been configured in such a way that three configured logic templates CLT1-CLT3 are present. As seen, two distinct configured process sequences are present. A configured process sequence comprising the first configured logic template CLT1, the second configured logic template CLT2, and the third configured logic template CLT3, and a configured process sequence comprising the first configured logic template CLT1, the second configured logic template CLT2, and the fourth logic template LT4. The fourth logic template LT4 represents a logic template which has not yet been configured. Although the fourth logic template LT4 has not been fully configured it still forms part of a configured process sequence. In a preferred embodiment, the process structure PS of FIG. 15 can be executed even without the fourth logic template LT4 being configured. However, when a processing along the second configured process sequence reached the fourth logic template LT4, the execution may be suspended until this logic template has been configured and thereby allows execution to resume.

FIG. 16 shows the same process structure PS as in FIG. 15, however the fourth logic template LT4 is now fully configured such that this logic template is now a fourth configured logic template CLT4.

FIG. 17 shows an embodiment of the invention. The drawing illustrates a process structure PS similar to the process structure PS shown in FIG. 16 with the addition of a fifth logic template LT5. The fifth logic template LT5 is not coupled to any of the other configured logic templates CLT1-CLT4 of the process structure and as such it does not form part of any configured process sequence CPSEQ until such a coupling established. The fifth logic template LT5 may also form part of a future configured process sequence established through association with other logic templates LT inserted into the process structure PS at a later time by the user of the campaign management system CAMS.

A process structure PS may not necessarily only feature configured process sequences CPSEQ that follow a strict ordering of logic templates or configured logic templates CLT where each of these only appear in the configured process sequence once.

FIG. 18 shows an embodiment of the invention. The drawing illustrates a process structure PS comprising five configured logic templates CLT1-CLT5. Both the second configured logic template CLT2 and the fourth configured logic template CLT4 comprises two sequence forward points SFP such that each of these configured logic templates are forming part of more than one configured process sequence. One of the sequence forward points of the fourth configured logic template CLT4 couples to a sequence receive point SRP of itself, as graphically shown by a loop. In principle, this means that an infinite number of configured process sequences CPSEQ is configured since a configured process sequence CPSEQ which includes such a loop may include the loop any number of times. In practice the fourth configured logic template CLT4 may be configured by the user of the campaign management system such that it only allows a certain number of loops, or re-entries, of a participant record PREC in the logic template.

FIG. 19 shows an alternative embodiment of the invention. The drawing illustrates that the fourth configured logic template CLT4 by two different sequence forward points is coupled to the fifth configured logic template CLT5 as well as the second configured logic template CLT2, which coupling forms a loop, or re-entry, into the second configured logic template CLT2. In principle, this means that an infinite number of configured process sequences CPSEQ is configured since a configured process sequence CPSEQ which includes such a loop may include the loop any number of times. In practice the fourth configured logic template CLT4 may be configured by the user of the campaign management system such that it only allows a certain number of loops, or re-entries, of a participant record PREC in the logic template.

A user of the campaign management system CAMS is able to design and create a campaign CAM by defining a process structure PS comprising logic templates LT and/or configured logic templates CLT which are coupled to each other through sequence forward points SFP and sequence receive points SRP. The user does this through a graphical user interface GUI of the campaign management system CAMS, which may be visible to the user on a display/screen associated with a computer/server.

FIG. 20 shows an embodiment of the invention. The drawing illustrates a graphical user interface GUI, which is the interface of the campaign management system CAMS that the user interacts with. The graphical user interface GUI allows the user of the campaign management system CAMS to design and build a process structure PS of logic templates LT and configure them to form configured logic templates CLT. A logic template LT, or configured logic template CLT, comprises a graphical element GE, which serve as a graphical representation of the logic template in the graphical user interface GUI. A process structure PS comprising logic templates LT and/or configured logic templates CLT is thereby also visible in the graphical user interface GUI through couplings of graphical elements GE.

The process structure PS shown in FIG. 20 represents the same process structure PS shown in FIG. 11, but merely on a graphical level as visualized in the graphical user interface GUI. The process structure PS, in this example, comprises three graphical elements GE1-GE3 that are coupled by graphical connections GC between sequence forward points SFP and sequence receive points SRP of the graphical elements. The sequence forward points SFP and sequence receive points SRP are embodied as dots and the graphical connections are embodied as lines, although other geometrical shapes are conceivable. Likewise, the graphical elements GE may take any shape or form. By placing the graphical elements GE1-GE3 in a graphical design environment GDENV of the graphical user interface GUI and connecting the graphical elements GE1-GE3 by graphical connections GC, the user of the campaign management system CAMS is enabled to define a desired process structure PS comprising one or more configured process sequences CPSEQ in an intuitive way. In this example, the second graphical element GE2 comprises a single sequence forward point SFP, however in other embodiments of the invention, a graphical element GE may comprise a plurality of sequence forward points SFP.

The graphical user interface GUI further comprises a graphical elements library GEL, which shows the user of the campaign management system CAMS the graphical elements GE that are available to him/her in the process of defining a process structure PS. The graphical element library GEL may present the graphical elements GE in a manner where the graphical elements GE are sorted according to the functions of the corresponding logic templates LT. The user of the campaign management system CAMS may select graphical elements GE to be placed in the graphical design environment GDENV by scrolling up or down in the graphical elements library GEL if the library contains more graphical elements GE than what may be presented in the view at the same time. Selections in the graphical user interface GUI may be performed using a mouse cursor MC. In this view, the graphical user interface GUI can illustrate ten different graphical elements GE at the same time. In other embodiments of the invention, the graphical elements library GEL is arranged to display any number of graphical elements GEL at the same time.

By clicking on and dragging graphical elements GE from the graphical elements library GEL to the graphical design environment GDENV using a mouse cursor MC, the user of the campaign management system is able to select graphical elements GE1-GE3 needed for a desired process structure PS. By drawing a line, using the mouse cursor MC, between sequence forward points SFP and sequence receive points SRP of the graphical elements GE1-GE3, the user is able to couple the graphical elements GE1-GE3 and thereby defining configured process sequences CPSEQ. On the graphical level, as illustrated in the graphical user interface GUI, the couplings are represented by the graphical connections GC. In this embodiment, the graphical connections GC are drawn by dragging a line from a sequence forward point SFP to a sequence receive point SRP or vice versa from a sequence receive point SRP to a sequence forward point SFP. Generally, pointer-based (e.g. by a computer mouse) or touch-based (e.g. by a finger tip) drag-and-drop functionality as known by the person skilled in the art of graphical user interfaces may be provided for intuitive building and rearranging of the process structure.

FIG. 21 shows another process structure PS as shown in a graphical user interface GUI. The process structure PS comprises six graphical elements GE-GE6 coupled by graphical connections. As seen, the process structure PS comprises two configured process sequences CPSEQ; a first configured process sequence CPSEQ1 comprising a first graphical element GE1, a second graphical element GE2, a third graphical element GE3 and a fourth graphical element GE4, and a second configured process sequence CPSEQ2 comprising the first graphical element GE1, the second graphical element GE2, a fifth graphical element GE5 and a sixth graphical element GE6. Thereby is also shown that the second graphical element GE2 is included in two different configured process sequences, in this example because it has two sequence forward points which are both connected. As the graphical elements represent logic templates, the two configured process sequences visualized graphically in the graphical user interface of FIG. 21 represents a process structure similar to the one shown in FIG. 14, however with an additional logic template added to the end of each configured process sequence.

FIG. 22 shows an embodiment of the invention. The drawing shows a process structure PS comprising five graphical elements GE1-GE5. The fourth graphical element comprises two sequence forward points SFP; one sequence forward point SFP coupling the fourth graphical element GE4 to the fifth graphical element GE5, and a sequence forward point SFP coupling the fourth graphical element GE4 with the second graphical element GE2, such that a loop is created.

FIGS. 23-25 show embodiments of the invention. The drawings illustrate how a participant record PREC advances through a section of a process structure PS, or a configured process sequence CPSEQ, comprising a first configured logic template CLT1 and a second configured logic template CLT2. The underlying methodology of advancing a participant record PREC, which is described in the following, is applicable to any configured process sequence CPSEQ of any number of configured logic templates CLT.

In FIG. 23 the participant record PREC is processed by the executable program fragment EPF associated with the first configured logic template CLT1, as described in more detail below, for example with reference to FIG. 28. The processing of the participant record PREC includes selecting for the participant record PREC a sequence forward point SFP of the first configured logic template CLT1, as also shown in FIG. 24. In this example, the first configured logic template CLT1 comprises three sequence forward points SFP, one of which couples to a sequence receive point SRP of the second configured logic template CLT2. The other two sequence forward points SFP of the first configured logic template CLT1 couples to sequence receive points SRP of other configured logic templates CLT not shown in the figure. By selecting for a participant record PREC a sequence forward point SFP is understood that the track history TH of the participant record PREC is updated with a new entry specifying the sequence forward point SFP. The updating of the track history TH is performed by the executable program fragment EPF, however, in another embodiment the updating of the track history TH is performed by the processing engine ENG.

The participant record PREC is advanced through the process structure by the processing engine ENG on the basis of the track history TH of the participant record PREC and the process structure PS. The processing engine ENG is arranged to interpret the process structure PS as well as looking into the track history TH of a participant record PREC in order to determine the next processing step of the participant record PREC. In this example, the processing engine ENG looks up in the track history TH of the participant record PREC, and determines, on the basis of the latest entry, that the participant record PREC has completed the first configured logic template CLT1 and is ready for further processing. The latest entry specifies a specific sequence forward point SFP, and by looking into the process structure, the processing engine ENG determines that the participant record PREC is ready to be processed by the executable program fragment associated with the second configured logic template CLT2 since the second configured logic template CLT2 is coupled to the first configured logic template CLT1 through the specific sequence forward point SFP. The processing of the participant record PREC is then advanced to the second configured logic template CLT2 as shown in FIG. 25.

As the processing of the participant record PREC advances through a configured process sequence CPSEQ the actual executed process sequence EPSEQ continues to grow in length and thereby comprises more configured logic templates CLT that the participant record PREC has been processed by. Thus, different participant records PREC may be associated with different executed process sequences EPSEQ since these participant records PREC have been handled differently throughout the process structure PS of the campaign CAM. Thereby it is possible, even likely, for different participant records PREC to have undergone different executed process sequences EPSEQ, also different participant records PREC pertaining to the same participant P.

In an embodiment of the invention, the processing of participant records PREC is queue-based. By queue-based it is understood that after a participant record PREC is processed by a configured logic template CLT it is associated with a sequence forward point SFP of that configured logic template CLT and the job of deciding which next configured logic template CLT, if any, to forward the participant record PREC to is put in a queue system. This allows for asynchronous processing of participant records PREC.

FIG. 26 shows an embodiment of the invention. The drawing is a sequence diagram illustrating an example of the processing of participant records PREC pertaining to a participant P in accordance with a part of an example process structure PS. The example process structure may for example be the process structure illustrated in FIG. 16, having two configured process sequences CPSEQ1-CPSEQ2. The sequence diagram also shows an embodiment of creating two participant records PREC associated with the same participant P. The sequence diagram comprises six timelines, each from the viewpoint of either the processing engine ENG of the campaign management system CAMS, the participant P, or a first, second, third or fourth executable program fragment EPF1-EPF4 of respective configured logic templates CLT. The timelines are in the direction of increasing time t. The horizontal arrows on the figure illustrates how the responsibility of processing/handling of participant records changes over time.

At first the first executable program fragment EPF1, which may for example be part of an injection logic template IJLT as described below, and for example correspond to the first logic template CLT1 in the process structure of FIG. 16, injects the participant P into the campaign CAM by creation of a first participant record PREC1. Once the participant record PREC1 is created, the processing engine ENG is triggered, e.g. by a message on a queue, e.g. by fetching data from the queue comprising the first participant record PREC1, to determine how to process the first participant record PREC1 further. The ENG figures out what sequence forward point SFP of the configured logic template CLT, comprising the first executable program fragment EPF1, was selected for the first participant record PREC1. Furthermore, the processing engine ENG interprets the process structure PS of the campaign CAM. In this example the configured logic template comprising the first executable program fragment EPF1 couples to another configured logic template, e.g. corresponding to the second configured logic template CLT2 of FIG. 16, comprising a second executable program fragment EPF2. The processing engine ENG determines that the next line of processing of the first participant record PREC1 is to be carried out by the second executable program fragment EPF2, and hands over the processing to that executable program fragment, e.g. via a queue-based system, e.g. by exchanging the first participant record PREC1 via a queue.

The second configured logic template CLT2 may for example by of an interaction logic template IALT category as described below, whereby the second executable program fragment EPF2 comprises instructions to interact with the associated participant, in this case by forwarding an E-mail to the participant P. The E-mail includes hyperlinks for two choices of options that the participant P may select between; option 1 and option 2. Each of these options represents a local participant attribute LPA, as described in more detail below. In this example, the participant P chooses option 1 by clicking the relevant hyperlink, and the response of the participant P is then handled according to the second executable program fragment SFP2. The result of the processing carried out by the second executable program fragment EPF2 is that a first sequence forward point SFP of the configured logic template comprising the second executable program fragment EPF2 is selected for the first participant record PREC1, and handling is again handed over to the processing engine, for example by placing a reference to the first participant record on a processing queue.

Next, the processing engine ENG determines based on the sequence forward point selected by the second executable program fragment EPF2 and based on the process structure, e.g. as in FIG. 16, that the first participant record PREC1 is to be processed in accordance with a third configured logic template CLT3 comprising a third executable program fragment EPF3. In this example, the processing by the third executable program fragment EPF3 does not involve instructions to interact with the participant P. After execution, the responsibility of processing the first participant record PREC1 is returned to the processing engine ENG.

After some time, for example after several days or weeks, depending on the kind of campaign, the participant P chooses to also select option number 2 in the E-mail that was previously sent to the participant P, by clicking on the second hyperlink. As the E-mail was sent by the second executable program fragment EPF2, the response by the participant P is received by that executable program fragment. According to the configuration of the second configured logic template CLT2 associated with the second executable program fragment EPF2, the selection of the second option is in this example allowable even though the same participant P earlier selected the first option. As processing of the first participant record PREC1 has already continued, and even along a different configured process sequence based on selection of option 1, the second executable program fragment EPF2 is configured to create or request creation of a second participant record PREC2 associated with the same participant P as the first participant record PREC1. In other words, the campaign management system forks the first participant record PREC1 to allow the campaign management system to handle different choices by the same participant P. It is noted that even if the participant P had clicked the same first option hyperlink the second time, the campaign management system could, depending on configuration, have decided to also fork the participant record in that situation to allow pursuing the same configured process sequence a second time for the same participant.

To proceed with reference to FIG. 26, the choice of option 2 is stored in the track history TH of the second participant record PREC2 as a designation of the corresponding local attribute LPA. As such, the first participant record PREC1 and the newly created second participant record PREC2 may diverge at least in the value of the local participant attribute LPA representing the choice of either option 1 or option 2. Other local participant attributes may be different or similar. After creation of the second participant record PREC2, this is put on the queue for the processing engine ENG, designating the selected second sequence forward point of the second configured logic template CLT2.

The processing engine ENG determines based on the second sequence forward point selected by the second executable program fragment EPF2 and based on the process structure PS, e.g. as in FIG. 16, that the second participant record PREC2 is to be processed in accordance with a fourth configured logic template CLT4 comprising a fourth executable program fragment EPF4. In this example, the processing by the fourth executable program fragment EPF4 does not involve instructions to interact with the participant P. After execution, the responsibility of processing the second participant record PREC2 is returned to the processing engine ENG.

The example of processing of FIG. 26, based on a process sequence similar to the example of FIG. 16, illustrates how the processing engine for a particular participant record determines the next executable program fragment based on the available configured process sequences in the process structure, and the specific sequence forward point selected for that participant record in the previous processing step. Further the example illustrates how an interaction logic template may be activated by a participant interaction even after processing with regard to that participant has already been handed on to the processing engine. It also illustrates how a participant record can be forked to allow the several equal or different processing sequences to be carried out for the same participant.

The below copied code lines, Code snippet 1, from an embodiment of a campaign management system, includes a method for forking a participant record (in the terminology of this code snippet: creating a copy of the flow) and start processing (resumeFlow) on the basis thereof.

Code Snippet 1—Participant Forking:

```
------------Code snippet 1 start-------------
public class EngineService {
  public ResumeFlowResult resumeFlow(
    FlowBlockReference flowBlockReference, FlowThreadInput... inputs) {
    assertNotNull(flowBlockReference, "flowBlockReference is required");
    final StoryConfigGid storyGid = flowBlockReference.getStoryGid( );
    final FlowBlockId flowBlockId = flowBlockReference.getFlowBlockId( );
    // load flow and verify that it is assigned to the requested story
    // use separate transaction so that required DB connection is
    // released before the flow is resumed
    final FlowDo flowDo = RunContexts.copyCurrent( ).call(( ) ->
      BEANS.get(IFlowRepository.class).loadFlowByBlockId(flowBlockId));
    if (flowDo == null) {
      LOG.info("Flow to be resumed does not exist [storyGid={ },
                   flowBlockId={ }]", storyGid, flowBlockId);
      return ResumeFlowResult.of(false);
    }
```

-continued

```
    assertEqual(storyGid, flowDo.getStoryGid( ),
        "Flow does not belong to requested story [expectedStoryGid={ },
    actualStoryGid={ }, flowBlockId={ }]", storyGid, flowDo.getStoryGid( ),
                                                      flowBlockId);
    // lookup storyContextStore
    final StoryContextStore store = getStoryContextStore(storyGid);
    if (store == null) {
      LOG.warn("Story is not published [storyGid={ }, flowBlockId={
}]",
                                          storyGid, flowBlockId);
      return ResumeFlowResult.of(false);
    }
    // lookup storyContext
    final storyContext storyContext;
    FlowBlockDo flowBlock =
        flowDo.flowBlocks( ).findFirst(FlowBlockDo::id, flowBlockId);
    if (flowBlock.getSandboxId( ) != null) {
      storyContext =
           store.getDraftStory(flowBlock.getSandboxId( ).toStoryId( ));
    }
    else {
      storyContext = store.getActiveStoryContext( );
    }
    if (storyContext == null) {
      LOG.warn("Story is not published [storyGid={ }, sandboxId={ },
    flowBlockId={ }]", storyGid, flowBlock.getSandboxId( ), flowBlockId);
      return ResumeFlowResult.of(false);
    }
    // execute flow
    Flow flow = new Flow(flowDo);
    FlowThread flowThread = flow.getFlowThread(flowBlockId);
    flowThread.getInputs( ) .put(FlowThreadInput.of(flowBlockReference));
    // always provide reference to resumed flow block as flow thread input
    flowThread.getInputs( ).putAll(inputs);
    storyContext.execute(flowThread);
    return ResumeFlowResult.of(true, flowThread.getOutput( ));
  }
}

------------Code snippet 1 end-------------
```

FIG. 27 shows an embodiment of the invention. The drawing illustrates a process structure PS comprising five configured logic templates CLT1-CLT5. As a participant record PREC1 is being processed according to the process structure, the processing of the participant record PREC1 is reflected in its track history TH1. In this sense the track history TH1 shows correlations between time and participant locations PLOC in the process structure PS. When the participant record PREC1 is processed by a configured logic template CLT, a purpose of the processing is to select for the participant record PREC1 a specific sequence forward point of that configured logic template. Some configured logic templates may only comprise a single sequence forward point, and others may comprise a plurality of sequence forward points. In this example, the third configured logic template CLT3 comprises two sequence forward points.

After being injected into the campaign CAM the participant record PREC1 is updated by a first entry in its track history TH1. In this example, the first entry comprises a time stamp indicating the time at which the participant record PREC1 was processed by the first configured logic template CLT1 and what sequence forward point was selected for the participant record PREC1 at that time. After being processed by the next configured logic template CLT2 the track history TH1 of the participant record PREC1 is modified by addition of a new entry indicating the time at which processing by the second configured logic template CLT2 was done and what sequence forward point was selected as result of the processing. The third configured logic template CLT3 comprises two different sequence forward points, and thus participant records that are processed by this configured logic template may not only differ in the time stamps but also in the sequence forward point resulting from the processing. In this example the participant record PREC1 completed the step at the time 14:36 with the processing resulting in the second sequence forward point SFP2 being selected for participant record PREC1. Another participant record PREC2 having another track history TH2 has completed the step at another time, i.e. at 14:06, but for this participant record PREC2 was instead selected, e.g. because of participant interaction, the first sequence forward point SFP1 of the third configured logic template CLT3.

The second participant record PREC2 in the present example may be associated with a different participant P than the first participant record PREC1. The example may also describe a situation similar to the one described above with reference to FIG. 26, where the second participant record PREC2 was created by forking the first participant record PREC1. However, in the latter example, the track histories TH1 and TH2 would then be identical with regard to the time and progress related to the first two configured logic templates CLT1-CLT2.

In other embodiments of the invention the track history TH of a participant record PREC further comprises information about the time at which a value of a local participant attribute LPA was changed.

In a preferred embodiment, the time field also includes the date, e.g. being a timestamp field. In other embodiments, the time field is omitted and only the sequence of the entries indicates the chronology of execution, or the time field is replaced with a serial number or other reference to the individual entries which may or may not include information about chronology.

The logic templates LT may be regarded as the building blocks available in the campaign management system CAMS which when coupled together define a process structure PS of a campaign CAM. When put together, these building blocks define the logical structuring of the campaign CAM and thus how participant records PREC are to be processed. A logic template LT, as well as a configured logic template CLT, is present in the campaign management system CAMS at different levels of abstraction.

FIG. 28 shows an embodiment of the invention. The figure illustrates a process structure PS as presented in a graphical user interface GUI. The process structure comprises four graphical elements GE1-GE4 that are coupled to one another through sequence forward points and sequence receive points. Each graphical element GE1-GE4 is a graphical representation of a logic template LT1-LT4.

Each logic template LT1-LT4 also comprises user editable parameters UEP which may be regarded as the settings or parameters that may be adjusted for the specific logic template LT in order to configure it. As such a logic template is a template pertaining to a specific logic operation within the campaign CAM and depending on how the user of the campaign management system CAMS configures the user editable parameters UEP the logic template LT may process participant records PREC differently. When the user editable parameters UEP of a logic template LT is configured, the logic template may be referred to as a configured logic template CLT.

Each of the logic templates LT represented by a graphical element GE1-GE4 comprises a respective executable program fragment EPF1-EPF4. The executable program fragments are the machine-readable code that processes participant records PREC when executed by the processing engine ENG of the campaign management system CAMS. The executable program fragment EPF takes as input arguments a participant record PREC having a track history TH and one or more user editable parameters UEP, and outputs the same participant record PREC with a selection of a sequence forward point of the logic template, and possibly with modified participant attributes.

In one embodiment of the invention the executable program fragment EPF updates the track history TH of the participant record PREC after processing of the participant record PREC.

In another embodiment of the invention the processing engine ENG of the campaign management system CAMS updates the track history TH of the participant record PREC after the processing of the participant record by the executable program fragment EPF.

FIG. 29-30 show embodiments of the invention. FIG. 29 illustrates a process structure PS comprising multiple logic templates LT of different categories: an injection logic template IJLT, an interaction logic template IALT, a decision logic template DELT and four data logic templates DALT1-DALT4. The process structure PS represents a campaign CAM wherein customers of a web shop are injected into the campaign as participants P by the injection logic template IJLT which creates participant records PREC accordingly. According to the process structure, the participants P by means of a landingpage generated by the interaction logic template IALT are asked to indicate their level of satisfaction by filling out a form on a website which they are redirected to through the web shop. The participants may indicate their level of satisfaction on a scale from 0 to 10 and may further write additional comments about their experience with the web shop. The interaction logic template IALT has by means of the configuration via user editable parameters been provided with two sequence forward points; one is selected for participants who ahs visited the landingpage, and the other is selected for participants who have filled in the form and submitted it. However, in the present process structure, the first sequence forward point is not coupled to any subsequent logic template, and therefore nothing happens with respect to participants who have only visited the landing page. This can, however, be changed later as described for example with reference to FIG. 39.

For the participant records associated with participants who submitted the form, the second sequence forward point is selected, and processing can continue to the decision logic template DELT. This category of logic templates is arranged to select a sequence forward point based on data. In the present example, the decision logic template DELT is by its user editable parameters UEP configured to, depending on the level of satisfaction by the customers, or participants, select a corresponding sequence forward point for different actions to be performed by subsequent logic templates.

In the example, if a customer is really satisfied with the service, i.e. has indicated a satisfaction score of 9 or 10, the processing may proceed to a second data logic template DALT2, which may perform the action of registering the participant to receive a loyalty card. If on the other hand a customer is not satisfied with their service, i.e. has indicated a low satisfaction score ranging from 0 to 5 it may be the case that the customer has further explained in a comment why his or her satisfaction with the web shop service is low. If that is the case, the comment may be stored in the corresponding participant record as a local participant attribute LPA. As a low satisfaction score has caused the sequence forward point connected to the first data logic template DALT1 to be selected, the executable program fragment of that logic template carries out a text search on the comment and tries to identify specific words that are most likely associated with an angry customer who needs to be handled by a service minded person. In that case, is selected the sequence forward point connected to a third data logic template DALT3, which may create a service ticket with the angry customer's contact information as well as his or her comment for customer care person in the organization. If on the other hand, the first data logic template DALT1 does not identify the specific words, the participant record is by selection of a second sequence forward point passed on to the fourth data logic template DALT4 which may deal with the unsatisfied customer by storing a request for sending out e.g. a discount coupon for the web shop.

A user of the campaign management system CAMS, e.g. an employee of the web shop, may configure the logic templates by editing user editable parameters UEP pertaining to the individual logic templates. FIG. 30 illustrates a pop-up window in the graphical user interface GUI where the user can edit user editable parameters UEP. The window is specific to a single logic template of the process structure PS, and in this case the user of the campaign management system has chosen to edit the user editable parameters UEP of the decision logic template DELT of FIG. 29, by clicking on the graphical element of the decision logic template DELT in the graphical user interface GUI using a mouse cursor MC. For example, the user may decide to edit specific ranges of customer satisfaction values. In this example, the user has decided on three ranges of satisfaction values: 0 to 5, 6 to 8, and 9 to 10. The user has then decided to link these ranges to three respective sequence forward points of the decision logic template DELT. The user has further configured a user editable parameter UEP relating to the time of processing of participant records PREC, such that participant records PREC are immediately processed by the logic template when entering the logic template through the sequence receive point of the logic template.

The above campaign CAM as described in FIG. 29 is an example of the use of participant attributes PA. The processing of a participant record PREC by logic templates LT may comprise processing on the basis of participant attributes PA; both global participant attributes GPA and local participant attributes LPA. In this example, a global participant attribute GPA may be contact information about the customer, e.g. an email address, a telephone number and an address. These global participant attributes GPA are retrieved externally from the campaign CAM, e.g. when the customer performed a first purchase or signed up to a newsletter by registering an account, and these global participant attributes GPA are used for communicating with the participant P through the second, third and fourth data logic templates DALT2-DALT4 of FIG. 29.

When the participant fills out the satisfaction form on the website by indicating level of satisfaction from 0 to 10 and by providing further comments, if any, local participant attributes LPA are generated by the participant. In this example, a local participant attribute can have different data formats, i.e. an integer between 0 and 10, as well as a string of text. However, the local participant attributes are not necessarily local to the individual logic template with reference to which the local participant attribute was generated but can be used throughout the entire campaign. In this example, the local participant attributes LPA generated with reference to the interaction logic template IALT is used in the decision logic template DELT, whereby participant records PREC are filtered depending on the integer value of the local participant attribute LPA pertaining to user satisfaction. The local participant attributes LPA are further used by the first data logic template DALT1 where the text string is analyzed for specific words.

FIGS. 31-33 show embodiments of the invention. The drawing of FIG. 31 shows a process structure PS of a campaign CAM directed towards rewarding good customers, such as loyal customers who frequently buy products from a web shop. An injection logic template IJLT performs a search in the company's customer database and creates participant records PREC for customers who have purchased for more than a certain amount of money in the previous year. These customers are then sent an E-mail once the associated participant records PREC are being processed by the first interaction logic template IALT1. The customers, or participants P, are given the choice between receiving a speaker or a selection of wines. In the context of the claimed invention, the choices "speaker" or "wine" are local participant attributes LPA, and these local participant attributes LPA are generated by the user of the campaign management system CAMS as will also be described in relation with FIG. 32. The user of the campaign management system CAMS may only have access to a limited number of speakers and the number of loyal customers could exceed this number, hence it would be appropriate to have the campaign CAM handle this situation and ensure that no more speakers are offered to customers than what is available. For this reason, the user of the campaign management system CAMS may introduce a campaign attribute CA which is a counter on the number of speakers that have been selected by the customers. From the onset of the campaign CAM, this campaign attribute CA pertaining to the number of selected speakers is set to zero, and if a participant P selects the speaker option in the E-mail, the corresponding participant record PREC is filtered by a decision logic template DELT which look up the value of the campaign attribute CA and checks whether the value is less than or equal to a predetermined number. In this campaign, there are 200 speakers available, so the decision logic template DELT checks whether the campaign attribute CA, or accumulated number of speaker selections, is less than or equal to 200. If the argument is true, the number value of the campaign attribute CA is increased by 1, and the customer represented by the participant record PREC is sent an E-mail with instructions on how to collect the speaker through the second interaction logic template IALT2. If a participant P, or customer, selects the wine option, that customer receives an E-mail with instructions on how to collect the wine through the third interaction logic template IALT3. In the event that a customer chooses the speaker option and the 200 speakers are already given away, the argument of the decision logic template DELT is false and the associated participant record PREC is directed to the third interaction logic template IALT3, where the customer receives an E-mail for the wine option.

Since the local participant attribute LPA for the gift options are accessible by any logic template LT of the process structure PS, the customer's choice is stored within the campaign and can be utilized at any later time. When a participant record PREC comprising the local participant attribute LPA associated with the speaker option is directed from the decision logic template DELT to the third interaction logic template IALT3, the third interaction logic template IALT3 looks up this local participant attribute LPA and knows that the customer associated with the participant record PREC originally opted for the speaker option which is no longer an option. Therefore, the E-mail which is sent to the customer through the third interaction logic template IALT3 may reflect this choice by recognizing the customer's choice of speaker but inform the customer that the speakers are unfortunately no longer available anymore and thus the customer will receive wine instead. The E-mails sent by the interaction logic templates IALT1-IALT3 are sent to the participants, or customers, using a global participant attribute GPA, e.g. an E-mail address, stored in the participant records PREC.

FIG. 32 illustrates the creation of local participant attributes LPA. The drawing shows a window as seen within the graphical user interface GUI. The window illustrates at least a part of the process of configuring the first interaction logic template IALT1. A user of the campaign management system CAMS is able to configure the E-mail content of the E-mail sent out by the first interaction logic template IALT1, and through this configuring the user is able to define and name local participant attributes LPA, i.e. the speaker and wine options. In this sense the local participant attributes LPA may be used to convey information to a participant P to the campaign CAM but at the same time also to define a logical parameter to be used in the design and configuring of a process structure PS. This is seen for example in the process structure PS in FIG. 31 where the local participant attributes LPA are visible to the user of the campaign management system CAMS at the sequence forward points SFP of the first interaction logic template IALT1.

FIG. 33 illustrates various attributes comprised by a campaign CAM. A campaign CAM comprises participant records PREC that include participant attributes PA in the form of both local participant attributes LPA and global participant attributes GPA. The campaign CAM further comprises a campaign record CAR which is a record, or data container, configured to store and handle a campaign attribute CA. A local participant attribute LPA may come in different variants depending on the scope of the attribute. A local participant attribute LPA may be a template-specific local participant attribute TLPA which is an attribute that is defined and used only in relation with execution of an executable program fragment EPF of a single configured logic template CLT. A local participant attribute LPA may also be created by the user as a campaign-specific local participant attribute CLPA which is a participant attribute that is used throughout an entire campaign CAM. As an example, the decision logic template DELT in FIG. 31 uses a true/false statement in determining the further processing of a participant record PREC. The logical true/false statement of the decision logic template DELT may be an example of a template-specific local participant attribute TLPA which is an attribute used only within the context of the decision logic template DELT and which does not convey any meaning outside that context. On the other hand, the selection of either wine or speaker in the first interaction logic template IALT1 is a selection which is useful also outside the scope of the first interaction logic template IALT1, e.g. also in the third interaction logic template IALT3. Thus, the local participant attribute LPA referring to the choice of wine or speaker may be regarded as a campaign-specific local participant attribute CLPA.

FIG. 34 shows an embodiment of the invention. The drawing illustrates a window, e.g. a pop-up window, within the graphical user interface GUI that is activated upon the user of the campaign management system CAMS clicking on a graphical element GE pertaining to a logic template LT which is to be configured. The window allows the user to define content associated with the given logic template LT, which in this case is content relating to an inquiry, where a participant P is asked to provide a comment in a survey. The user of the campaign management system CAMS may define the content, which in this example is content of an E-mail. The defining of the content may include defining local participant attributes LPA to be used within the campaign CAM. The user can select the type of local participant attribute from a number of predefined attributes types (PAT) and furthermore give the local participant attribute LPA a user-defined attribute name (UAN) which is the name of the local participant attribute throughout the entire campaign CAM, for convenient and intuitive reference by the user.

The campaign management system CAMS is in an embodiment configured to operate in both a design mode and a live mode, and the system may operate in different modes at the same time. In the live mode the process structure PS of the campaign CAM comprises configured logic templates CLT for the processing of participant records PREC.

In design mode the user of the campaign management system CAMS is able to define a process structure PS by coupling logic templates to one another and configuring these logic templates by adjusting the user editable parameters pertaining to these logic templates. The user does this in the graphical user interface GUI. Thereby the user defines configured process sequences CPSEQ which participant records PREC may be processed by reference to when the campaign is set to live mode.

When a process structure PS is properly defined, the user of the campaign management system may choose to put the campaign into live mode. In live mode, the processing of participant records PREC occur, and participants P are able to actively engage with the campaign CAM through interactions such as clicking on links in emails sent by the campaign management system CAMS, scanning QR-codes and being redirected to a landing page, or by replying to text messages sent by the campaign management system CAMS.

When a campaign CAM is set to live mode, the process structure PS of the live campaign is still visible to the user of the system through the graphical user interface GUI and this may be of great benefit to the user, since the user may then track statistics of the campaign in the same graphical view as the view in which he or she defined the campaign. This makes for an intuitive understanding of the performance of the campaign.

As indicated, the campaign management system CAMS is in an embodiment configured to operate in both design mode and live mode at the same time, which is illustrated schematically in FIGS. 35-37.

FIG. 35 shows an embodiment of the invention. A campaign defined by a live mode version of the first process structure PS1LM is running in live mode LMODE and the user of the campaign management system decides that the campaign needs minor adjustments. The user decides to pause the live mode processing of the campaign by e.g. clicking a pause/resume button in the graphical user interface GUI and is then able to modify the design mode version of the first process structure PS1DM which is an exact representation of the live mode version of the process structure PS1LM of the previous live campaign. After performing minor adjustments to the process structure in the graphical design environment GDENV of the graphical user interface GUI a modified design mode version of the first process structure PS1DM* is formed. The user then decides to put this modified process structure PS1DM* into live mode LMODE by e.g. clicking the pause/resume button. The modified process structure is then the live mode version of the modified first process structure PS1LM* running in live mode LMODE. The process structure PS1DM* in design mode DMODE and the process structure PS1LM* in live mode LMODE are also referred to as an updated process structure UPS.

FIG. 36 shows an alternative embodiment of the invention to the one shown in FIG. 35. Instead of pausing the live campaign CAM, the user of the campaign management system may modify the live campaign represented by the live mode version of the first process structure PS1LM in a parallel design mode DMODE. Thus, the process structure co-exists in live mode as live mode version PS1LM as well as in design mode DMODE as design mode version of the first process structure PS1DM, and any changes made to the design mode version of the first process structure PS1DM in design mode DMODE has no immediate influences on the live campaign. As such the two modes are independent from one another. This gives the user of the campaign management system CAMS a tremendous flexibility when managing a campaign, because he or she may visualize new ideas, try out modification on a graphical level and perform adjustments to the campaign without affecting the participants which are interacting or otherwise engaged with the live campaign. After modifying the design mode version of the first process structure PS1DM within the design mode DMOD a modified design mode version of the first process structure PS1DM* is formed, and once the user of the campaign management system CAMS believes that this process structure is the appropriate structure for the future of the campaign, he or she may set the process structure into live mode LMODE. Now the original live mode version of the first process structure PS1LM of the live campaign is replaced by a live mode version of the modified first process structure PS1LM*. Such a replacing of a process structure requires that the previous process structure and the modified process structure are compatible as regards to the configured process sequences that the participant records are processed by reference to. The design mode version of the modified first process structure PS1DM* in design mode DMODE and the live mode version of the modified first process structure PS1LM* in live mode LMODE are also referred to as an updated process structure UPS.

FIG. 37 shows yet another embodiment of how to modify a live mode version of a first process structure PS1LM of a live campaign. The user of the campaign management system CAMS chooses to modify the live mode version of the first process structure PS1LM of the live campaign by modifying it in the design mode DMODE in the form of the design mode version of the first process structure PS1DM. While modifying the design mode version of the first process structure PS1DM, the live campaign still makes use of the original live mode version of the first process structure PS1LM by which participant records PREC are processed with reference to. The user applies severe modifications to the design mode version of the first process structure PS1DM whereby a new and substantially modified version is created as a design mode version of a second process structure PS2DM in the design mode DMODE. The design mode version of the second process structure PS2DM is set to live LMODE as a live mode version of the second process structure PS2LM. The substantially modified process structure PS2LM may be regarded as a new, second process structure version PSV2 over the original process structure PS1LM regard as the first process structure version PSV1. The design mode version of the second process structure PS2DM in design mode DMODE and the live mode version of the second process structure PS2LM in live mode LMODE are also referred to as an updated process structure UPS.

Having two versions of a process structures PS operating in live mode LMODE simultaneously, e.g. as shown at the end of the timeline in FIG. 37, is advantageous because participant records PREC that are being processed according to an old version of the process structure can continue to be processed according to this process structure, but new participant records PREC that are injected into the campaign CAM may be processed according to the updated process structure UPS. In this sense the old version of the process structure PS is still operated in live mode LMODE in the sense that the participant records PREC are still being processed, however new participant records PREC are not processed according to the old process structure PS anymore. In an embodiment, this may be accomplished by disabling the injection logic templates of the old version(s) of the process structure. This may also be referred to as sunset mode, although this term may have different meanings in different campaign systems. In an embodiment, each time an updated process structure UPS is created, the older process structures PS are automatically put in a special mode, also referred to as 'sunset mode', to avoid new participant injections being processed by old versions of the process structure, i.e. old versions of the campaign.

The below copied code lines, Code snippet 2, from an embodiment of a design mode feature in a campaign management system, includes a class for a design mode identifier (SandboxId) and method for the campaign management system to set a campaign (story) to live mode (publish) which is in design mode (draft/sandbox).

Code Snippet 2—Design Mode:

```
------------Code snippet 2 start-------------
public final class SandboxId extends AbstractUuId {
  private static final long serialVersionUID = 1L;
  public static SandboxId create( ) {
    return new SandboxId(UUID.randomUUID( ));
  }
  public static SandboxId of(UUID id) {
    if (id == {
      return null;
    }
    return new SandboxId(id);
  }
  public static SandboxId of(StoryConfigId storyId) {
    if (storyId == null) {
      return null;
    }
    return new SandboxId(storyId.unwrap( ));
  }
  private SandboxId(UUID id) {
    super(id);
  }
  public StoryConfigId toStoryId( ) {
    return StoryConfigId.of(unwrap( ));
  }
}
public class EngineService {
  public StoryContext
          publishDraftStory(StoryConfigId draftRevisionStoryId) {
    return publishDraftStory(draftRevisionStoryId, true);
  }
  protected StoryContext publishDraftStory(StoryConfigId
          draftRevisionStoryId, boolean loadCurrentAnalyticsData) {
    IStoryRepository repo = BEANS.get(IStoryRepository.class);
    InternalStoryRevisionInfoDo revisionInfo =
                repo.getStoryRevisionInfo(draftRevisionStoryId);
    StoryRevisionsDo storyRevisions =
        repo.loadAllRevisions(revisionInfo.getGid( ), draftRevisionStoryId);
    return publishStory(storyRevisions, draftRevisionStoryId,
                                      loadCurrentAnalyticsData);
  }
}
------------Code snippet 2 end-------------
```

A campaign CAM may comprise a plurality of versions of a process structures PS, also referred to as process structure versions PSV. Allowing for multiple versions of a process structure allows a campaign CAM to be continuously developed by a user of the campaign management system CAMS. For example, the end goal of a campaign CAM may change several times over the course of time, and these changes may be reflected in successive versions of the process structure PS. Furthermore, this allows for the campaign to never end, because a process structure can always be modified to include further logic templates LT or configured logic templates CLT. Furthermore, the feature of process structure versions allows to activate a process structure into live mode even at an early design stage where only the beginning of the process structure, or some of the campaign framework, has been designed and configured, because the feature of process structure versions allows for continuous implementation into the process structure of new additions to the campaign or desired modifications of already implemented sequences and configurations.

Figure 38:
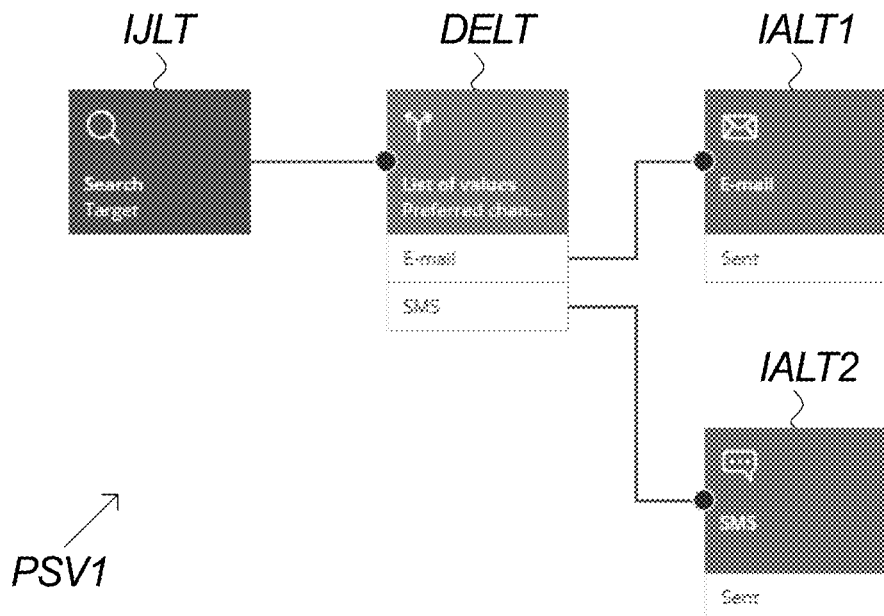
Figure 39:
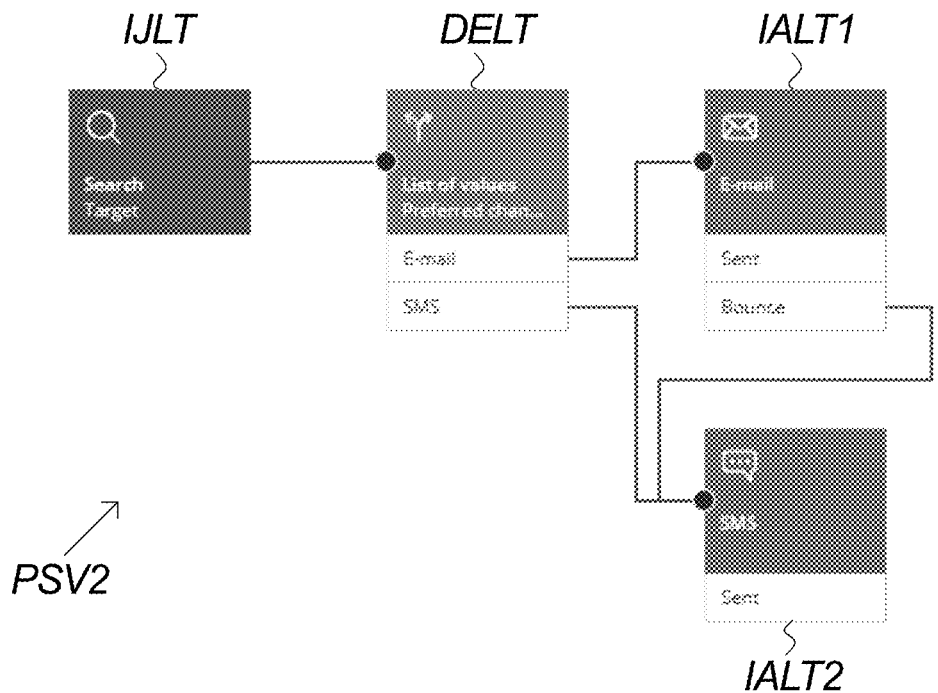

A campaign CAM may in an embodiment comprise multiple versions of a process structure PS, i.e. process structure versions PSV. FIGS. 38-39 show embodiments of the invention where a process structure PS exists in more than one version. The drawing of FIG. 38 illustrates a first process structure version PSV1 comprising four configured logic templates; an injection logic template IJLT, a decision logic template DELT, a first interaction logic template IALT1 and a second interaction logic template IALT2. The first process structure version PSV1 represents a campaign CAM where a communication, either in the form of E-mail or an SMS (Short Message Service) is sent to selected participants P. Such a communication could be a newsletter, marketing or important information which the user of the campaign management system CAMS needs to distribute to a selected number of participants. This could be a campaign on new prices on a specific car or notification about an important firmware update or know issue with a product, and the user of the campaign management system CAMS, a marketing associate at a car dealership, wants to target this campaign towards customers who have previously bought a car from the same car maker.

The user of the campaign management system CAMS sets up the campaign by defining a process structure which injects the selected participants P, or customers, to the campaign as participant records PREC using an injection logic template IJLT. The injection logic template IJLT is configured by the user of the campaign management system CAMS, by adjusting user editable parameters UEP of the injection logic template IJLT, such that a search is performed in the dealerships customer database for customers who have previously bought a car from the specific car maker, and who have opted to be contacted, preferably by E-mail or SMS. The injection logic template IJLT has a single sequence forward point SFP which is coupled to a sequence receive point SRP of the decision logic template, such that the customers or participants P fulfilling the above criteria are filtered by the decision logic template DELT after being injected to the campaign. The decision logic template DELT in this example is configured to filter the participants depending on their preference of communication which is specified in a global participant attribute GPA. If a participant P has specified that he/she preferably receives communication via E-mail, the participant record PREC associated with that participant P or customer is placed on a sequence forward point SFP coupled to the first interaction logic template IALT1, and likewise, if SMS is the preferred choice of communication, the PREC is placed on a sequence forward point SFP coupled to the second interaction logic template IALT2. The first interaction logic template IALT1 is configured to send an E-mail to the customer, by sending an email comprising user-defined content to an E-mail address which is defined as a global participant attribute GPA in the participant record PREC which represents the customer. Similarly, the second interaction logic template IALT2 is configured to send an SMS with user-defined content to a phone number which is defined as a global participant attribute GPA in the participant record PREC.

In this manner, the campaign CAM defined by the process structure PS comprising the four logic templates, is capable of automatically retrieving customers from the customer database and send marketing material or information to specific customers via their preferred communication channels.

The process structure PS of FIG. 38 represents a first version PSV1 of a campaign. At a later stage, during the campaign running in live mode, the user of the campaign management system CAMS, or marketing associate, may realize that E-mail addresses of some previous customers may be out of date because some of the E-mails sent have bounced due to the E-mail addresses no longer being valid E-mail addresses. In order to make a second attempt to provide the marketing or important information to these customers, the marketing associate chooses to update the ongoing campaign CAM by designing a second process structure version PSV2 of the process structure PS. FIG. 39 illustrates the second version PSV2 of the process structure PS. As seen, the user has now configured the first interaction logic template IALT1 to now include an additional sequence forward point SFP which is selected for participant records associated with E-mails that have bounced. This sequence forward point is further in the second process structure version PSV2 coupled to the sequence receive point SRP of the second interaction logic template IALT2, such that participants P for which the E-mails bounces now can proceed to the other communication path and receive an SMS instead.

The above described campaign with the two process structure versions PSV1-PSV2 thereby allows participants who are injected into the second process structure version PSV2, i.e. injected into the campaign after the second process structure version PSV2 was set to live mode, to be handled even if their E-mail is bounced. However, in an advantageous embodiment of the campaign management system, even participant who were injected early, before the second process structure version PSV2 existed, and thereby are processed according to the first process structure version PSV1 which do not facilitate any handling of bounced E-mails, may be handled according to the improved, second process structure version PSV2 by a feature referred to as migration of processing between process structure versions.

The migration feature involves that the processing of a participant record PREC according to a first process structure version PSV1 may be migrated to a second process structure version PSV2 if an appropriate common configured logic template exists. A common configured logic template is a configured logic template which exists on both the old and new process structure version with more or less similar configuration so that in particular the sequence forward points of the old version still exists in the new version.

In the example of FIGS. 38-39, all the configured logic templates IJLT, DELT, IALT1 and IALT2 may be considered common configured logic templates CCLT, because not logic templates have been removed in the second process structure version PSV2 compared to the first process structure version PSV1, and not sequence forward points SFP have been removed in the medication from the first to the second version. This means that a participant record PREC that was injected at the injection logic template IJLT of the first process structure version PSV1 can have its processing migrated to the second process structure version PSV2 at any step in the sequence, because all the logic templates of the second version are backwards compatible with the first version.

The migration feature is highly advantageous, as may be explained in one aspect in relation to the specific example of FIGS. 38-39 and the problem of bounced E-mails. Any participant record PREC which has been processed according to the first process structure version PSV1, and for which the E-mail configured processing sequence was selected, but for which the E-mail has bounced, are in an advantageous embodiment still suspended at the first interaction logic template IALT1, because the first process structure version PSV1 has not sequence forward point SFP which matches their situation. According to this advantageous embodiment, such participant records are not ejected from the processing, but are simply suspended, because the advantageous embodiment allows for future medication of the process structure by means of the design mode and process structure version features, as well as allows for migration of processing to a compatible logic template of a newer process structure version. In the present example, this means that as soon as the second process structure version PSV2 is set to live mode, the processing engine ENG will discover that a number of participant records PREC were suspended at the first interaction logic template IALT1 of the first process structure version PSV1 because it did not have a sequence forward point to handle the situation of bounced E-mails. However, as the new process structure version PSV2 offers such a handling by means of the additional sequence forward point 'Bounce' and the coupling to the second interaction logic template IALT2, the processing engine ENG will migrate the processing of all these suspended participant records PREC to the second process structure version PSV2, and the associated participants P will receive an SMS with the marketing or important information, exactly as the later injected participants who were never processed according to the first version.

Figure 40:
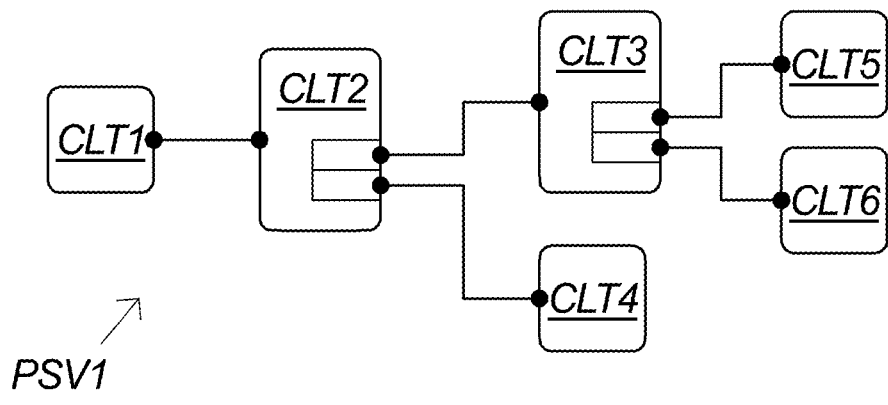

FIG. 40-42 show embodiments of the invention. The drawings of the figures illustrate three process structure versions PSV1-PSV3 relating to the same campaign CAM. The process structure versions PSV1-PSV3 are configured over the course of the campaign CAM, with the first process structure version PSV1 representing the first iteration of the process structure and the third process structure version PSV3 representing the latest iteration of the process structure. The first process structure version PSV1 comprises six configured logic templates CLT1-CLT6 and represents a campaign operating in live mode LMODE such that participant records PREC are processed with reference to the process structure. During the campaign, a user of the campaign management system decides to modify the process structure by creating a new version of the process structure PSV2 in the design mode DMODE of the campaign management system, such that the first process structure version PSV1 can operate in live mode LMODE meanwhile. Once the user is satisfied with the modifications, the second process structure version PSV2 is also set to live mode LMODE such that both the first and second process structure versions PSV1-PSV2 are operating in live mode LMODE, with the first process structure version PSV1 further operating in sunset mode such that no new participant records are being injected into the first process structure version PSV1. The aim of the campaign management system CAMS in this case is to make sure that participant records PREC are always processed with reference to the newest changes in the process structure whenever possible. This switching, or migration, as described above, between process structure versions PSV are facilitated by the engine ENG of the campaign management system CAMS.

In order to migrate the processing of a participant record PREC, the engine ENG of the campaign management system considers the participant record PREC according to its track history TH. For example, the track history TH of the participant record PREC may state that the participant record PREC was processed by the second configured logic template CLT2, and for the participant record was selected the sequence forward point coupled to the third configured logic template CLT3. The engine ENG tries to migrate the participant record PREC into the newest process structure version where the third configured logic template CLT3 is available which in this example is only the first process structure version PSV1. In other words, no configured logic template in the newer process structure version PSV2-PSV3 are compatible with the third configured logic template CLT3 to allow migration at that step. Now the participant record PREC is processed according to the third configured logic template CLT3 in the first process structure version PSV1 which could lead to further processing by the fifth CLT5 or sixth configured logic template CLT6. Assuming that the processing of the participant record by the third configured logic template CLT3 lead to the fifth configured logic template CLT5, the engine ENG identifies the newest process structure version where the fifth configured logic template CLT5 is available, which at this point in time during the campaign is the second process structure version PSV2. The participant record is then processed by the fifth configured logic template CLT5 in the second process structure version PSV2. Furthermore, participant records that have already been processed by the fourth configured logic template CLT4 in the first process structure version PSV1 are automatically migrated to the eighth configured logic template CLT8 in the second process structure version PSV2 since this represents a step of the newest possible configured process sequence which that participant record may be processed according to. In this sense, the participant records which completed the fourth configured logic template CLT4 were suspended by virtue of the design of the first process structure version PSV1 not permitting any further processing, as also exemplified above with reference to FIGS. 38-39. When the eight configured logic template CLT8 was introduced by the second process structure version PSV2, a new path in the campaign CAM was created for these suspended participant records PREC, and thus the processing could be resumed.

At a later time during the campaign, the user of the campaign management system decides to update the process structure by deleting the eighth configured logic template CLT8. The new and updated process structure version is set to live mode LMODE as the third process structure version PSV3, as seen in FIG. 42. At this point in time the campaign comprises three process structure versions that are all running in live mode LMODE. The ability of the campaign management system CAMS to operate more than one version of a process structure in live mode LMODE is essential to the participants' experience of the campaign CAM. By allowing different versions of a process structure to co-exist it is possible to avoid having to eject participants from a campaign. As an example, a participant who have completed the third configured logic template CLT3 and whose participant record PREC is being processed by the sixth configured logic template CLT6, according to the first process structure version PSV1, is not allowed to migrate to any newer process structure version, since neither the second nor third process structure versions PSV2-PSV3 contains the sixth configured logic template CLT6, i.e. a common configured logic template CCLT does not exist. Instead of ejecting this participant from the campaign, the corresponding participant record PREC is kept in the first process structure version PSV1. This has the advantage that the participant record PREC of this participant may be migrated to a newer version in the future when or if such a possibility is added. In this sense the process sequence that a participant record undergoes can never be predicted from the onset of the campaign. In other words, the journey of a participant through a campaign never ends because it is always possible to pick up a participant and process the corresponding participant record in future versions of the process structure.

The participants who were being processed by the eighth configured logic template CLT8 of the second process structure version PSV2 will remain to stay in the second process structure version PSV2 since there exists no possibility of migrating this participant to a newer process structure version due to a lack of a common configured logic template with a newer process structure version.

An advantageous aspect in an embodiment of the invention is that a participant is only injected into the newest process structure version of a campaign. In this example, when the user of the campaign management system set the second process structure version PSV2 into live mode LMODE, no further participants were injected into the first process structure version PSV1 using the first configured logic template CLT1. Similarly, no further participants were introduced to the second process structure version PSV2 once the user of the campaign management system set the third process structure version PSV3 into live mode LMODE. This is also referred to as setting the first and second process structure versions PSV1-PSV2 into sunset mode when a newer, third process structure version PSV3, is set to live mode.

From this example it is clear that a participant record PREC is never limited to processing according to only a single specific process structure version PSV since a possibility of migrating the participant record PREC to a newer process structure version PSV may exist.

The below copied code lines, Code snippet 3, from an embodiment of a migration feature in a campaign management system, illustrates an initialization for the processing engine to iterate through the sequence forward points (outlets) of the logic templates (steps) of the process structures (stories) to establish directly processable collections of configurations including newest version of each element. For example elements, e.g. sequence forward points (outlets) or logic templates (steps), that only exists in older process structure versions (storyRevisionId) are by the methods archivedStepGids.add( ) and archivedOutletGids.add( ) marked as archived so that they will only be applied in connection with a participant record if it is processed in accordance with an older version.

Code Snippet 3—Migration:

```
------------Code snippet 3 start-------------
protected void buildStepContexts(List<StoryConfigDo>storyConfigs) {
/*
 * Implementation details
 * ======================
 *
 * Multiple story revisions are merged during this initialization, so
 * that flows are executed by the latest revision available. The
 * configurations are therefore traversed from the latest to the oldest
 * revision and only for the latest step of a particular
 * StepConfigDo#gid a StepContext element is created. Every older
 * stepConfigId of the same stepGid is linked to the very same
 * StepContext element. The same approach is applied to outlets: the
 * latest targetStepContext of a particular outletGid is used for all
 * revisions. The computational complexity for creating the mappings
 * depend only on the story size and number of revisions.
 */
// 1. sort by revision (latest at the beginning, oldest at the end;
// the draft revision - if available - has no revision it is
// considered the latest)
Collections.sort(storyConfigs, comparing(StoryConfigDo::getRevision,
                    nullsLast(Comparator.naturalOrder( ))).reversed( ));
// 2. iterate through the revisions and create a StepContext for every
// stepGid not seen so far
final Set<StepConfigGid>archivedStepGids =new HashSet< >( );
final Set<OutletConfigGid>archivedOutletGids =new HashSet< >( );
for (StoryConfigDo story : storyConfigs) {
   m_storyConfigs.add(story);
   final boolean archived =story.getStatus( ) == StoryStatus.ARCHIVE;
   // a) first pass: collect stepContexts by stepConfigId
   for (StepConfigDo step : story.getSteps( )) {
     processStepRevision(step,archived,archivedStepGids,story.getId( ));
   }
   // b) second pass: collect targetStepContexts by outletConfigId to
   for (StepConfigDo step : story.getSteps( )) {
     for (OutletConfigDo outlet : step.getOutlets( )) {
       processOutletRevision(outlet, archived, archivedOutletGids);
     }
   }
// process story properties
if (!archived) {
m_properties.addAll(story.getProperties( ));
}
}
// 2.c) add null step context for archived steps and outlets
archivedStepGids.forEach(stepGid ->m_stepContextsByGid.put(stepGid,
                                                               null));
archivedOutletGids.forEach(outletGid->
                m_targetStepContextsByOutletGid.put(outletGid, null));
//3. collect distinct, non-null step contexts
m_stepContextsByGid.values( ).stream( )
.filter(Objects::nonNull)
.forEach(m_stepContexts::add);
}
protected void processStepRevision(StepConfigDo step, boolean archived,
   Set<StepConfigGid>archivedStepGids, StoryConfigId storyRevisionId) {
   m_stepGidByStepId.put(step.getId( ), step.getGid( ));
   if (m_stepContextsByGid.containsKey(step.getGid( ))) {
     return;
   }
   if (archived) {
     // remember stepId/stepGid and check them within earlier earlier
     // revision
     archivedStepGids.add(step.getGid( ));
   }
   else {
     StepContext ctx =new StepContext(this,
     STEPLETS.get(step.getStepTypeId( )), step, storyRevisionId);
     m_stepContextsByGid.put(step.getGid( ), ctx);
     // remove unmapped steps of newer archived revisions
     archivedStepGids.remove(step.getGid( ));
   }
}
```

```
protected void processOutletRevision(OutletConfigDo outlet,
        boolean archived, Set<OutletConfigGid> archivedOutletGids) {
    m_outletGidByOutletId.put(outlet.getId( ), outlet.getGid( ));
    if (m_targetStepContextsByOutletGid.containsKey(outlet.getGid( ))) {
        return;
    }
    if (archived) {
        // outlet does not exists in later revision ->remember outletGid
        // and check them within earlier earlier revision
        archivedOutletGids.add(outlet.getGid( ));
    }
    else{
        final StepConfigGid targetStepGid=
                        getStepGid(outlet.getTargetStepId( ));
        StepContext targetStepContext =
                        m_stepContextsByGid.get(targetStepGid);
        m_targetStepContextsByOutletGid.put(outlet.getGid( ), targetStepContext);
        // remove unmapped outlets of newer archived revisions
        archivedOutletGids.remove(outlet.getGid( ));
    }
}
            ------------Code snippet 3 end-------------
```

FIG. 43 shows an example of a campaign according to embodiments of the invention. The overall goal of the example campaign is to have existing customers or new customers of a company to attend an event which will be held by the company in three cities: Berlin, London and Paris.

The campaign is represented by a process structure PS where participants enter through three different channels, implemented by injection logic templates IJLT. A participant can be selected to participate in the campaign if he or she is already an existing customer fulfilling some criteria of a target group. A participant may also enter the campaign if he or she has completed purchases in the company web shop but is not registered as a customer as such. Lastly, new participants may enter the campaign by scanning a QR-code. The QR code may be in the form of a sticker applied to easily visible surfaces, such as windows, located in a city. When a person scans the QR-code he or she is redirected to a landing page served by an interaction logic template IALT where the person can create a profile by filling out details such as name, age and contact information. After creating a profile, the campaign checks by means of a data logic template DALT whether or not that person is already an existing customer, and if so, the person is directed straight to a landing page of another interaction logic template IALT where he or she can register for an event. In the case where the person is not already listed in any records maintained by the company, the person is automatically registered in the company's customer database by another data logic template DALT, and then directed to the same landing page for event registration.

The persons that are members of the target group or from the web shop, and whose E-mail addresses are accessible will automatically receive an email sent by an E-email interaction logic template IALT with a link to the registration landing page. Within the campaign management system CAMS, these persons, also referred to as participants, are represented by participant records PREC that may be processed according to the process structure PS.

At the landing page the participants are instructed to indicate which event city they intend to participate in: Berlin, London or Paris. Their choice of event city is stored by a data logic template DALT as a local participant attribute LPA within the campaign, and this attribute may be accessed at any later time during the campaign. After filling in their choice of event city, the participants are redirected to an event registration confirmation landing page of another interaction logic template where their choice of event city is shown.

The campaign manager, or user of the campaign management system, has chosen for this campaign that the first five hundred participants who sign up for one of the events held in either Berlin, London or Paris will receive a voucher for a free drink at the events, as controlled by a decision logic template DELT followed by a QR interaction logic template IALT.

Depending on the choice of event city, i.e. the local participant attribute evaluated by a decision logic template DELT, a participant receives either an email ticket for the event in Berlin, London or Paris by the appropriate of three different interaction logic templates IALT, and if the participant was one of the first five hundred participants to sign up for the event the voucher is also included in the email ticket.

The execution of one or more configured logic templates CLT of a campaign CAM running in live mode LMODE may be suspended based on actions performed by the user of the campaign management system CAMS or participants P subjected to the campaign CAM.

FIG. 44 shows an embodiment of the invention. The drawing illustrates how the execution of an executable program fragment EPF may be affected by external actions. The execution of the executable program fragment EPF of a configured logic template CLT may be suspended either by a user action UACT or a participant action PACT. The user of the campaign management system CAMS may perform a suspension command S-PAUSE, such as by pressing on a pause button in the graphical user interface GUI in the campaign management system CAMS. Performing a suspension command S-PAUSE is an example of a user-initiated suspension UIS of the executable program fragment EPF. Alternatively, the participant P may perform a participant action PACT which also suspends execution of the executable program fragment EPF. An example of a participant action PACT is a participant P not responding to an E-mail whereby further processing of the participant record PREC is temporarily suspended until the participant performs the actions needed for the executable program fragment to further process the participant record PREC. Another example of a participant action PACT which suspends execution of an executable program fragment is when a participant performs an interaction with the campaign CAM which result in the corresponding participant record PREC being placed on a configured logic template CLT which is not coupled to other configured logic templates. This naturally sets a limit on the processing of the participant record and further processing is in effect suspended until further processing is made available by e.g. the user of the campaign management system configuring a next configured logic template which may process the participant record PREC further.

The user of the campaign management system CAMS may perform another user action UACT which is performing a resume command R-PAUSE. The resume command R-PAUSE effectively abolishes the suspension of the one or more executable program fragments EPF. The resume command R-PAUSE may be performed by the user of the campaign management system pressing a button in the graphical user interface GUI. The button for the resume command R-PAUSE may be the same button for the suspension command S-PAUSE. The participant P may also resume the execution by performing a participant action PACT such as performing the necessary steps associated with a configured logic template, i.e. the steps that were previously not performed and thereby rendered the execution suspended.

FIG. 45 shows an embodiment of the invention. The drawing illustrates a process structure PS from the viewpoint of the graphical user interface GUI of the campaign management system CAMS. The user of the campaign management system CAMS can perform the suspension command S-PAUSE and/or resume command R-PAUSE by clicking on a campaign graphical pause button CGPB which pauses or resumes the execution of all executable program fragments EPF of the three configured logic templates represented by the three graphical elements GE1-GE3 in the graphical user interface GUI. The user may also press a template graphical pause button TGPB which pauses or resumes the execution of an executable program fragment of a single configured logic template. An advantage of being able to suspend execution according to an individual logic template while the rest of the process structure is still executing may be to avoid sending out emails until a minor configuration issue has been solved, or suspending participant records at a logic template prior to proceeding with the rest of a process sequence, for example to coordinate that all participant records resumes at manually decided time, for example if awaiting external arrangements to be ready for the next processing. The drawing further shows that the campaign CAM is running in live mode LMODE, and by flicking a switch in the graphical user interface the user may set the campaign into design mode DMODE.

The below copied code lines, Code snippet 4, from an embodiment of a test mode feature in a campaign management system, includes an enumeration definition for the live mode (execution type: auto) and test mode (execution type: manual). Further is provided method (SetStatus( )) for changing mode (status) of a process structure version between design/test mode (DRAFT), live mode (LIVE), sunset mode (SUNSET) and discontinuation (ARCHIVE). Note that in this embodiment the mode cannot be changed from live mode (LIVE) to design/test mode (DRAFT) because this is in fact requiring the creation of a new process structure version, which then starts in design/test mode (DRAFT). This can be done seamlessly by the system, without the user having to consider process structure versions.

Code Snippet 4—Test Mode:

```
------------Code snippet 4 start-------------
@EnumName("studio.ExecutionType")
public enum ExecutionType implements IEnum {
  MANUAL("manual", 0 ->TEXTS.get("studio.ExecutionTypeManual")),
  AUTO("auto", 0 ->TEXTS.get("studio.ExecutionTypeAuto"));
  private final String m_stringValue;
  private final Supplier<String> m_textSupplier;
  private ExecutionType(String stringValue, Supplier<String> textSupplier)
  {
    m_stringValue = stringValue;
    m_textSupplier = textSupplier;
  }
  @Override
  public String stringValue( ) {
    return m_stringValue;
  }
  @Override
  public String text( ) {
    return m_textSupplier.get( );
  }
}
```

```
public class EngineService {
  public void setStatus(StoryConfigId storyId,
                        SetStoryRevisionStatusDo storyRevisionStatus) {
    StoryStatus status =assertNotNull(storyRevisionStatus).getStatus( );
    switch (assertNotNull(status)) {
      case LIVE:
      case SUNSET:
      case ARCHIVE:
        break;
      default:
        fail("Requested target status is not supported [status={ }]",
                                                         status);
    }
    IStoryRepository storyRepo = BEANS.get(IStoryRepository.class);
    final InternalStoryRevisionInfoDo revisionInfo =
                          RunContexts.copyCurrent( ).call(( ) ->
                          storyRepo.getStoryRevisionInfo(storyId));
    if (revisionInfo.getStatus( ) == status) {
      // story has already requested status
      return;
    }
    if (revisionInfo.getStatus( ) == DRAFT) {
      assertEquals(status, LIVE,
        "story with status '{ }' can only be changed to '{ }'", DRAFT, LIVE);
    }
    else if (revisionInfo.getStatus( ) == LIVE) {
      assertTrue(ObjectUtility.isOneOf(status, SUNSET, ARCHIVE),
             "story with status '{ }' can only be changed to '{ }' or '{ }'",
                                              LIVE, SUNSET, ARCHIVE);
    }
    else if (revisionInfo.getStatus( ) == SUNSET) {
      assertEquals(status, ARCHIVE,
             "story with status '{ }' can only be changed to '{ }' or '{ }'",
                                              SUNSET, ARCHIVE);
    }
    else if (revisionInfo.getStatus( ) == ARCHIVE) {
      assertEqual(status, SUNSET,
             "story with status '{ }' can only be changed to '{ }' or '{ }'",
                                              SUNSET, ARCHIVE);
    }
    else {
      fail("unsupported current story status '{ }'",
                                          revisionInfo.getStatus( ));
    }
    if (revisionInfo.getStatus( ) == DRAFT) {
      // stop sandbox and remove its data
      unpublishDraftStory(storyId);
      BEANS.get(FlowService.class).removeFlows(
                             BEANS.get(RemoveFlowsQueryDo.class)
           .withStoryGid(revisionInfo.getGid( ))
           .withSandboxId(SandboxId.of(storyId)));
    }
    RunContexts.copyCurrent( ).run(( ) ->storyRepo.updateStatus(storyId,
                                              storyRevisionStatus));
    restartStory(revisionInfo.getGid( ), NOP_RUNNABLE);
  }
}
```

------------Code snippet 4 end-------------

Figure 46:
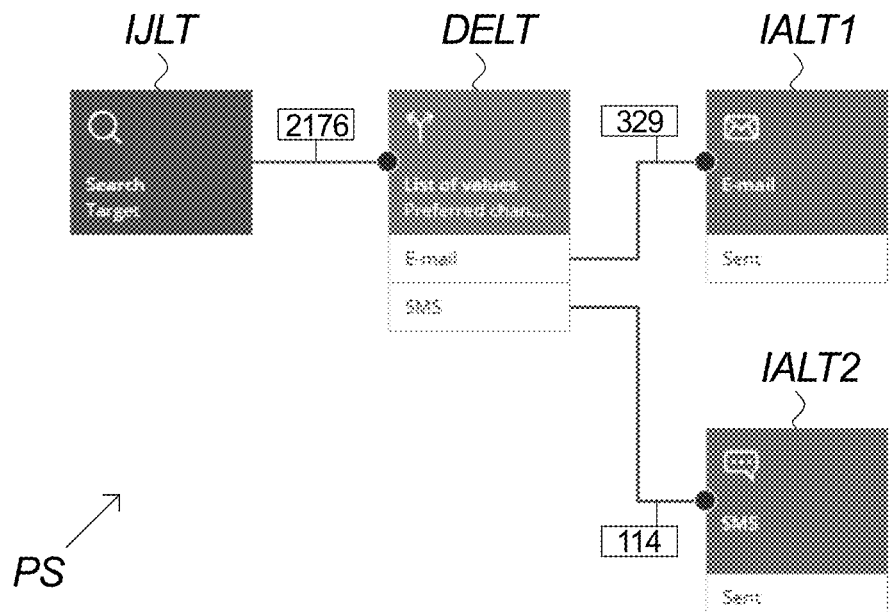

FIG. 46-49 show embodiments of the invention, based on the embodiment described above with reference to FIG. 38. The drawing of FIG. 46 illustrates a process structure representing a campaign which searches for participants P in one or more databases using an injection logic template IJLT. The participant records PREC entering the process structure are filtered according to their preferred channel of communication using a decision logic template DELT. If a participant P has selected E-mail as a preferred channel of communication, an E-mail is sent to the participant using a first interaction logic template IALT1, whereas if SMS (Short Message Service) is selected as a preferred channel of communication, an SMS is sent to the participant using a second interaction logic template IALT2.

FIG. 46 illustrates further a live action view for the user to monitor the processing of a process structure in live mode. By means of the live action view is indicated in the graphical user interface that at a specific point in time 2176 participant records PREC have entered into the process structure PS and are yet to be processed by the decision logic template DELT. Likewise, 329 participant records PREC have been processed by the decision logic template DELT and are yet to be processed by the first interaction logic template IALT. And likewise, 114 participant records PREC have been processed by the decision logic template DELT and are yet to be processed by the second interaction logic template IALT2. The number of participant records PREC who have been processed by the configured logic templates may be directly visible to the user of the campaign management system CAMS through the graphical user interface GUI. In an alternative embodiment of the invention, a numbering of how many participant records PREC that are being processed by the configured logic templates may be directly visible to the user of the campaign management system CAMS through the graphical user interface GUI. In a yet alternative embodiment, a combined view of the number of participant records PREC that are being processed by one or more configured logic templates and the number of participant records PREC that have been processed by one or more configured logic templates may be directly visible to the user of the campaign management system CAMS through the graphical user interface GUI. The user of the campaign management system CAM may also choose not to have any of such numbers visible in the graphical user interface GUI.

Figure 47:
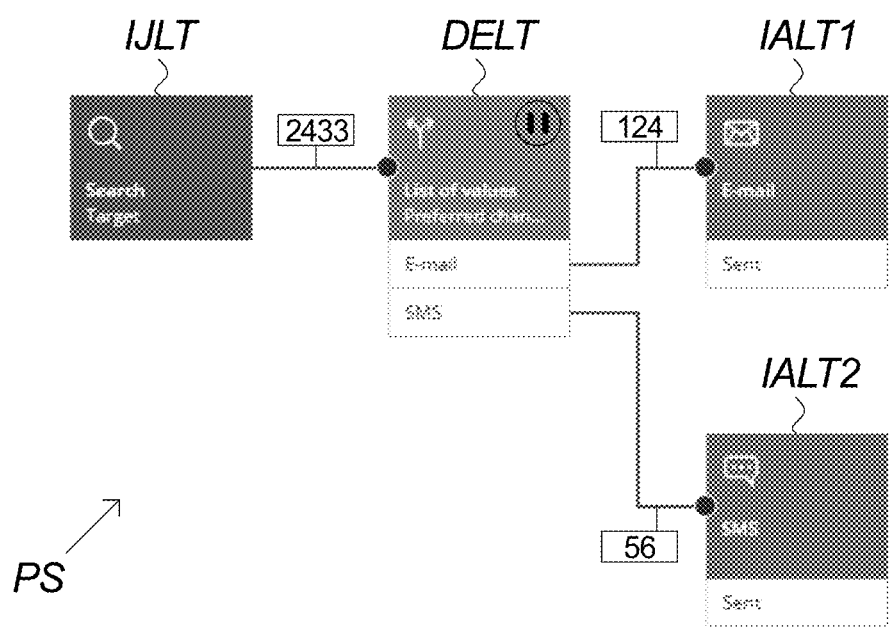

FIG. 47 illustrates that at a later point in time the execution of decision logic template DELT has been paused, also referred to as suspended. By pausing the decision logic template DELT, the corresponding executable program fragment EPF of the decision logic template DELT is no longer used in the processing of participant records PREC. As a result of this logic template-specific pausing, participant records PREC are suspended at the decision logic template, and thus an accumulation of participant records PREC occurs at the decision logic template DELT. In other words, the paused decision logic template DELT becomes a bottleneck for the processing of participant records PREC through the process structure PS. Since no participant records are processed by the paused decision logic template DELT, the number of participant records in-between the paused decision logic template DELT and the first and second interaction logic templates IALT1-IALT2 decreases, as the participant records are processed by these two configured logic templates. At the specific later point in time, illustrated in FIG. 47, the number of participant records PREC who have processed by the decision logic template DELT and are yet to be processed by the first interaction logic template IALT1 is 124. Likewise, the number of participant records PREC who have been processed by the decision logic template DELT and who are yet to be processed by the second interaction logic template IALT2 is 56. Both of these numbers will necessarily continue to decrease towards zero, as long as the decision logic template is paused and as long as participant records PREC are processed by the first and second interaction logic templates IALT1-IALT2.

The user of the campaign management system CAMS may choose to perform this logic template-specific pause for a number of reasons. One reason may be that the user realizes an error at a specific configured logic template CLT which result in a campaign CAM not working as intended. Thus, by pausing an individual configured logic template CLT, the user of the campaign management system CAMS may effectively limit the consequences inflicted by this configured logic template CLT by not allowing further participant records PREC to be processed by this configured logic template. The user of the campaign management system CAMS may also choose to pause an individual configured logic template CLT in order to configure the logic template even further to allow further options.

Figure 48:
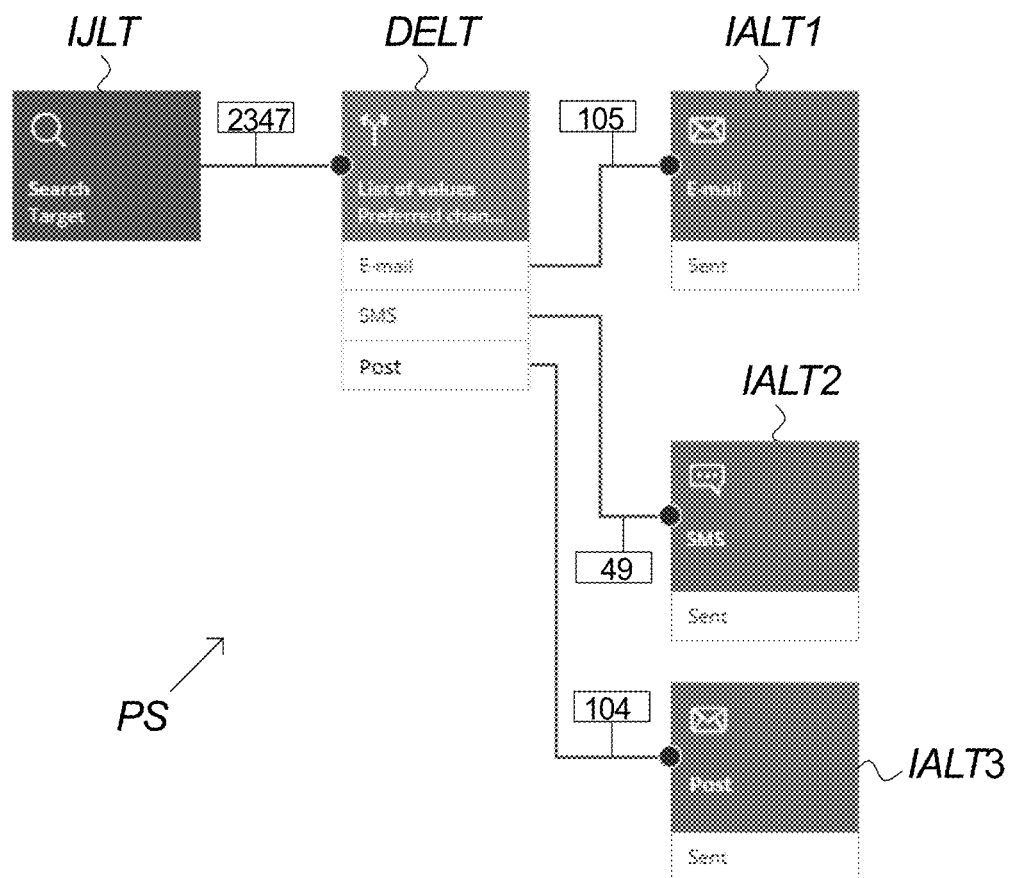

FIG. 48 shows the campaign CAM after the user of the campaign management system has un-paused the decision logic template DELT. During the pausing, the user of the campaign management system CAMS has modified the process structure PS to include a third interaction logic template IALT3 used to contact participants P via postal service(s). Accordingly, the decision logic template DELT now features a new filtering criterion which filters participant records PREC based on the participants preference of being contacted via postal service(s).

Figure 49:
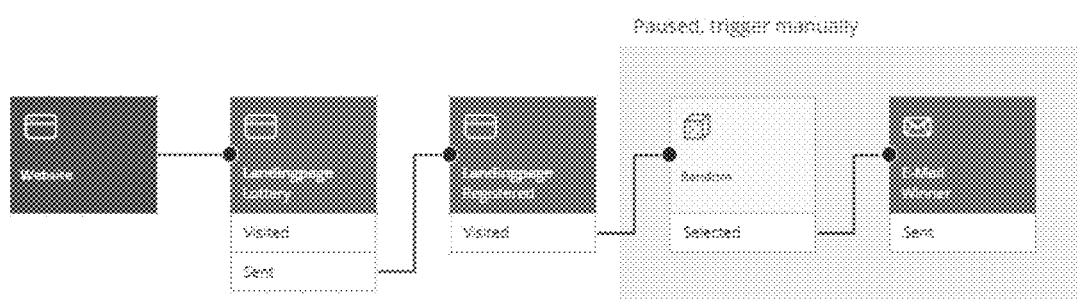

FIG. 49 shows an example of a process structure of a campaign CAM where the ability to pause an individual logic template is of great importance to the performance of the campaign. The campaign is directed towards inviting visitors, e.g. potential customers, on a website to participate in a lottery. The visitors, or participants, are directed to a lottery landing page, where they are presented with information about the lottery. For example, the participant may have a chance of winning a price by subscribing to e.g. a newsletter using an email address. A price may only be given to a particular number of participants, i.e. 10 randomly selected participants. However, the decision to choose which 10 random participants are given a price can only be done at a certain time when many more than 10 participants have registered. For this reason, the user of the campaign management system CAMS may decide already from the onset of the campaign going live to manually pause the logic template which performs the random selection of participants. Once an adequate number of participants have registered for the lottery, the user of the campaign management system CAMS may choose to un-pause the logic template and 10 participants are selected at random and sent an email about their lottery price.

The campaign management system CAMS may also comprise a mode of operation in which the user of the campaign management system CAMS is able to test the performance of a process structure, or indeed any process structure version PSV. This mode of operation is referred to as test mode TMODE. In a preferred embodiment, all participant interaction is disabled in test mode TMODE.

Figure 50:
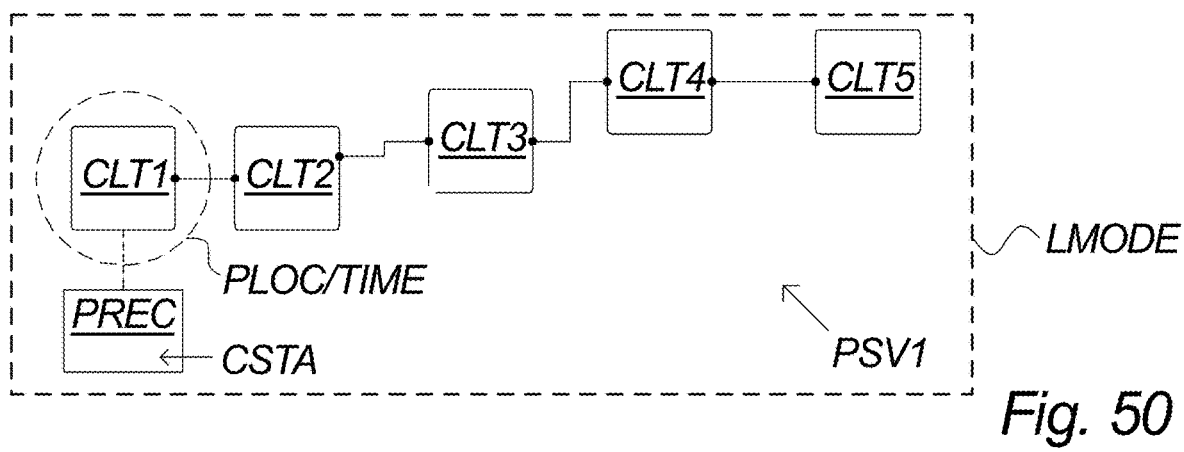

FIGS. 50-53 show embodiments of the invention. The drawing of FIG. 50 illustrates a first process structure version PSV1 of a campaign CAM running in live mode LMODE. The first process structure version PSV1 comprises five configured logic templates CLT1-CLT5. At a given point in time TIME a participant record PREC is at a participant location PLOC in the first process structure version PSV1. The participant location PLOC defines the point along the line of processing as defined by the configure logic templates, at which the participant record has progressed to, and this is retrievable from the track history of the participant record. At this point in time TIME the content of the participant record PREC represents a current state CSTA of the participant record PREC.

Figure 51:
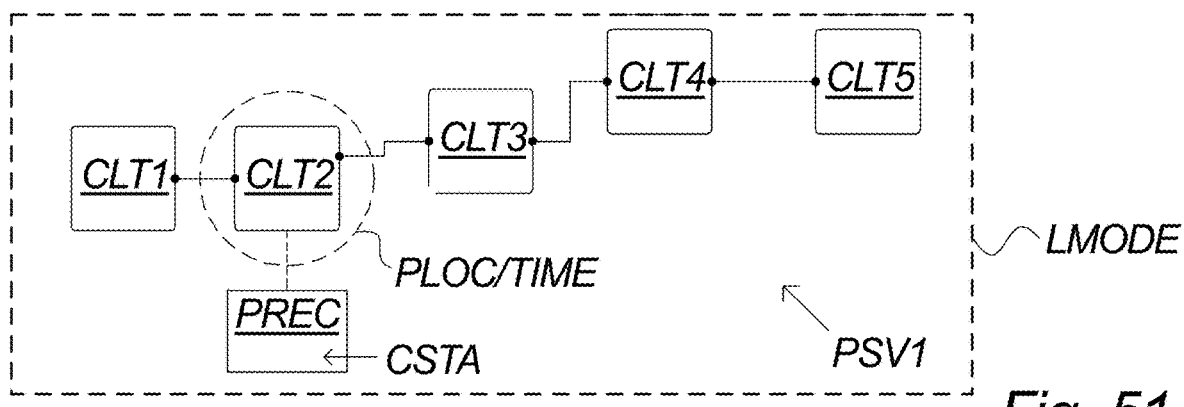

FIG. 51 illustrates the same first process structure version PSV1 at a later point in time TIME at which the participant location PLOC is advanced along a configured process sequence CPSEQ of the process structure version PSV1. At this point in time TIME the current state CSTA of the participant record PREC reflects the updates in the track history TH, and changes in participant attributes PA, if any, that occurred when progressing the participant record PREC from the participant location PLOC in FIG. 50 to the participant location PLOC in FIG. 51, i.e. when the participant record PREC was progressed from the first configured logic template CLT1 to the second configured logic template CLT2. The user of the campaign management system CAMS may decide that the campaign CAM, as represented by the first process structure version PSV1, needs modification by including additional configured logic templates. The user may create a second process structure version PSV2, preferably within the design mode DMODE, which includes a sixth configured logic template CLT6 and seventh configured logic template CLT7. However, before operating the second process structure version PSV2 in live mode LMODE, the user decides to test the second process structure version PSV2 in test mode TMODE, see FIG. 52.

When testing a process structure PS, or process structure version PSV, in test mode TMODE, the testing is performed on any number of test participant records TPREC, which are records that include similar features and functions as participant records PREC but are only usable within the test mode TMODE. A test participant record TPREC may be purely hypothetical, i.e., the test participant record TPREC is not associated with any real participant P and thus has only been created by the user of the campaign management system CAMS for testing of the campaign CAM. A test participant record TPREC may advantageously also at least partly be based on a participant record PREC which have undergone a processing and is associated with a participant P. In an embodiment of the invention, the test mode TMODE comprises any number of test participant records TPREC, each of which may be purely hypothetical or based at least partly on participant records PREC that have already undergone processing. FIG. 52 illustrates a test participant record TPREC which is under processing by, or have just been processed by, the second configured logic template CLT2 in test mode TMODE. The test participant record may reflect a current state CSTA of a participant record PREC which have already undergone a processing by one or more configured logic templates of a process structure, or process structure version, which have operated in live mode LMODE. In the current example, a participant record PREC which at a given time TIME was at the participant location PLOC, at the second configured logic template CLT2 in the first process structure version PSV1 of FIG. 51, may be used for testing in the updated second process structure version PSV2 in test mode TMODE, as shown in FIG. 52. The current state CSTA of the participant record at that given time TIME may be reflected in the test participant record TPREC, by e.g. cloning the data contained in the participant record PREC. This means that the test participant record TPREC in FIG. 52 may actually comprise, at the time of its creation, the real data obtained from the processing of the participant record PREC in live mode LMODE. When operating in test mode TMODE using a test participant record TPREC based on real data obtained during a live campaign, the further processing of the test participant record TPREC, by the newly added configured logic templates CLT6-CLT7, is preferably not based on participant input P-INPUT from the participant P, and therefore the progression of the test participant record TPREC is an emulated progression. Alternatively, the test participant record reflects an emulated state ESTA, which refers to the entire test participant record TPREC being emulated by the campaign management system CAMS, i.e. the record is associated with an entirely hypothetical participant. FIG. 53 illustrates a cloning of a participant record PREC into a test participant record TPREC. The cloning may comprise copying any data, such as track history TH and participant attributes PA from the participant record PREC into the test participant record TPREC.

The result of activating test mode TMODE is that the user of the campaign management system CAMS may test how a possible new process structure version, or an already existing process structure version, works for any number of test participant records TPREC. Being able to perform testing using test participant records TPREC based on actual participant records PREC that have already undergone processing is particular advantageous in that the testing/simulation becomes highly relevant since the test participant records TPREC then represents actual participants P rather than hypothetical persons created by the user of the campaign management system CAMS. Of course, being able to create test participant records TPREC associated with hypothetical participants and characterized by having an emulated state ESTA at creation is advantageous in that it becomes possible to perform testing of a campaign CAM using many more test participant records TPREC than participant records PREC present in the campaign CAM.

In FIG. 52 the test participant records TPREC are processed according to the second process structure version PSV2, however if for example the process structure comprises interaction logic templates, which would normally require participant input P-INPUT when operating in live mode LMODE, such participant input P-INPUT can of course not be provided by the participant P. In an embodiment of the invention, the participant input P-INPUT required for the processing of one or more test participant records TPREC in test mode TMODE may be provided by emulated inputs by the campaign management system CAMS itself. The emulated inputs may be based on random selection between the available options for interaction, or be intelligently controlled to test all available variants of input, or be randomized with a bias towards expected inputs from a more or less known target group of participants. In another embodiment of the invention, the participant input P-INPUT required for the processing of one or more test participant records TPREC in test mode TMODE may be provided by the user of the campaign management system CAMS. In an alternative embodiment of the invention the participant input P-INPUT required for the processing of one or more test participant records TPREC in test mode TMODE may be provided by both inputs from the user and emulated inputs from the campaign management system CAMS itself.

In an embodiment of the invention, the test mode TMODE is executed within the design mode DMODE of the campaign management system CAMS. In this manner the user of the campaign management system is able to both modify and test a process structure PS directly within the design mode DMODE. This results in an advantageous user experience where a user of the campaign management system CAMS can quickly test the changes made to a process structure PS and confirm whether these changes results in a campaign performing as intended.

The test mode TMODE also allows for generating statistics on the future development of the campaign CAM which may come in handy when assessing whether or not the process structure PS is configured as it should. For example, the test mode TMODE may inject any number of test participant records TPREC, such as 10,000 test participant records TPREC, into a process structure PS operating in test mode TMODE, and the processing of these test participant records TPREC reflects a bias such that for example the vast majority are processed according to a specific configured process sequence CPSEQ when it was expected that the processing of these test participant records TPREC were to be distributed more homogeneous among a greater number of configured process sequences CPSEQ. By identifying such dominant configured process sequences CPSEQ, it becomes possible to identify which configured logic templates CLT may comprise user editable parameters UEP that are not properly set up. As an example, a user of the campaign management system CAMS may realize that ranges of a value of a specific local participant attribute LPA have not been properly set up, such that almost any choice of value results in the test participant record TPREC being processed according to a specific configured process sequence CPSEQ. Identifying such errors in a campaign is highly advantageous before setting a process structure PS into live mode LMODE where the consequences would be that a large number of participant records PREC are processed wrongly.

FIG. 54 shows an example computer architecture for a computer system 500, also referred to as computer system COM, capable of executing executable program fragments EPF for processing of participant records PREC as described in the above. The computer 500 is thus capable of performing the acts associated with the processing engine ENG. The computer architecture shown in FIG. 54 illustrates a conventional server computer, workstation, desktop computer, laptop, tablet, network appliance, digital cellular phone, smart watch, or other computing device, and may be utilized to execute any of the software components, e.g. executable program fragments EPF, presented herein. The computer architecture shown in FIG. 54 might also be utilized to implement a computing device, or any other of the computing systems described herein.

The computer 500 includes a baseboard 501, or "motherboard," which is a printed circuit board to which a multitude of components or devices may be connected by way of a system bus or other electrical communication paths. In one illustrative example, one or more central processing units ("CPUs") 503 operate in conjunction with a chipset 502. The CPUs 503 may be standard programmable processors that perform arithmetic and logical operations necessary for the operation of the computer 500.

The CPUs 503 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 502 provides an interface between the CPUs 503 and the remainder of the components and devices on the baseboard 501. The chipset 502 may provide an interface to a RAM 504, used as the main memory in the computer 500. The chipset 502 may further provide an interface to a computer-readable storage medium such as a read-only memory ("ROM") 505 or non-volatile RAM ("NVRAM") for storing basic routines that help to start up the computer 500 and to transfer information between the various components and devices. The ROM 505 or NVRAM may also store other software components necessary for the operation of the computer 500 in accordance with the examples described herein.

The computer 500 may operate in a networked environment using logical connections to remote computing devices and computer systems through a network, such as the network 509. The chipset 502 may include functionality for providing network connectivity through a network interface controller ("NIC") 507, such as a mobile cellular network adapter, Wi-Fi network adapter or gigabit Ethernet adapter. The network interface controller 507 is capable of connecting the computer 500 to other computing devices over the network 509. It should be appreciated that multiple network interface controllers 507 may be present in the computer 500, connecting the computer to other types of networks and remote computer systems.

The computer 500 may be connected to a mass storage device 510 that provides non-volatile storage for the computer. The mass storage device 510 may store system programs, application programs, other program modules and data, which have been described in greater detail herein. The mass storage device 510 may be connected to the computer 500 through a storage controller 506 connected to the chipset 502. The mass storage device 510 may consist of one or more physical storage units. The storage controller 506 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 may store data on the mass storage device 510 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 510 is characterized as primary or secondary storage and the like.

For example, the computer 500 may store information to the mass storage device 510 by issuing instructions through the storage controller 506 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 510 by detecting the physical states or characteristics of one or more particular locations within the physical storage units.

In addition to the mass storage device 510 described above, the computer 500 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 500.

By way of example, and not limitation, computer-readable storage media may include volatile and non-volatile, removable and non-removable media implemented in any method or technology. Computer-readable storage media includes optical storage, magnetic cassettes, magnetic tape, magnetic disk storage or other magnetic storage devices, or any other medium that can be used to store the desired information in a non-transitory fashion.

The mass storage device 501 may store an operating system 511 utilized to control the operation of the computer 500. The mass storage device 510 may store other system or application programs and data utilized by the computer 500. The mass storage device 510 might also store other programs and data not specifically identified herein.

In one example, the mass storage device 510 or other computer-readable storage media is encoded with computer-executable instructions which may also be referred to as the executable program fragments EPF and the processing engine ENG that, when loaded into the computer 500, create a special-purpose computer capable of implementing the examples described herein. These computer-executable instructions transform the computer 500 by specifying how the CPUs 503 transition between states, as described above. According to one example, the computer 500 has access to computer-readable storage media storing computer-executable instructions which, when executed by the computer 500, perform the various routines described above with regard to FIGS. 1-53. The computer 500 might also include computer-readable storage media for performing any of the other computer-implemented operations described herein.

The computer 500 may also include one or more input/output controllers 508 for receiving and processing input from a number of input devices, such as a keyboard, a mouse, a touchpad, a touch screen, an electronic stylus, or other type of input device. Similarly, the input/output controller 508 may provide output to a display, such as a computer monitor, a flat-panel display, a digital projector, a printer, a plotter, or other type of output device. It will be appreciated that the computer 500 may not include all of the components shown in FIG. 54, may include other components that are not explicitly shown in FIG. 54, or may utilize an architecture completely different than that shown in FIG. 54.

Besides the already above described embodiments of the invention, further embodiments are described below.

A first further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system of this embodiment also applies global and local participant attributes GPA, LPA as described in FIGS. 9, 10 and FIGS. 31-34. The campaign management system applies and refers to a graphically illustrated process structure PS as described in FIGS. 12-19. The graphical representation of the process structure is also applied as a technical means/user interface available for the user when programming of the campaigns in question. This embodiment further includes the application of a track history TH according to FIG. 27 applied and used for many purposes in relation to the participant records PRECs processed by the system.

The campaign management system of the embodiment also includes and benefits from an easy configuration of logic templates according to FIGS. 20-22 and where user editable parameters UEP may be easily configured by a user as explained in FIGS. 28-30.

The campaign management system of the embodiment also includes and benefits from different modes, including a so-called live mode and a design mode applied for execution and designing, respectively, of the campaign in question. The live mode and design mode are explained in further details in FIGS. 35-37.

The campaign management system of the embodiment also includes and benefits from a migration option available for the user when updating versions of the process structure of campaigns. The migration feature elegantly facilitates migration of participant records "in progress" from one version to another without need for a complete finalization of the campaign, a re-entry of participant records, and unnecessary ejection of participant records still in progress in the campaign. The migration features are explained in further details in FIGS. 38-42.

The campaign management system of the embodiment also includes and benefits from a suspension option or mode where a user, and in some particular embodiments the participant, may invoke a suspension of the execution of the campaign. The embodiment provides for a resumption of the execution of the campaign on the basis of the participant records and their respective participant locations. The suspension feature is explained in FIGS. 44-49.

The campaign management system of the embodiment also includes and benefits from also features a so-called sandbox mode, a test mode, where a user may perform very advanced tests of a campaign draft without communication with real participants, but in an advanced version still run the campaign as if a certain degree of interaction are occurring. This is explained in FIGS. 50-53.

A second further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question.

A third further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system of this embodiment also applies global and local participant attributes GPA, LPA as described in FIGS. 9, 10 and FIGS. 31-34. The campaign management system applies and refers to a graphically illustrated process structure PS as described in FIGS. 12-19. The graphical representation of the process structure is also applied as a technical means/user interface available for the user when programming of the campaigns in question.

A fourth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. This embodiment further includes the application of a track history TH according to FIG. 27 applied and used for many purposes in relation to the participant records PRECs processed by the system.

A fifth further embodiment of the invention includes the system as described in FIGS. 1, 2, 43 and 54, optionally also as described in relation to FIGS. 20-22. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from an easy configuration of logic templates according to FIGS. 20-22 and where user editable parameters UEP may be easily configured by a user as explained in FIGS. 28-30.

A sixth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from different modes, including a so-called live mode and a design mode applied for execution and designing, respectively, of the campaign in question. The live mode and design mode are explained in further details in FIGS. 35-37.

A seventh further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from different modes, including a so-called live mode and a design mode applied for execution and designing, respectively, of the campaign in question. The live mode and design mode are explained in further details in FIGS. 35-37. The campaign management system of the embodiment also includes and benefits from also features a so-called sandbox mode, a test mode, where a user may perform very advanced tests of a campaign draft without communication with real participants, but in an advanced version still run the campaign as if a certain degree of interaction are occurring. This is explained in FIGS. 50-53.

An eighth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from different modes, including a so-called live mode and a design mode applied for execution and designing, respectively, of the campaign in question. The live mode and design mode are explained in further details in FIGS. 35-37. The campaign management system of the embodiment also includes and benefits from a suspension option or mode where a user, and in some particular embodiments the participant, may invoke a suspension of the execution of the campaign. The embodiment provides for a resumption of the execution of the campaign on the basis of the participant records and their respective participant locations. The suspension feature is explained in FIGS. 44-49.

A ninth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from different modes, including a so-called live mode and a design mode applied for execution and designing, respectively, of the campaign in question. The live mode and design mode are explained in further details in FIGS. 35-37. The campaign management system of the embodiment also includes and benefits from a migration option available for the user when updating versions of the process structure of campaigns. The migration feature elegantly facilitates migration of participant records "in progress" from one version to another without need for a complete finalization of the campaign, a re-entry of participant records, unnecessary ejection of participant records still in progress in the campaign. The migration features are explained in further details in FIGS. 38-42.

A tenth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from different modes, including a so-called live mode and a design mode applied for execution and designing, respectively, of the campaign in question. The live mode and design mode are explained in further details in FIGS. 35-37. The campaign management system of the embodiment also includes and benefits from a migration option available for the user when updating versions of the process structure of campaigns. The migration feature elegantly facilitates migration of participant records "in progress" from one version to another without need for a complete finalization of the campaign, a re-entry of participant records, unnecessary ejection of participant records still in progress in the campaign. The migration features are explained in further details in FIGS. 38-42. The campaign management system of the embodiment also includes and benefits from a suspension option or mode where a user, and in some particular embodiments the participant, may invoke a suspension of the execution of the campaign. The embodiment provides for a resumption of the execution of the campaign on the basis of the participant records and their respective participant locations. The suspension feature is explained in FIGS. 44-49. The campaign management system of the embodiment also includes and benefits from also features a so-called sandbox mode, a test mode, where a user may perform very advanced tests of a campaign draft without communication with real participants, but in an advanced version still run the campaign as if a certain degree of interaction are occurring. This is explained in FIGS. 50-53.

An eleventh further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from a migration option available for the user when updating versions of the process structure of campaigns. The migration feature elegantly facilitates migration of participant records "in progress" from one version to another without need for a complete finalization of the campaign, a re-entry of participant records, unnecessary ejection of participant records still in progress in the campaign. The migration features are explained in further details in FIGS. 38-42.

A twelfth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from a suspension option or mode where a user, a in some particular embodiments the participant, may invoke a suspension of the execution of the campaign. The embodiment provides for a resumption of the execution of the campaign on the basis of the participant records and their respective participant locations. The suspension feature is explained in FIGS. 44-49.

A thirteenth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from also features a so-called sandbox mode, a test mode, where a user may perform very advanced tests of a campaign draft without communication with real participants, but in an advanced version still run the campaign as if a certain degree of interaction are occurring. This is explained in FIGS. 50-53.

A fourteenth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system of this embodiment also applies global and local participant attributes GPA, LPA as described in FIGS. 9, 10 and FIGS. 31-34. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from an easy configuration of logic templates according to FIGS. 20-22 and where user editable parameters UEP may be easily configured by a user as explained in FIGS. 28-30.

A fifteenth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIG. 12-19. The graphical representation of the process structure is also applied as a technical means/user interface available for the user when programming of the campaigns in question. This embodiment further includes the application of a track history TH according to FIG. 27 applied and used for many purposes in relation to the participant records PRECs processed by the system. The campaign management system of the embodiment also includes and benefits from a migration option available for the user when updating versions of the process structure of campaigns. The migration feature elegantly facilitates migration of participant records "in progress" from one version to another without need for a complete finalization of the campaign, a re-entry of participant records, unnecessary ejection of participant records still in progress in the campaign. The migration features are explained in further details in FIGS. 38-42.

A sixteenth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question. This embodiment further includes the application of a track history TH according to FIG. 27 applied and used for many purposes in relation to the participant records PRECs processed by the system. The campaign management system of the embodiment also includes and benefits from a suspension option or mode where a user, and in some particular embodiments the participant, may invoke a suspension of the execution of the campaign. The embodiment provides for a resumption of the execution of the campaign on the basis of the participant records and their respective participant locations. The suspension feature is explained in FIGS. 44-49.

A seventeenth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system applies and refers to a graphically illustrated process structure PS as described in FIGS. 12-19. The graphical representation of the process structure is also applied as a technical means/user interface available for the user when programming of the campaigns in question. This embodiment further includes the application of a track history TH according to FIG. 27 applied and used for many purposes in relation to the participant records PRECs processed by the system. The campaign management system of the embodiment also includes and benefits from also features a so-called sandbox mode, a test mode, where a user may perform very advanced tests of a campaign draft without communication with real participants, but in an advanced version still run the campaign as if a certain degree of interaction are occurring. This is explained in FIGS. 50-53.

An eighteenth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system of this embodiment also applies global and local participant attributes GPA, LPA as described in FIGS. 9, 10 and FIGS. 31-34. The campaign management system applies and refers to a graphically illustrated process structure PS as described in FIGS. 12-19. The graphical representation of the process structure is also applied as a technical means/user interface available for the user when programming of the campaigns in question. The campaign management system of the embodiment also includes and benefits from an easy configuration of logic templates according to FIGS. 20-22 and where user editable parameters UEP may be easily configured by a user as explained in FIGS. 28-30.

A nineteenth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system of this embodiment also applies global and local participant attributes GPA, LPA as described in FIGS. 9, 10 and FIGS. 31-34. The campaign management system applies and refers to a graphically illustrated process structure PS as described in FIGS. 12-19. The graphical representation of the process structure is also applied as a technical means/user interface available for the user when programming of the campaigns in question. This embodiment further includes the application of a track history TH according to FIG. 27 applied and used for many purposes in relation to the participant records PRECs processed by the system. The campaign management system of the embodiment also includes and benefits from an easy configuration of logic templates according to FIGS. 20-22 and where user editable parameters UEP may be easily configured by a user as explained in FIGS. 28-30.

A twentieth further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system of this embodiment also applies global and local participant attributes GPA, LPA as described in FIGS. 9, 10 and FIGS. 31-34. The campaign management system applies and refers to a graphically illustrated process structure PS as described in FIGS. 12-19. The graphical representation of the process structure is also applied as a technical means/user interface available for the user when programming of the campaigns in question. This embodiment further includes the application of a track history TH according to FIG. 27 applied and used for many purposes in relation to the participant records PRECs processed by the system. The campaign management system of the embodiment also includes and benefits from an easy configuration of logic templates according to FIGS. 20-22 and where user editable parameters UEP may be easily configured by a user as explained in FIGS. 28-30. The campaign management system of the embodiment also includes and benefits from a migration option available for the user when updating versions of the process structure of campaigns. The migration feature elegantly facilitates migration of participant records "in progress" from one version to another without need for a complete finalization of the campaign, a re-entry of participant records, and unnecessary ejection of participant records still in progress in the campaign. The migration features are explained in further details in FIGS. 38-42.

A twenty-first further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system of this embodiment also applies global and local participant attributes GPA, LPA as described in FIGS. 9, 10 and FIGS. 31-34. The campaign management system applies and refers to a graphically illustrated process structure PS as described in FIGS. 12-19. The graphical representation of the process structure is also applied as a technical means/user interface available for the user when programming of the campaigns in question. This embodiment further includes the application of a track history TH according to FIG. 27 applied and used for many purposes in relation to the participant records PRECs processed by the system. The campaign management system of the embodiment also includes and benefits from an easy configuration of logic templates according to FIGS. 20-22 and where user editable parameters UEP may be easily configured by a user as explained in FIGS. 28-30. The campaign management system of the embodiment also includes and benefits from a suspension option or mode where a user, and in some particular embodiments the participant, may invoke a suspension of the execution of the campaign. The embodiment provides for a resumption of the execution of the campaign on the basis of the participant records and their respective participant locations. The suspension feature is explained in FIGS. 44-49.

A twenty-second further embodiment of the invention includes the system as described in FIGS. 1, 2, 43 and 54, optionally also as described in relation to FIGS. 20-22. The system in configured for application of participant records PREC as described and explained in relation to FIGS. 3-8 and FIGS. 23-26. The campaign management system of this embodiment also applies global and local participant attributes GPA, LPA as described in FIGS. 9, 10 and FIGS. 31-34. The campaign management system applies and refers to a graphically illustrated process structure PS as described in FIGS. 12-19. The graphical representation of the process structure is also applied as a technical means/user interface available for the user when programming of the campaigns in question. This embodiment further includes the application of a track history TH according to FIG. 27 applied and used for many purposes in relation to the participant records PRECs processed by the system. The campaign management system of the embodiment also includes and benefits from an easy configuration of logic templates according to FIGS. 20-22 and where user editable parameters UEP may be easily configured by a user as explained in FIGS. 28-30. The campaign management system of the embodiment also includes and benefits from also features a so-called sandbox mode, a test mode, where a user may perform very advanced tests of a campaign draft without communication with real participants, but in an advanced version still run the campaign as if a certain degree of interaction are occurring. This is explained in FIGS. 50-53.

DEFINITIONS AND REFERENCE SIGNS

Attributes: In the present disclosure, the term attribute is used for data related to an object, for example a participant, a campaign, etc. Attributes are generally editable over the course of a campaign, and may therefore also be considered variables. Depending on the relation and nature, an attribute may for example be local to a specific campaign or global for several campaigns or other used. An attribute may also be local to a specific logic template or temporary. The disclosure facilitates different kinds of datatypes for attributes, and they may be stored in databases, files, etc.

CA—campaign attributes: Some data may be relevant across all participants of a campaign, and such data are referred to as campaign attributes. Campaign attributes may for example be useful when exactly one object is needed to coordinate actions across the campaign. This may for example be initialization data for the campaign, general settings and configuration of the campaign, or a value that is shared between all participants, e.g. the number of prizes in a lottery, the number of seats at an event, the current leader of a collection, etc. In other words, the campaign attributes may in an aspect be considered 'singletons' in the scope of a campaign. In embodiments features two or more process structure versions, the campaign attributes may be managed individually for each version, or also here be managed as singletons across versions.

CAM—campaign: A campaign according to the present disclosure refers to an arrangement or structure of processing and managing participants, preferably involving a number of interactions with the participants. A campaign in the present disclosure may be considered the technical structure set up to manage a customer relationship, advertising campaign, complaint, service or booking procedure, event participant management, project management, object management, product life cycle management, etc. A campaign facilitates a number of more or less complex ways that a participant, human or object, can progress depending on the interactions with the participant and properties of the participant and other elements of the campaign, for examples choices made by the participant, state of external circumstances or events, etc. A campaign may in an embodiment be endless in the sense that participants reaching a dead end may be suspended for resumption at a later time when the campaign has been evolved to handle the dead end.

CAMS—campaign management system: In the present disclosure, the campaign management system is a system defining and managing a campaign, including comprising the process structure, a number of participant records, a graphical user interface to manage the process structure and a processing engine to execute the campaign. The campaign management system may be distributed, for example between a campaign designing part and a campaign processing part.

CAR—campaign record: In the present disclosure, a campaign record is a data container representing a campaign. Besides a reference of any kind, more or less identifying, to an associated campaign, the campaign record stores, among others, campaign attributes based on data generated during the campaign, e.g. data generated through interactions with participants. In other words, the data in a campaign record represents the current state and history of a campaign, and the campaign record is modified during the course of the campaign CCLT—common configured logic template: By common configured logic template is referred to a configured logic template that is present in two or more process structure versions. As different process structure versions may define different possible experiences, events, actions, etc. and/or different ways or criteria to reach the different points, the common configured logic templates represent points in the process structure which exist in at least one other version, and thereby forms a matching position in terms of process flow. The common configured logic template is preferably configured substantially similar in both versions. However, a configured logic template can be a common configured logic template even if configured differently in the two or more process structure versions to which it is common. For example, a new process structure version may be different from an earlier process structure version by having changed filter criteria of a logic template, added options, e.g. sequence forward points, of a logic template, etc., but such logic template is still considered a common configured logic template for the two process sequence versions despite of the difference in configuration. On the other hand, a logic template that only exists in one of the versions, or has been significantly reconfigured, such as by removing sequence forward points or local participant attributes, cannot be a common configured logic template to the two versions. The subsets of configured logic templates that is used in the different process sequence versions thus overlap by at least one, and often several, common configured logic templates. In other words, a common configured logic template represents a similar functionality in two or more versions of a campaign. A common configured logic template thereby also determines an advantageous position in the process sequence for the processing of a participant record to be migrated from one version to another, as the functionality at that location in the processing sequence is the same or at least overlapping.

CGPB—campaign graphical pause button: In the present disclosure, a campaign graphical pause button refers to a button in the graphical user interfaces which the user may click on to suspend the entire campaign.

CLPA—campaign-specific local participant attribute: In the present disclosure, a campaign-specific local participant attribute is a local participant attribute which is generally available and relevant over the course of the campaign to several logic templates, e.g. for consolidating interactions. By providing local participant attributes which are available to more than one logic template, preferably to any logic template, of the process structure, i.e. of a specific campaign, it is possible to track information, participant interaction, counters, etc., across the various logic templates. This may for example be an advantageous way of storing campaign specific participant preferences, without requiring export of the information to the master data. In that sense, the local participant attributes may also be considered temporary as compared to master data.

CLT—configured logic template: In the present disclosure, a configured logic template refers to a logic template which has been configured for a particular campaign and process structure by editing the user editable parameters to the extent necessary for achieving the intended functionality in the process structure. This may for example involve setting various initialization parameters, filter criteria, references to participant attributes and campaign attributes, definition of sequence forward points, etc. Some logic templates, in particular ones with simple functionality, may be pre-configured by default values or not need any configuration to function, and are thus considered configured logic templates as soon as they are placed into a process structure.

COM—computer system: In the present disclosure a computer system refers to a system comprising all the hardware and software required to make it functional for a user. The computer system has the ability to receive user input and participant input, process data and create information for storage and/or output. The computer system may be a stand-alone computer system or a distributed computer system such as a cloud-based computer system. The computer system of the present disclosure is arranged to host the campaign management system and thereby facilitate interactions with participants subjected to a campaign as well as interactions with the user of the campaign management system.

Computer-implemented: The campaign management system is computer-implemented, meaning according to the present disclosure that the participant records, the process structure versions, the configured logic templates and their executable program fragments, the track histories, the configurations and other elements comprised by the campaign management system are stored in digital form in the same or different locations and computer storage types, and that one or more processors are provided to manage the data and configurations and perform the processing of the participant records according to the process structure. In various embodiments, the campaign management system further comprises a graphical user interface, hence also computer-implemented, i.e. providing a graphical view to a user by any display means and receiving input from the user by any ordinary or special computer input means. The campaign management system may be implemented and running on a single computer, or have different modules separated to different computers, e.g. one computer running a processing engine processing participant records, and another computer running the graphical user interface for designing the process structure. The campaign management system may be using distributed processing, for example cloud based. The storage of data may be at separate data servers, e.g. cloud based, or be local in connection with the processing computers.

Container record: According to the present disclosure, several participant records may be associated with the same participant, whereby different executions of process structure may exist for a single participant. In this situation, the two or more participant records associated with the same participant may be stored and processed as individual participant records, or they may preferably be stored together in a container record, providing for sharing an amount of common data but function as individual participant records. An advantage of using a container record to store participant records associated with the same participant may be to avoid data redundancy and quantity. As an example, the participant association, all the global participant attributes, and some of the local participant attributes may be identical for all instances of processing related to the same participant and could be stored once as common data in the container record associated with the particular participant, whereas other local participant attributes and in particular the individual track histories for each participant record related to that particular participant would need individual storage within the container record. A part of the track histories may be common data in the container record if the forking of a participant record into two or more participant records occurred after some execution history was made. According to the present disclosure, implementations of these examples or similar, where a number of participant records are consolidated in a container record, are considered to comprise a number of individual participant records associated with the same participant even if stored in an efficient, data-sharing way, and are treated as individual participant records from a processing point of view.

CPSEQ—configured process sequences: According to the disclosure, configured process sequences denote the possible sequences through the process structure, defined by the couplings of logic templates in the graphical user interface. In other words, each configured process sequence defines a possible way of execution of participant records through a campaign or other process. Each branch or rejoin of graphical connections and graphical sequence connection points, and each possible process feedback from a forward point of a logic template back to the receive point of the same logic template, possible via other logic templates, results in a different configured process sequence. As the user editable parameters are a significant part of configuring the possible connection points of the logic templates, they thereby also in practice facilitate the possible couplings and thereby the possible configured process structures.

DALT—Data logic template: According to the present disclosure, a data logic template is a category of logic templates for performing data operations such as serialization/deserialization, import/export, changing attribute values, etc. Various data logic templates may implement different kinds of data operations, and work on different kinds of data. Some data logic templates may for example be arranged to write values of local participant attributes into master data or vice versa, i.e. having a global scope according to the present disclosure, whereas others may be arranged to manipulate local participant records based on in-campaign data or events, e.g. for consolidation within the present campaign, i.e. having a local scope according to the present disclosure.

CSTA—current state: According to the present disclosure, a current state reflects the current content of a participant record within a campaign, e.g. the current state of the track history and the current participant attributes.

DELT—Decision logic template: According to the present disclosure, a decision logic template is a category of logic templates for performing selection, filtering, etc., or otherwise decide a sequence forward point based on various criteria, participant attributes, external data or event, etc. The selection may be based on interaction with a participant, and/or based on other input, data or randomly. A decision logic template may for example select a configured process sequence based solely on user editable parameters, i.e. configuration of the logic template, for example in the case of random A/B branching. Other decision logic templates may use the current participant attributes, for example to make branching based on ranges of values, e.g. age, geographic location, sales amount, etc., or use external data such as current weather condition at the participant's address, cloud data, social media data, e.g. 'likes', etc. Different decision logic template types may for example include branching decision logic templates, exclusion decision logic templates, parallelization decision logic templates, pass decision logic templates, time decision logic templates, manual decision logic templates and AI decision logic templates.

DISP—display: In the present disclosure, a display refers to a display device which is an output device for presentation of information in a visual form. Examples of such a display may be a liquid crystal (LCD) display, a light emitting diode (LED) display, an organic light emitting diode (OLED) display, an active matrix organic light emitting diode (AMOLED) display and a quantum dot (QLED) display. The display may be a stand-alone display such as a desktop monitor or a display integrated in a handheld device such as a laptop, a tablet or a smartphone. The display of the present disclosure facilitates the displaying of the graphical user interface of the campaign management system to the user of the system.

DMODE—design mode: According to the present disclosure, the term design mode refers to a mode of operation of the campaign management system where the user has access to defining and/or modifying a process structure by coupling logic templates to one another through sequence forward points and sequence receive points. In the design mode, the user may further edit user editable parameters of logic templates.

ENG—processing engine: The campaign management system comprises a processing engine to process the participant records in accordance with a process structure. Besides the provision of the graphical user interface allowing a user to couple logic templates to define configured process sequences and edit user editable parameters of the logic templates to produce configured logic templates, a processing engine is provided to process the thus configured campaign. A main purpose of the processing engine is to initiate the execution of the executable program fragments of the individual logic templates in a sequence defined by the process structure and as appropriate for a particular participant record based on its track history and any relevant process structure versions, and manage this for all the participant records in a campaign or several campaigns. The processing engine determines, for each participant record, which executable program fragment to execute next. The options for the processing engine is limited to the configured process sequences defined in the process structure, and further limited by the track history of the particular participant record. In other words, the prior execution of a participant record and the choices made in that connection, possibly by the associated participant, and in particular the last executed executable program fragment for that particular participant record, determines which possible configured process sequences are available to that participant record, and the outcome of the last executed executable program fragment in terms of a determined sequence forward point will due to the connections between sequence forward points and sequence receive points of logic templates defined in the process structure, determine a specific logic template and executable program fragment to execute next for that participant record. In an embodiment, the processing engine is able to process participant records according to an only partly configured process structure, as the execution can suspended until further configuration allows resumption. The processing engine is computer-implemented, and may utilize parallel processing in several execution threads in a queue-based execution system, and/or utilize distribution computing, and/or delegate execution tasks to separate processors, e.g. a logic template being hosted and executed on a third party computer.

EPF—executable program fragment: In the present disclosure, an executable program fragment denotes a piece of code that can be executed to perform one or more actions with respect to a specified participant record. Each logic template comprises an executable program fragment which is configured, e.g. by software programming and/or hardware circuits, to perform the special function or several functions related to that logic template. The executable program fragments are preferably configured to rely on a configuration established by the user editable parameters, and further to rely on one or more specific participant records. An executable program fragment may also be configured to further rely on external data, e.g. data retrieved from a webservice such as weather data, event booking data, etc. The executable program fragments of the various logic templates are configured to be executed in a sequence relative to each other as determined by the processing engine on the basis of the process structure.

EPSEQ—executed process sequence: The sequence of executable program fragments that has actually been executed with respect to a specific participant record is denoted an executed process sequence, and is stored in the track history for that specific participant record. An executed process sequence thus corresponds to one of the configured process sequences of the process structure, or to a part thereof if the processing has not yet finished.

ESTA—emulated state: In the present disclosure, an emulated state is a state of a test participant record at any time during testing within test mode TMODE. The emulated state may comprise an emulated track history and/or emulated values of participant attributes. The emulated state pertaining to a test participant record may be generated by the user of the campaign management system or randomly generated by the campaign management system itself.

Filtering parameter: A filtering parameter in the present disclosure relates to many different possible ways of extracting desired information from a process structure operating in live mode and/or test mode. The filtering could be performed with respect to the participant gender, age, preferences with respect to products, etc. The filtering would as such then e.g. provide a possibility of monitoring visually the accumulated number of total participants of a certain campaign having entered the different "steps", i.e. configured logic templates, of the process structure, and then switch to another view where only male participant are illustrated. In this way, it may be possible for the campaign designer, the user of the campaign management system, or the person in responsibility of the campaign in a live mode to view and check not only whether the campaign is running as intended but also check if some groups of participants are following different paths along the process structure. Everything may be performed in real-time. Such filtering may also give the person responsible of the campaign information to decide whether the campaign should be optimized or paused, completely or partly. In an embodiment the filtering parameter includes gender, age, country, nationality, consumption history, relevant local attributes related to a specific campaign, etc.

GC—graphical connection: When designing a campaign in the graphical user interface, the graphical elements representing the individual logic templates are getting connected by graphical connections. The graphical connections thereby become the definition of the process structure, together with the configurations made to the individual logic templates. Several logic templates may preferably have a plurality of sequence forward points, and for such logic templates, each graphical connection is preferably connected to a specific sequence forward point, in order to facilitate different connections for the different sequence forward points of a logic template. Likewise, in an embodiment providing a plurality of sequence receive points for a logic template, the graphical connections are connected to specific such sequence receive points. In other words, the graphical connections preferably bind specific sequence forward points to specific sequence receive points, and are used by the user to define and illustrate the various configured process sequences, and thereby indirectly by the processing engine to determine the sequence of execution of executable program fragments and related configurations.

GDENV—graphical design environment: In the present disclosure, a graphical design environment is the part of the graphical user interface where the graphical definition of a process structure is made by placing graphical elements and connecting them by graphical connections. GE—graphical element: In the present disclosure, a graphical element is a representation of a logic template in the graphical user interface. It may preferably be interactive for the user to drag-and-drop, relocate, and otherwise interact with the configuration of the related logic template, etc. Graphical elements are connectable by graphical connections.

GEL—graphical element library: The graphical user interface GUI may comprise a graphical elements library GEL, which according to the present disclosure shows and avails the graphical elements GE to a user of the campaign management system CAMS for defining a process structure PS.

GPA—global participant attribute: In the present disclosure, the terms global and local with respect to participant attributes denote the origin, and thereby original availability, of an attribute value in the scope of a campaign. A global participant attribute thus refers to a participant attribute of which the value is retrieved from the master data used to generate the participant record, i.e. retrieved from outside the campaign, so that the global participant attribute comprises a representation of the data or a reference to the data. The master data on which global participant attributes are based are preferably also generally available to other campaigns and any other uses, and may for example be data from a CRM system, social media account, etc. The term global in the present disclosure does not mean that changes to the attribute are necessarily reflected in the originating scope, i.e. in the master data. In a preferred embodiment, changes to the value of a global participant attribute which takes place in the scope of a campaign are not reflected in the underlying master data, unless the value is explicitly written back to the master data by a suitable logic template. In that aspect, a global participant attribute may be considered an instance of master data for the scope of a specific campaign. In case of a global participant attributed storing a reference to master data instead of a copy of the data, any update of the master data will preferably by reflected in the use of the global participant attribute in the campaign.

GUI—graphical user interface: The graphical user interface is configured to allow the user of the campaign management system to build and illustrate a process structure and configure individual logic templates, by presenting graphical elements, graphical connections, etc., on a screen, and facilitating interaction with the graphical elements and connections, etc., by input from the user e.g. by computer mouse, keyboard, touch gestures, etc.

IALT—interaction logic template: According to the present disclosure, an interaction logic template is a category of logic templates for interacting with the participant related to the specific participant record processed. The executable program fragments of interaction logic templates are arranged to establish or facilitate a communication with the participant. Various interaction logic templates may implement different kinds of communication, e.g. email, smartphone push messages, QR codes, web forms, etc. The executable program fragment of interaction logic templates may be arranged to accommodate different outcomes and error situations related to the kind of communication that they implement, such as receiving input from participant, handling communication errors, detecting absence of reaction after a timer expiration, etc. Thereby an interaction logic template may often be more complex than other categories of logic templates in its implementation and configuration as experienced by the user, i.e. the sense that a single interaction logic template can handle e.g. both transmission to participants, received response from participants, delays, bouncing of emails and other errors, etc.

IJLT—injection logic template: According to the present disclosure, an injection logic template is a category of logic templates for managing the injection of participants into a campaign. The executable program fragments of injection logic templates are arranged to create participant records, including creating global participant attributes from master data when relevant, and preferably to detect and manage situations where a particular participant to be injected already has a related participant record in the same campaign. The injection logic templates are different from other categories of logic templates because their executable program fragment can be executed without reference to a specific participant record, as it is the injection logic template which creates the participant record. The master data from which the global participant attributes are derived, may be any kind of data about a participant, with or without explicit identification. It may for example be master data from a client database or similar, but also data from CSV files, imports from a REST Service, information gathered from the participant doing a QR-Scan or a website call possibly leaving only an IP address or device identification, etc.

LMODE—live mode: In the present disclosure, the term live mode refers to a mode of operation of the campaign management system where participant records are being processed by reference to a process structure.

LPA—local participant attribute: In the present disclosure, the terms global and local with respect to participant attributes denote the origin, and thereby original availability, of an attribute value in the scope of a campaign. A local participant attribute thus refers to a participant attribute of which the value is produced during the course of the campaign, possibly generated within the campaign or based on external data not being master data of the participant. Local participant attributes may comprise template-specific local participant attributes relating to or being relevant only to specific logic templates, and campaign-specific local participant attributes generally available and relevant over the course of the campaign to several logic templates.

LT—logic template: In the present disclosure, logic templates are the active building blocks of a process structure of a campaign. A logic template comprises an executable program fragment defining and implementing its action(s) and user editable parameters to configure it. Different categories of logic templates may be provided, for example injection logic templates to inject participants in a campaign by generating participant records, interaction logic templates to perform interactions with the participant, decision logic templates to perform selection, filtering, etc., and data logic templates to perform data operations such as serialization/deserialization, import/export of data from/to master data or third party systems, changing attribute values, etc.

MC—mouse cursor: A graphical indication of a location in the graphical user interface which is controlled by a user-controlled pointing device, e.g. a computer mouse or stylus.

MD—master data: In the present disclosure, master data refers to data external to a campaign, about persons or objects, for example clients or leads in a CRM system, webshop users, conference participants, campaign subjects, subscribers to services, sold, leased or rented products such as cars or other means for transportation, batteries for electric vehicles. Master data may for example comprise identification information, contact information, account information, financial information, interests and sales information. A subset of the master data may preferably be used as basis for a participant record in the form of global participant attributes holding values based on master data or simply referencing master data.

MDB—database of master data: The master data may be stored in one or more data sources of any kind, herein commonly referred to as databases, for example a CRM system of an enterprise, social media datacenters, CSV-files etc. The campaign management system is arranged to access the database of master data to retrieve a subset of master data for a participant record, or it may simply receive the master data as a push request. The database of master data may be stored locally, in central datacenters, cloud storage, etc., and may provide any suitable means of connection for data exchange with the campaign management system.

Migration: The processing of a participant record in accordance with the process structure may according to the present disclosure in an embodiment be migrated to a different process structure version. Each participant record may from its creation be processed according to the process structure version which created it. However, when the campaign management system has more than one process structure version of a process structure, the processing of the participant record can be migrated to one of the other process structure versions, for example a newer, more optimized or evolved process structure version. This migration may advantageously be automatically applied by the campaign management system, e.g. by a processing engine, when the circumstances for a processing migration are right. In an embodiment the migration may also be applied manually by the user.

P—participant: According to the present disclosure, a participant is an external and real person or object which the campaign basically is directed towards. In the present context a participant may thus be a person, a machine, a device, etc., to which a campaign can be directed. Each campaign is typically directed to a specific kind of participants, e.g. persons. Examples of participants may include clients or leads in a CRM system, webshop users, conference participants, campaign subjects, subscribers to services, sold, leased or rented products such as cars or other means for transportation, batteries for electric vehicles, etc. In the processing of the campaign, the participants are represented by participant records. The participants may or may not know that they are subject of a campaign, but a campaign typically causes some kind of interaction with the participants, irrespective of the participants being aware that it is controlled by the processing of the campaign. A participant may be anonymous to the campaign in the sense that the participant record may include more or less information about the participant it represents, from an arbitrary GUID or serial number or the like when nothing else is available, to complete participant identifiable data such as name, address, email address, social security number, etc. in campaigns where this kind of information is relevant.

P-INPUT—participant input: In the present disclosure, a participant input relates to actions necessary for the processing of participant records, or test participant records, such as for the processing in relation to interaction logic templates. Examples of participant interactions are responses to E-mails and other text messages such as SMS, clicks on a landing page, scans of QR-codes and any other form of interaction with a campaign. The participant interaction may be performed by a participant subjected to a campaign and/or a user of the campaign management system when for example a process structure, or process structure version, is operating in test mode.

PA—participant attribute: In the present disclosure, a participant attribute denotes apiece of data related to a specific participant record and thereby a specific participant. The participant attributes may be based on master data about the participant, such as global participant attributes, or be defined during campaign design and given a value over the course of the campaign, e.g. by interaction with the participant, such as local participant attributes. The participant attributes may for example identify the participant, provide participant contact interface information to initiate interaction with the participant, receive and store inputs from the participant, store temporary processing data related to the participant, etc.

PACT—participant action: In the present disclosure, the participant action is an action performed by the participant which determines if the execution of one or more executable program fragments of one or more configured logic templates should be suspended from execution or resumed from a previous suspension. A participant action may be as simple as a non-responsiveness of a participant, for example when a participant does not answer an E-mail or when a participant performs an interaction with the campaign which forwards the corresponding participant record to a configured logic template which is not coupled to any other configured logic templates such that no further processing of the participant record is available.

PAS—participant association: In the present disclosure, the participant records each comprises a participant association being a more or less unique identifier of the participant, such as for example an email address, telephone number, customer account number, social media account name, social security number, etc.

PAT—participant attribute type: According to the present disclosure, participant attribute type generally refers to the data type of a participant attribute. This may be simple base data types such as Boolean, integer, float, etc., and may in various embodiments also be built-in or user-defined complex data types or structures such as arrays, format validated data fields like telephone numbers or email addresses, enumerations, structures of same or different datatypes like addresses, images, documents, etc.

PCI—participant contact interface: In the present disclosure, a participant contact interface is referring to any interface to interacting with a participant being a person or an object. Such interfaces may e.g. be email client, telephone, message service interface, social media interface, geographical address for postal services or physical meeting, a communication client on a computer, smartphone or other connected device, etc.

PCII—participant contact interface information: In the present disclosure, a participant contact interface information is information enabling establishing a communication through a participant contact interface, e. g. email-address, a telephone number, a social media account name, a street address, an internet address or other network address e.g. IP-address, a device address e.g. MAC-address or advertising identifier, or a participant identifier. The participant contact interface information may for example be stored as a global participant attribute or local participant attribute in a participant record.

PIC—participant interaction channel: In the present disclosure, a participant interaction channel is an already established communication channel between a participant and the campaign management system. The participant may update a local participant attribute of the associated participant record by means of the participant interaction channel. As such, a participant interaction channel may represent a communication channel relating to any of the participant contact interfaces of the present disclosure.

PLOC—participant location: In the present disclosure, a participant location is a location in the process structure which reflects the progress of the processing of a participant record according to a process structure. The participant location may refer to a sequence forward point of a configured logic template which the participant record is associated with after the processing by the configured logic template. The participant location may also refer to a specific configured logic template which is currently processing the participant record. It should be noted that a participant location is a somewhat abstract designation of the process as neither the participant, nor the participant record, is moved or transferred during the process. The participant record rather captures the present state of the attributes, including the registered track history of the participant record relative to the progression along the process structure. In real life, the participant, will however experience progression along the process structure, of course only to the degree that participant interactions are in fact involved.

PRDB—participant record database: According to the present disclosure, any data storage structure holding one or more participant records may be referred to as participant record database. It may for example be cloud-based, distributed or centralized; be based on files, relational databases, or any other data container; be compressed binary, or human readable text, or a combination, etc., and be accessed through a file system, webservice, database server, etc.

PREC—participant record: In the present disclosure, a participant record is a data container representing a participant through a campaign defined by a process structure. Besides a reference of any kind, more or less identifying, to an associated participant, the participant record stores, among others, participant attributes based on master data about the participant and data generated during the campaign, e.g. by interaction with the participant, and a track history indicating the executed process sequence for the participant. In other words, the data in a participant record represents the current state and history of a participant in relation to the campaign, and the participant record is modified during the course of the campaign. Several participant records may be associated with the same participant, whereby different executions of process structure may exist for a single participant. For example, a participant may be injected into the campaign several times where allowed, or be forked after an interaction where several options are selected where allowed. In this situation, the two or more participant records associated with the same participant may be stored and processed as individual participant records, or they may preferably be stored together in a container record, providing for sharing an amount of common data but function as individual participant records.

PRID—participant record identifier: According to the present disclosure, the participant records are identified by a participant record identifier, which is preferably unique within a campaign management system, or at least within a process structure. The participant record identifier may be the participant identifier stored as participant association for associating with a participant, such as email or customer number, but the participant record identifier is preferably an arbitrary unique identifier to keep the association with the participant flexible, and allow for several participant records associated with the same participant. When a container record is used to hold several participant records associated with the same participant, the unique participant record identifier may be implemented as a combination of a container record identifier and a sub-identifier of the individual instances stored in the container record.

Processing: According to the present disclosure, the campaign management system is processing the participant records according to the process structure, possibly a specific process structure version. This means among others that the campaign management system in an embodiment is controlling which configured logic templates' executable program fragments to execute with respect to which participant records in accordance with the configured process sequences defined by the process structure. The processing results in the track histories of the participant records being updated to reflect the processing, and the processing may also involve further modification of the participant records, in particular modification of participant attributes.

PS—process structure: According to the present disclosure, a process structure defines the configured process sequences, i.e. the possible sequences of processing of participant records in a particular campaign and is thereby a machine-processable definition of a campaign. The process structure may preferably be defined by couplings of logic templates in a graphical user interface, and indirectly affected by the user editable parameters of the logic templates which define some of the possible couplings of logic templates. The process structure may also define and hold other data of general application to the campaign, in particular definitions and data that impact which process sequences are possible, or how they are selected for a participant record. The process structure is used by the processing engine to determine what to process next with respect to a particular participant record at a particular state.

PSV1, PSV2—process structure versions: In the present disclosure, a process structure version refers to a version of a process structure, thereby indicating that in an embodiment a process structure can have more than one version. The process structure is a machine-processable definition of a campaign, but in an embodiment, the user may evolve or change the campaign over time, and in an embodiment this feature may be implemented by creating new versions of the process structure when changes are made, thereby allowing preserving, at least for a while, the prior versions of the process structure, also, instead of replacing them. Two or more process structure versions may also derive from simply wanting alternative process structures, not necessarily better or newer than the other. Process structure versions based on the same process structure may typically have similarities and may in an embodiment allow migration of processing of a participant record from one process structure version to another. Two process structure versions may comprise configured process sequences that are more or less identical, and/or configured process sequences that are significantly different.

PSDB—process structure database: According to the present disclosure, any data storage structure holding one or more process structures or process structure versions may be referred to as process structure database. It may for example be cloud-based, distributed or centralized; be based on files, relational databases, or any other data container; be compressed binary, or human readable text, or a combination, etc., and be accessed through a file system, webservice, database server, etc.

R-PAUSE—resume command: According to the present disclosure a resume command is a command which may be triggered by a user action, such as the user of the campaign management system pressing a graphical button in the graphical user interface. The resume command facilitates a resumption of the execution of one or more executable program fragments that have already been. The resume command may be directed to the resumption of an executable program fragment of a single configured logic template. The resume command may also be directed towards a resumption of all executable program fragments of a campaign such that the execution of the entire campaign is resumed.

S-PAUSE—suspension command: According to the present disclosure, a suspension command is a command which may be triggered by a user action, such as the user of the campaign management system pressing a graphical button in the graphical user interface. The suspension command facilitates a suspension of the execution of one or more executable program fragments depending on the scope of the desired suspension. The suspension command may be directed to the suspension of an executable program fragment of a single configured logic template such that only a part of a process structure of a campaign is suspended. The suspension command may also be directed towards a suspension of all executable program fragments of a campaign such that the execution of the entire campaign is suspended.

SC—server computer: In the present disclosure a server computer is any processing device configured to manage and/or execute data. The server computer may comprise or have operational access to a processor such as one or more CPUs, volatile and non-volatile memory such as RAM, ROM and hard drives, a network communication module and/or other input/output modules, etc. The server computer may be a physical device or a virtual computer implemented on a physical device or distributed on several physical devices, e.g. distributed or cloud-based processing.

Sequence connection point: The logic templates according to the present disclosure comprise sequence connection points to allow defining couplings between logic templates in order to build a process structure of configured process sequences. The sequence connection points are also preferably represented graphically on the graphical elements representing logic template in the graphical user interface to facilitate the user's creation of graphical connections between the graphical elements. The sequence connection points may thereby illustrate the options available to the user for making connections to and from a particular logic template.

SFP—sequence forward point: In the present disclosure, a sequence forward point is a type of sequence connection point, and the one or more sequence forward points of a logic template define the one or more options a logic template has of passing the processing duty on to a subsequent logic template in a sequence, or in other words, the one or more outcome states that a logic template provides. For example, a logic template that performs a random A/B split, may have two sequence forward points, one for the A outcome, and one for the B outcome, or a participant interaction logic template may have sequence forward points related to the different choices made available to participant as part of the interaction, and further sequence forward points for various reasons that no interaction was performed.

SRP—sequence receive point: In the present disclosure, a sequence receive point refers to the availability to define the logic template as a subsequent step in a process, i.e. receiving the duty of processing from a previous logic template in a sequence. Most logic templates comprise a sequence receive point, but some kinds of logic templates, in an embodiment in particular injection logic templates, may not need a sequence receive point as they are configured to be the start of a process sequence and create the participant records.

TGPB—template graphical pause button: According to the present disclosure, a template graphical pause button is a button in the graphical user interface pertaining to a graphical element of a logic template, e.g. configured logic template, which when clicked on by a user of the campaign management system suspends the execution of the executable program fragment of the logic template, e.g. configured logic template. The template graphical pause button may be implemented as a button showing a pause-icon.

TLPA—template-specific local participant attribute: In the present disclosure, a template-specific local participant attribute is a local participant attribute which relates to or is relevant only to specific logic templates, e.g. as temporary preserving of events or choices. The relation to a specific logic template may in an embodiment also imply a scope of availability being restricted to the specific logic template.

TH—track history: According to the present disclosure, a track history is a part of a participant record, and refers to a logging of an executed process sequence of a processing of that participant record in accordance with the process structure. In other words, the track history is a kind of log which stores the sequence or a reference thereto of executable program fragments that the participant record has been processed by, and preferably includes timestamps and sequence forward points that were used, and possibly other data that may be relevant to be able to report in relation to the executed sequence, such as the development of a value of a participant attribute, which process structure version was used, etc. In an embodiment the values of local participant attributes may be recoverable from the track history. The track history is preferably used by the processing engine to determine the next processing step for the participant record, and for embodiments that feature migration of processing between process structure versions, the track history may also be used to control the migration. The track history can also be used for reporting and statistics, such as a live view of past and current state of each participant attribute.

TIME—time: In the present disclosure time refers to any instant of time, for example the time at which a current state of a participant record is mapped into a test participant record in test mode.

TMODE—test mode: In the present disclosure, a test mode refers to a mode of operation in which the campaign management system is able to test the performance of a process structure, or process structure version. Such testing may for example include testing whether or not test participant records can actually be processed according to a particular configured process sequence, whether or not individual configured logic templates are working as intended, and whether the overall process structure works as intended. The test mode also allows for generating statistics on the future development of the campaign which may come in handy when assessing whether or not the process structure is configured as it should. For example, the test mode may inject any number of test participant records, such as 10,000 test participant records, into a process structure in test mode, and the processing of these test participant records reflects a bias such that for example the vast majority are processed according to a specific configured process sequence when it was expected that these records were to be processed more homogeneous among a greater number of configured process sequences. By identifying such dominant configured process sequences, it becomes possible to identify which configured logic templates may comprise user editable parameters that were not properly set up.

TPREC—test participant record: In the present disclosure, a test participant record is a record for use in the test mode of the campaign management system. The test participant record includes similar features as a participant record such as attributes and a track history. The test participant record may reflect a current state of a participant record which have already undergone some processing in live mode, and therefore the content of the test participant record is based on real data obtained by the processing of a participant record in a campaign. The test participant record may also reflect an emulated state meaning that the data contained by the test participant record is arbitrary data pertaining to a fictious participant. The test participant records are capable of being processed according to a process structure operating in test mode, and the processing may require participant inputs performed by the user of the campaign management system and/or participant inputs generated by the campaign management system itself.

UACT—user action: In the present disclosure, a user action is an action performed by the user of the campaign management system which determines if the execution of one or more executable program fragments of one or more configured logic templates should be suspended from execution or resumed from a previous suspension. An example of a user action is when the user of the campaign management system actively chooses to pause the execution of a specific configured logic template by clicking, in the graphical user interface, on a pause button associated with that configured logic template. Another example is the user clicking on a graphical pause button, in the graphical user interface, which pauses the execution of all executable program fragments of all configured logic templates of the process structure.

UAN—user-defined attribute name: In the present disclosure, a user-defined attribute name generally refers to the name of a local participant attribute. The name of the local participant attribute may be chosen by the user during the configuration of a logic template. The user-defined attribute name may be any name defined by a string. By enabling the user of the campaign management system to name a local participant attribute during the configuration of a logic template, the attribute may receive a name which is logical to the user of the campaign management system, and not just any name or value which is void of any contextual information.

UEP—user editable parameters: In the present disclosure, user editable parameters are the user-configurable part of logic templates, thereby configuring how the executable program fragments of the logic templates process the participant records. A logic template where a required minimum of the user editable parameters have been appropriately adjusted for a particular campaign is also referred to as a configured logic template. The user editable parameters may for example relate to criteria such as ranges, thresholds, comparison values, filters, values, etc., selection or configuration of optional features of the executable program fragment, configuration of settings, default values, predefined values, etc., to influence and configure the execution of the executable program fragment in relation to a participant record. The user editable parameters may refer to data available in the participant record, i.e. participant attributes, as subject of comparison, selection, etc., and/or referencing campaign attributes of the process structure, i.e. common data generally available for all participant records processed by a particular process structure. In an embodiment a reference to a non-existing participant attribute or campaign attribute in a user editable parameter may cause automatic creation of such participant attribute or campaign attribute. The user editable parameters may allow the user to create further options for the executable program fragment to select from based on user-definable criteria, and automatically generate sequence forward points corresponding to the created further options.

UIS—user initiated suspension: According to the present disclosure, a user initiated suspension is a suspension of the execution of one or more executable program fragments facilitated by a user action, e.g. a suspension command initiated by the user of the campaign management system.

UPS—updated process structure: According to the present disclosure, an updated process structure represents any update of an already existing process structure. As such an updated process structure may refer to any more recent process structure version. For example, a campaign may comprise a first process structure version and a second process structure version which is the most recent process structure version. In this example, the second process structure version is an updated process structure.

USER—user: In the present disclosure, a user is a person operating the campaign management system and/or using the graphical user interface to build a process structure or monitor the processing of a campaign. The user may for example be an employee of a marketing department, customer service department, product management, after-sales department, etc.

500—computer: In the present disclosure, computer refers to a machine that can be instructed to carry out sequences of arithmetic or logical operations automatically via computer programming.

501—baseboard: In the present disclosure, a baseboard may also be referred to as a motherboard. The baseboard/motherboard is the printed circuit board found in the computer 500, which holds and allows communication between many of the electronic components of the computer, such as the central processing unit(s) and random-access-memory and provides connectors for other peripherals.

502—chipset: In the present disclosure, a chipset refers to a set of electronic components in an integrated circuit known as a Data Flow Management System that manages the data flow between the processor, memory and peripherals.

503—CPU(s): In the present disclosure, a CPU refers to a central processing unit which is an electronic circuitry that carries out the instructions of a computer program by performing the basic arithmetic, logic, controlling and input/output operations specified by the instructions.

504—RAM: In the present disclosure, RAM refers to random-access-memory which is a form of computer data storage that stores data and machine code currently being used by the central processing unit.

505—ROM: In the present disclosure, ROM refers to read-only-memory which is a type of non-volatile memory used in computers and other electronic devices. Data stored in ROM can only be modified slowly, with difficulty, or not at all, so it is mainly used to store firmware, i.e. software closely tied to specific hardware.

506—storage controller: In the present disclosure a storage controller refers to a device that controls storage arrays, and mainly comprises the three types of components-"CPU" (central processing unit), "cache memory" and "connection interface with the network and memory devices." It is otherwise called "storage processor" or "array controller," among other names. The storage controller integrates the memory areas in multiple memory devices and provides them as a single memory area to the computer. When receiving a request from the computer to write data, the storage controller determines to which device from multiple memory devices the data is allocated and stores the data in the selected device. When it receives a request from the computer to read certain data, the storage controller finds the location where the relevant data is stored, reads the data from the memory device and transfers it to the computer.

507—network interface controller: In the present disclosure a network interface controller refers to a computer hardware component that connects a computer to a computer network. A network interface controller may also be referred to as a network interface card, network adapter, LAN adapter or physical network interface.

508—input/output controller: In the present disclosure an input/output controller refers to a chip which help the communication of data between the central processing unit and the baseboard. In other words, the input/output controller help in the connection and control of various peripheral devices which are input and output devices. An input/output controller may also be referred to as an I/O controller or IOC, and a peripheral input/output controller or PIOC.

509—network: In the present disclosure a network refers to a computer network which is a digital telecommunications network which allows nodes to share resources. In computer networks, computing devices exchange data with each other using connections (data links) between nodes. These data links are established over cable media such as wires or optic cables, or wireless media such as Wi-Fi.

510—mass storage device: In the present disclosure mass storage refers to a device capable of storing large amounts of data. Devices and/or systems that have been described as mass storage include tape libraries, RAID systems, and a variety of computer drives such as hard disk drives, magnetic tape drives, magneto-optical disc drives, optical disc drives, memory cards, and solid-state drives. It also includes experimental forms like holographic memory. Mass storage includes devices with removable and non-removable media.

511—operating system: In the present disclosure, an operating system refers to a system software that manages computer hardware and software resources and provides common services for computer programs.

The invention claimed is:

1. A computer implemented campaign management system comprising:
   one or more processors;
   a graphical user interface coupled to the one or more processors; and
   a computer-readable storage media coupled to the one or more processors, the computer-readable storage media storing thereon computer-executable instructions that, when executed by the one or more processors, cause the one or more processors to perform operations, the operations comprising:
      processing a plurality of participant records according to a user-configured process structure of a plurality of configured logic templates, the plurality of participant records comprising participant attributes of corresponding participant records, the user-configured process structure being a machine-processable definition of a campaign;
      modifying one or more of the participant attributes of a participant record of the plurality of participant records by executing a sequence of one or more executable program fragments according to the user-configured process structure; and
      in response to a user action and/or a participant action:
         suspending executing the sequence of one or more executable program fragments, or
         resuming executing the sequence of one or more executable program fragments.

2. The computer implemented campaign management system of claim 1,
   wherein the process structure is graphically illustrated by means of the graphical user interface; and
   wherein the graphical user interface is arranged to display graphical elements, each graphical element being associated with a logic template.

3. The computer implemented campaign management system according to claim 1, wherein the operations further comprise, with respect to a particular participant record of the plurality of participants records:
   initiating execution of a first executable program fragment of a first configured logic template on the basis of said particular participant record;
   determining for said particular participant record a first sequence forward point of said first configured logic template on the basis of said execution of said first executable program fragment on the basis of said particular participant record;
   determining for said particular participant record a second configured logic template based on said determined first sequence forward point and said process structure defined by said graphical connections between sequence forward points and sequence receive points of said plurality of configured logic templates; and
   initiating execution of a second executable program fragment of said determined second configured logic template on the basis of said particular participant record.

4. The computer implemented campaign management system according to claim 1, wherein the operations further comprise executing a design mode and a live mode, wherein:
   in the design mode, executing a graphical design environment of a campaign wherein the graphical elements are couplable by a user by using said graphical user interface, the coupling defining a process structure of said executable program fragments on the basis of said plurality of configured logic templates in relation to said participant records, and
   in the live mode for the campaign, executing the process structure designed by the user in the design mode for processing of individual participant records, and
   reading, processing, and/or modifying participant attributes of participant records by a sequence of one or more executable program fragments according to the process structure.

5. The computer implemented campaign management system according to claim 4, wherein the operations further comprise suspending the execution of the executable program fragments associated to the process structure in the live mode while the process structure is modified in the design mode into an updated process structure.

6. The computer implemented campaign management system according to claim 4, wherein the processing of individual participant records in the live mode involves reading and/or of modifying the participant attributes of the individual participant record thereby invoking a progression of the executable program fragments relative to the process structure of the processing of the participant record.

7. The computer implemented campaign management system according to claim 1, wherein a progression of the processing of the plurality of participant records related to a specified campaign are graphically illustrated by means of the graphical user interface with reference to or related to graphical elements representing said plurality of configured logic templates of the user-defined process structure as accumulated numbers of participant records having been processed via a certain participant location.

8. The computer implemented campaign management system according to claim 1, wherein a progression of the processing of the plurality of participant records related to a specified campaign are graphically illustrated by means of the graphical user interface with reference to or related to graphical elements representing said plurality of configured logic templates of the user-defined process structure as accumulated numbers of participant records, and wherein the graphically illustrated participant records are filtered with respect to a filtering parameter.

9. The computer implemented campaign management system according to claim 1, wherein the graphical user interface of the campaign management system facilitates a user initiated suspension upon activation of the graphical user interface in relation to a specific campaign and wherein a suspension command suspends the processing of one or more executable program fragments in response to said activation and wherein a resume command resumes the execution of the suspended one or more executable program fragments.

10. The computer implemented campaign management system according to claim 1, wherein the campaign management system comprises a graphical button available for the user triggering a suspension command and triggering a resume command.

11. The computer implemented campaign management system according to claim 1, wherein the graphical user interface of the campaign management system facilitates a user initiated suspension upon activation of the graphical user interface in relation to a specific campaign and wherein a suspension command suspends the processing of user specified one or more executable program fragments in response to said activation and wherein a resume command resumes the execution of the suspended user specified one or more executable program fragments, and wherein the suspended user specified executable program fragment is associated to a configured logic template.

12. The computer implemented campaign management system according to claim 11, wherein the user specified executable program fragment is user specified by activating a suspension command or a resume command related to a graphical element graphically forming part of the process structure of the campaign.

13. The computer implemented campaign management system according to claim 1, wherein said plurality of configured logic templates comprises one or more interaction logic templates and said sequence of one or more executable program fragments of said one or more interaction logic templates is arranged to establish a communication to a participant contact interface on the basis of said participant contact interface information stored in said plurality of participant records.

14. The computer implemented campaign management system according to claim 13, wherein the execution of an interaction logic template is at least partly suspended during a test mode of a respective campaign, thereby obtaining that the participant interaction is suspended in the test mode.

15. The computer implemented campaign management system according to claim 1, wherein a user suspension of the sequence of one or more executable program fragments of a campaign suspends execution of relevant executable program fragments of the sequence of one or more executable program fragments and thereby freezing a status of the plurality of participant records processed in the campaign.

16. The computer implemented campaign management system according to claim 1, wherein:
   a user suspension of the sequence of one or more executable program fragments of a campaign suspends execution of relevant executable program fragments of the sequence of one or more executable program fragments and thereby freezing a state of the plurality of participant records processed in the campaign, said plurality of configured logic templates comprises one or more interaction logic templates, and the user suspension includes a suspension of executable program fragments of the one or more interaction logic templates.

17. The computer implemented campaign management system according to claim 1, wherein a user suspension of one or more executable program fragments of a campaign suspends execution of relevant executable program fragments with respect to participant records of the plurality of participant records associated to the campaign by allowing a subset of the sequence of one or more executable program fragments to finalize execution of the respective executable program fragments with respect to the participant records at specified participant locations.

18. The computer implemented campaign management system according to claim 17, wherein the subset of sequence of one or more executable program fragments either suspends further execution of executable program fragments with respect to the relevant the participant records or initiates a predefined suspension routine with respect to the participant records at the specified participant locations, thereby allowing a limited number of executable program fragments subsequent in the process structure to execute prior to a complete suspension of the execution of executable program fragments.

19. A method executed by a computer implemented campaign management system, the campaign management system comprising one or more processors, a graphical user interface coupled to the one or more processors, and a computer-readable storage media storing thereon computer-executable instructions that, when executed by the one or more processors, cause the one or more processors to perform operations, the operations comprising:
   processing a plurality of participant records according to a user-configured process structure of a plurality of configured logic templates, the plurality of participant records comprising participant attributes of corresponding participant records, the user-configured process structure being a machine-processable definition of a campaign;
   modifying one or more of the participant attributes of a participant record of the plurality of participant records by executing a sequence of one or more executable program fragments according to the user-configured process structure; and
   in response to a user action and/or a participant action:
      suspending execution of the sequence of one or more executable program fragments, or
      resuming execution of the sequence of one or more executable program fragments.

* * * * *